(12) United States Patent
Tsukuba et al.

(10) Patent No.: US 10,666,978 B2
(45) Date of Patent: May 26, 2020

(54) IMAGE DECODING APPARATUS, IMAGE DECODING METHOD

(71) Applicant: Huawei Technologies Co., Ltd., Shenzhen (CN)

(72) Inventors: Takeshi Tsukuba, Osaka (JP); Tomoyuki Yamamoto, Osaka (JP); Tomohiro Ikai, Osaka (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 530 days.

(21) Appl. No.: 15/136,705

(22) Filed: Apr. 22, 2016

(65) Prior Publication Data

US 2016/0381393 A1 Dec. 29, 2016

Related U.S. Application Data

(63) Continuation of application No. PCT/JP2014/077931, filed on Oct. 21, 2014.

(30) Foreign Application Priority Data

Oct. 22, 2013 (JP) ................. 2013-219443
Nov. 7, 2013 (JP) ................. 2013-231347

(51) Int. Cl.
| | |
|---|---|
| *H04N 19/70* | (2014.01) |
| *H04N 19/30* | (2014.01) |
| *H04N 19/61* | (2014.01) |
| *H04N 19/44* | (2014.01) |
| *H04N 19/17* | (2014.01) |
| *H04N 19/46* | (2014.01) |

(52) U.S. Cl.
CPC ............ *H04N 19/61* (2014.11); *H04N 19/17* (2014.11); *H04N 19/30* (2014.11); *H04N 19/44* (2014.11); *H04N 19/70* (2014.11)

(58) Field of Classification Search
CPC ........ H04N 19/17; H04N 19/30; H04N 19/44; H04N 19/61; H04N 19/70; H04N 19/46
USPC ............ 375/240.12, 240.02, 240.25, 240.26
See application file for complete search history.

(56) References Cited

U.S. PATENT DOCUMENTS

| | | | |
|---|---|---|---|
| 2014/0003489 A1* | 1/2014 | Hannuksela | H04N 19/70 375/240.02 |
| 2014/0098896 A1* | 4/2014 | Wang | H04N 19/70 375/240.26 |

FOREIGN PATENT DOCUMENTS

CN 102547273 A 7/2012

OTHER PUBLICATIONS

Yin et al., "MFC Test Model 2," Joint Collaborative Team on 3D Video Coding Extensions of ITU-T SG 16 WP 3 and ISO/IEC JTC 1/SC 29/WG11, JCT3V-E1008, 5th Meeting: Vienna, Austria (Jul. 27-Aug. 2, 2013).

(Continued)

*Primary Examiner* — Albert Kir
(74) *Attorney, Agent, or Firm* — Leydig, Voit & Mayer, Ltd.

(57) ABSTRACT

A layer incapable of being decoded on a bit stream which is generated through a bit stream extraction process from a bit stream including a prescribed layer set and which only includes a layer set made up of a subset of the prescribed layer set, occurs. An aspect of the present disclosure specifies a bit stream constraint pertaining to a parameter set, and a bit stream extraction process.

17 Claims, 31 Drawing Sheets

(56) References Cited

OTHER PUBLICATIONS

Wang et al., "MV-HEVC/SHVC HLS: On changing of the highest layer ID across AUs and multi-mode bitstream extraction," Joint Collaborative Team on Video Coding (JCT-VC) of ITU-T SG 16 WP3 and ISO/IEC JTC 1/SC 29/WG 11, JCTVC-N0267, 14$^{th}$ Meeting: Vienna, Austria (Jul. 25-Aug. 2, 2013).
Chen et al., "High efficiency video coding (HEVC) scalable extension draft 3," Joint Collaborative Team on Video Coding (JCT-VC) of ITU-T SG 16 WP 3 and ISO/IEC JTC 1/SC 29/WG 11, JCTVC-N1008_v3, 14$^{th}$ Meeting: Vienna, Austria (Jul. 25-Aug. 2, 2013).
He et al., "MV-HEVC/SHVC HLS: On nuh_layer_id of SPS and PPS," Joint Collaborative Team on Video Coding (JCT-VC) of ITU-T SG 16 WP 3 and ISO/IEC JTC 1/SC 29/WG 11, JCTVC-O0092, 15$^{th}$ Meeting: Geneva, Switzerland (Oct. 23-Nov. 1, 2013).
"Series H: Audiovisual and Multimedia Systems; Infrastructure of audiovisual services—Coding of moving video; Advanced video coding for generic audiovisual services," Recommendation ITU-T H.264, International Telecommunication Union, Geneva, Switzerland (Apr. 2013).
"Series H: Audiovisual and Multimedia Systems; Infrastructure of audiovisual services—Coding of moving video; High efficiency video coding," Recommendation ITU-T H.265, International Telecommunication Union, Geneva, Switzerland (Apr. 2013).
Rusert et al., "Inter-layer SPS prediction for HEVC extensions," Joint Collaborative Team on Video coding (JCT-VC) of ITU-T SG 16 WP 3 and ISO/IEC JTC 1/SC 29/WG11, JCTVC-L0137, 12 Meeting: Geneva, Switzerland (Jan. 14-23, 2013).
He et al., "On inter-layer parameter set," Joint Collaborative Team on Video Coding (JCT-VC) of ITU-T SG 16 WP 3 and ISO/IEC JTC 1/SC 29/WG 11, JCTVC-N0212, 14$^{th}$ Meeting: Vienna, Austria (Jul. 25-Aug. 2, 2013).
Deshpande, "On Inter-layer Reference Picture Set," Joint Collaborative Team on Video coding (JCT-VC) of ITU-T SG16 WP3 and ISO/IEC JTC 1/SC 29/WG 11, JCTVC-O0120, 15$^{th}$ Meeting: Geneva, Switzerland (Oct. 23-Nov. 1, 2013).
Tsukuba et al., "MV-HEVC/SHVC HLS: On sharing parameter sets across layers," Joint Collaborative Team on Video coding (JCT-VC) of ITU-T SG 16 WP3 and ISO/IEC JTC 1/SC 29/WG 11, JCTVC-F0036, 15$^{th}$ Meeting: Geneva, Switzerland (Oct. 23-Nov. 1, 2013).
Tsukuba et al., "On sub-bitstream extraction," Joint Collaborative Team on Video Coding (JCT-VC) of ITU-T SG 16 WP3 and ISO/IEC JTC 1/SC 29/WG 11, JCTVC-G0039, 16$^{th}$ Meeting: San Jose, California (Jan. 9-17, 2014).
Okubo et al., "H.265/HEVC Textbook, Section 4.3, Configuration of the H.265/HEVC Bit Stream" Impress Japan, Impress Communications (Oct. 2013).

* cited by examiner

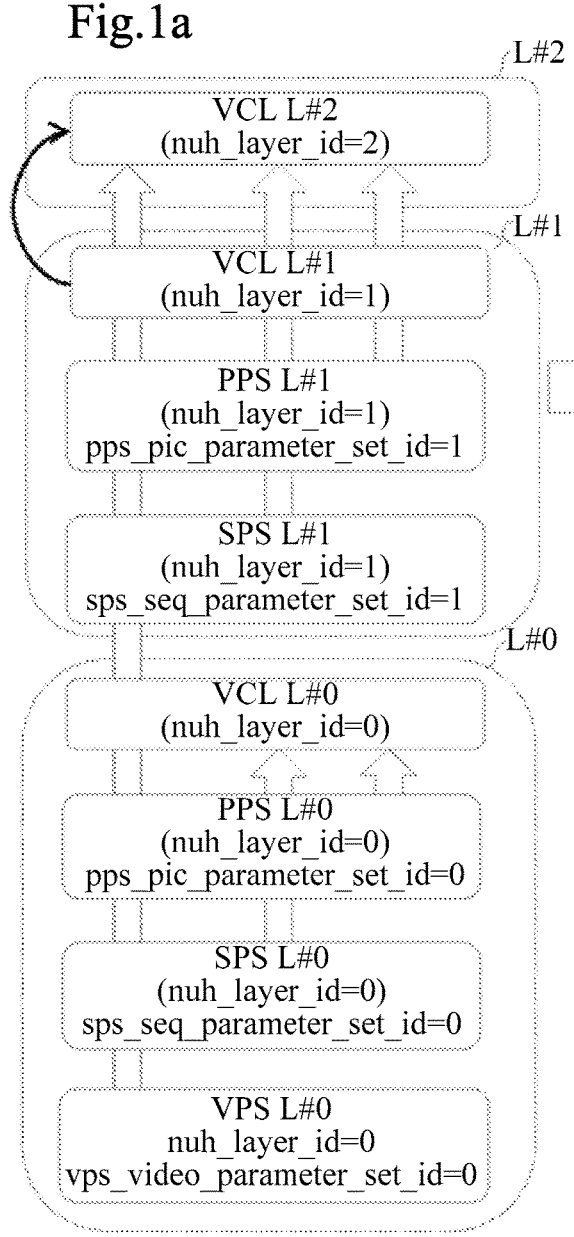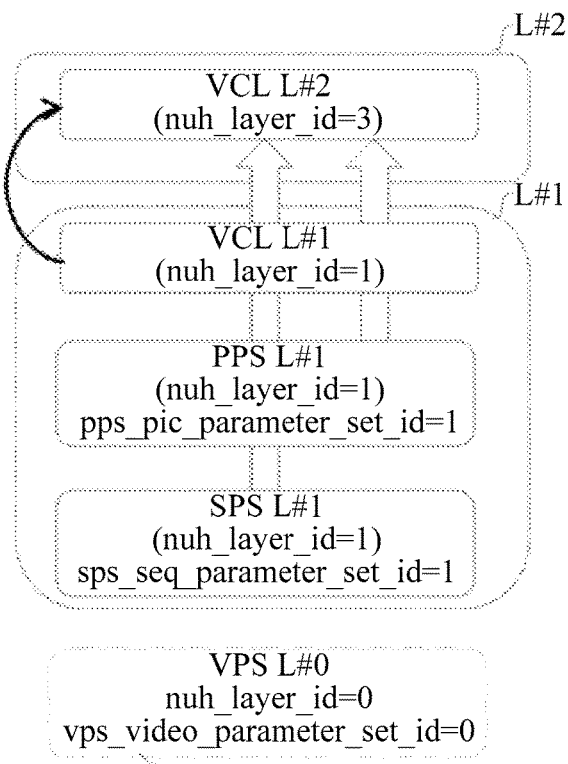

| nal_unit(NumBytesInNALunit){ | Descriptor |
|---|---|
| nal_unit_header() | |
| NumBytesInRBSP = 0 | |
| for( i=2; i<NumBytesInNALunit; i++) { | |
| If( i+2<NumBytesInNALunit && next_bits(24)== 0x000003) { | |
| rbsp_byte[ NumBytesInRBSP++] | b(8) |
| rbsp_byte[ NumBytesInRBSP++] | b(8) |
| i += 2 | |
| emulation_prevention_three_byte /* equal to 0x03 */ | f(8) |
| } else | |
| rbsp_byte[ NumBytesInRBSP++ ] | b(8) |
| } | |
| } | |

SYNNAL01 (rows: nal_unit_header())
SYNNAL02 (rows: rbsp_byte, rbsp_byte, i+=2, emulation_prevention_three_byte)

Fig. 6a

| nal_unit_header(){ | Descriptor |
|---|---|
| forbidden_zero_bit | f(1) |
| nal_unit_type | u(6) |
| nuh_layer_id | u(6) |
| nuh_temporal_id_plus1 | u(3) |
| } | |

Fig. 6b

| nal_unit_type | Name of nal_unit_type | Content of NAL unit and RBSP syntax structure | NAL unit type class | |
|---|---|---|---|---|
| 0, 1 | TRAIL_N, TRAIL_R | Coded slice segment of non-TSA, non-STSA trailing picture slice_segment_layer_rbsp( ) | VCL | ⎫ |
| 2, 3 | TSA_N, TSA_R | Coded slice segment of a TSA picture slice_segment_layer_rbsp( ) | VCL | |
| 4, 5 | STSA_N, STSA_R | Coded slice segment of an STSA picture slice_layer_rbsp( ) | VCL | |
| 6, 7 | RADL_N, RADL_R | Coded slice segment of a RADL picture slice_layer_rbsp( ) | VCL | ⎬ SYNA101 |
| 8, 9 | RASL_N, RASL_R | Coded slice segment of a RASL picture slice_layer_rbsp( ) | VCL | |
| 10, 12, 14 | RSV_VCL_N10 RSV_VCL_N12 RSV_VCL_N14 | Reserved//reserved non-RAP non-reference VCL NAL unit type | VCL | |
| 11, 13, 15 | RSV_VCL_R11 RSV_VCL_R13 RSV_VCL_R15 | Reserved//reserved non-RAP reference VCL NAL unit type | VCL | ⎭ |
| 16, 17, 18 | BLA_W_LP BLA_W_DLP BLA_N_LP | Coded slice segment of a BLA picture slice_segment_layer_rbsp( ) | VCL | ⎫ |
| 19, 20 | IDR_W_DLP IDR_N_LP | Coded slice segment of a IDR picture slice_segment_layer_rbsp( ) | VCL | ⎬ SYNA102 |
| 21 | CRA_NUT | Coded slice segment of a CRA picture slice_segment_layer_rbsp( ) | VCL | |
| 22, 23 | RSV_RAP_VCL22 RSV_RAP_VCL23 | Reserved//reserved RAP VCL NAL unit type | VCL | ⎭ |
| 24..31 | RSV_VCL24.. RSV_VCL31 | Reserved//reserved non-RAP VCL NAL unit type | VCL | |
| 32 | VPS_NUT | Video parameter set video_parameter_set_rbsp( ) | non-VCL | ⎫ |
| 33 | SPS_NUT | Sequence parameter set seq_parameter_set_rbsp( ) | non-VCL | |
| 34 | PPS_NUT | Picture parameter set pic_parameter_set_rbsp( ) | non-VCL | |
| 35 | AUD_NUT | Access unit delimiter access_unit_delimiter_rbsp( ) | non-VCL | |
| 36 | EOS_NUT | End of sequence end_of_seq_rbsp( ) | non-VCL | ⎬ SYNA103 |
| 37 | EOB_NUT | End of bitstream end_of_bitstream_rbsp( ) | non-VCL | |
| 38 | FD_NUT | Filler data filler_data_rbsp( ) | non-VCL | |
| 39, 40 | PREFIX_SEI_NUT SUFFIX_SEI_NUT | Supplemental enhancement information (SEI) sei_rbsp( ) | non-VCL | |
| 41..47 | RSV_NVCL41.. RSV_NVCL47 | Reserved | non-VCL | |
| 48..63 | UNSPEC48.. UNSPEC63 | Unspecified | non-VCL | ⎭ |

FIG. 7

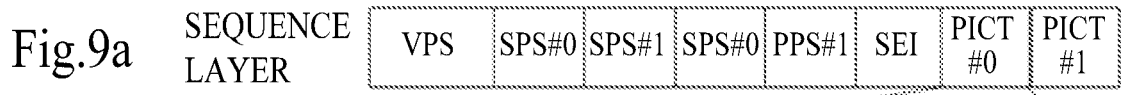
Fig.9a SEQUENCE LAYER
Fig.9b PICTURE LAYER
Fig.9c SLICE LAYER
Fig.9d SLICE DATA LAYER
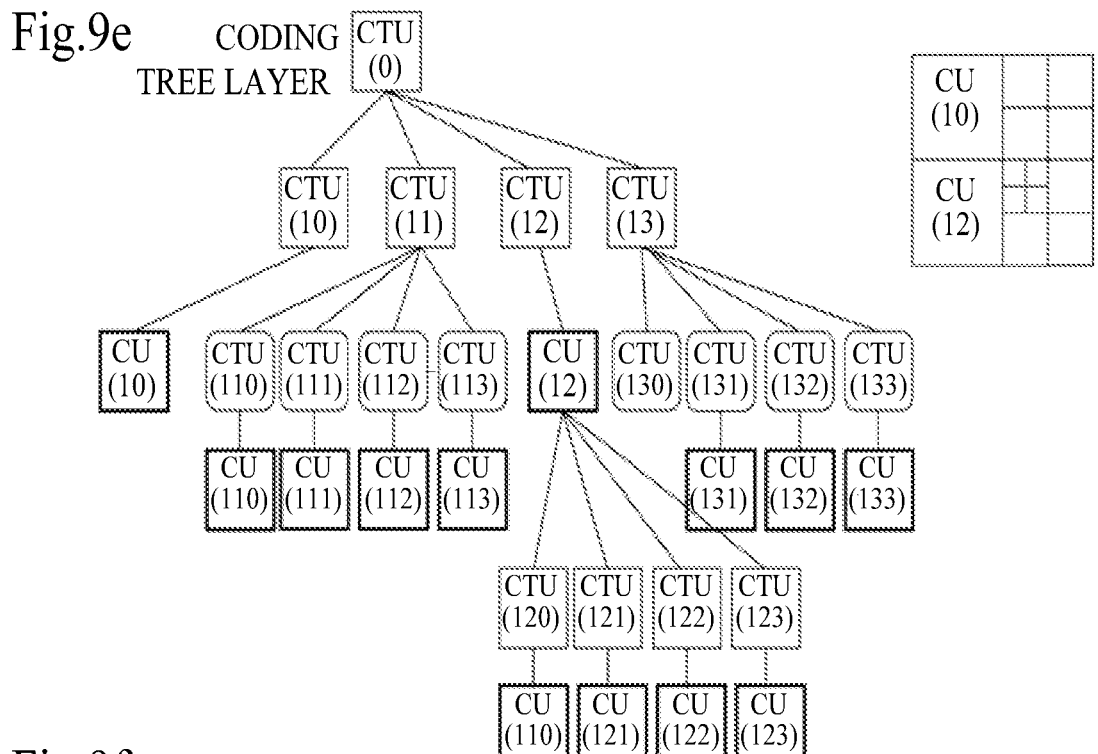
Fig.9e CODING TREE LAYER
Fig.9f CODING UNIT LAYER
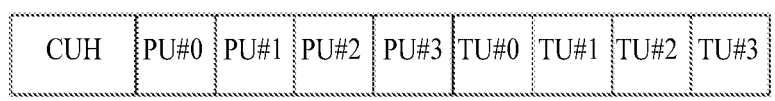

Video parameter set RBSP syntax

| | Descriptor |
|---|---|
| video_parameter_set_rbsp ( ) { | |
|   vps_video_parameter_set_id | u(4) | → SYNVPS01
|   vps_reserved_three_2bits | u(2) |
|   vps_max_layers_minus1 | u(6) | → SYNVPS02
|   vps_max_sub_layers_minus1 | u(3) | → SYNVPS03
|   vps_temporal_id_nesting_flag | u(1) |
|   vsp_extension_offset //vps_reserved_0xffff_16bits | u(16) |
|   profile_tier_level( 1, vps_max_sub_layers_minus1 ) | |
|   ... NOT SHOWN ... | |
|   vps_max_layer_id | u(6) | → SYNVPS04
|   vps_num_layer_sets_minus1 | ue(v) | → SYNVPS05
|   for( i = 1; j <= vps_num_layer_sets_minus1; i++ ) | |
|     for( j = 0; j <= vps_max_layer_id; j++ ) | |
|       layer_id_included_flag[ i ][ j ] | | → SYNVPS06
|   ... NOT SHOWN ... | |
|   vps_extension_flag | u(1) | → SYNVPS07
|   if( vps_extension_flag ) { | |
|     while(!byte_aligned( )) | |
|       vps_extension_alignment_bit_equal_to_one | u(1) |
|   vps_extension( ) | | → SYNVPS08
|   vps_extension2_flag | u(1) |
|   if( vps_extension2_flag) | |
|     while( more_rbsp_data( ) ) | |
|       vps_extension_data_flag | |
|   } | |
|   rbsp_trailing_bits( ) | |
| } | |

FIG. 12

Video parameter set extension syntax

| vps_extension( ) { | Descriptor | |
|---|---|---|
|   avc_base_layer_flag | u(1) | |
|   vps_vui_offset | u(16) | |
|   ... NOT SHOWN ... | | |
|   for( i = 1; i <= vps_max_layers_minus1; i++ ) | | |
|     for( j = 0; j < i; j++ ) | | |
|       direct_dependency_flag[ i ][ j ] | u(1) | } SYNVPS0A |
|   ... NOT SHOWN ... | | |
|   rep_format_idx_present_flag | u(1) | |
|   if( rep_format_idx_present_flag ) | | |
|     vps_num_rep_formats_minus1 | u(4) | |
|   for( i = 0; i <= vps_num_rep_formats_minus1; i++ ) | | |
|     rep_format( ) | | } SYNVPS0B |
|   if( rep_format_idx_present_flag ) | | |
|     for( i = 1; i <= vps_max_layers_minus1; i++ ) | | |
|       if( vps_num_rep_formats_minus1 > 0 ) | | |
|         vps_rep_format_idx[ i ] | u(4) | |
|   ... NOT SHOWN ... | | |
|   ~~direct_dep_type_len_minus2~~ | ~~ue(v)~~ | |
|   direct_dep_type_len_minusN | ue(v) | } SYNVPS0C |
|   for( i = 1; i <= vps_max_layers_minus1; i++ ) | | |
|     for( j = 0; j < i; j++ ) | | |
|       if( direct_dependency_flag[ i ][ j ] ) | | |
|         direct_dependency_type[ i ][ j ] | u(v) | } SYNVPS0D |
|   ... NOT SHOWN ... | | |
| } | | |

FIG. 13

Sequence parameter set RBSP syntax

| seq_parameter_set_rbsp( ) { | Descriptor | |
|---|---|---|
|   sps_video_parameter_set_id | u(4) | ⎫ SYNSPS01 |
|   if( nuh_layer_id == 0 ) { | | |
|     sps_max_sub_layers_minus1 | u(3) | |
|     sps_temporal_id_nesting_flag | u(1) | |
|     profile_tier_level( 1, sps_max_sub_layers_minus1 ) | | |
|   } | | |
|   sps_seq_parameter_set_id | ue(v) | ⎱ SYNSPS02 |
|   ... | | |
|   log2_min_luma_coding_block_size_minus3 | ue(v) | ⎫ |
|   log2_diff_max_min_luma_coding_block_size | ue(v) | ⎬ SYNSPS03 |
|   log2_min_transform_block_size_minus2 | ue(v) | |
|   log2_diff_max_min_transform_block_size | ue(v) | ⎭ |
|   ... | | |
|   scaling_list_enabled_flag | u(1) | ⎫ |
|   if( scaling_list_enabled_flag ) { | | |
|     if( nuh_layer_id > 0 ) | | |
|       sps_infer_scaling_list_flag | u(1) | |
|     if( sps_infer_scaling_list_flag ) | | |
|       sps_scaling_list_ref_layer_id | u(6) | ⎬ SYNVPS04 |
|     else { | | |
|       sps_scaling_list_data_present_flag | u(1) | |
|       if( sps_scaling_list_data_present_flag ) | | |
|         scaling_list_data( ) | | |
|     } | | |
|   } | | ⎭ |
|   ... | | |
|   sps_extension_flag | u(1) | ⎱ SYNSPS05 |
|   if( sps_extension_flag ) { | | |
|     sps_extension( ) | | ⎱ SYNSPS06 |
|     sps_extension2_flag | u(1) | |
|     if( sps_extension2_flag ) | | |
|       while( more_rbsp_data( ) ) | | |
|         sps_extension_data_flag | u(1) | |
|   } | | |
|   rbsp_trailing_bits( ) | | |
| } | | |

FIG. 15

Sequence parameter set extension syntax

| sps_extension( ) { | Descriptor |
|---|---|
| ... | |
| num_layer_id_reffring_shared_sps_minus1 | ue(v) |
| for( k=0; k<num_layer_id_refering_shared_sps_minus1 + 1; k++){ | |
|   if( k> 0){ | |
|     layer_id_refering_shared_sps[ k ] | u(6) or ue(v) or u(v) |
|     LIdToIdx[layer_id_referring_shared_sps[ k ]] = k; | |
|   } else { | |
|     layer_id_referring_shared_sps[0] = nuh_layer_id; | |
|     LIdToIdx[layer_id_referring_shared_sps[0]] = 0; | |
|   } | |
| num_scaled_ref_layer_offset[ k ] | ue(v) |
| for( i = 0; i < num_scaled_ref_layer_offset[ k ]; i++){ | |
|   scaled_ref_layer_left_offset [ k ][ i ] | se(v) |
|   scaled_ref_layer_top_offset [ k ][ i ] | se(v) |
|   scaled_ref_layer_right_offset [ k ][ i ] | se(v) |
|   scaled_ref_layer_bottom_offset [ k ][ i ] | se(v) |
|   } | |
| } | |
| ... | |
| } | |

⎯ SYNSPS0A

FIG. 16

Picture parameter set RBSP syntax

| pic_parameter_set_rbsp( ) { | Descriptor | |
|---|---|---|
|   pps_pic_parameter_set_id | ue(v) | — SYNPPS01 |
|   pps_seq_parameter_set_id | ue(v) | — SYNPPS02 |
|   ... | | |
|   if( nuh_layer_id > 0 ) | | |
|     pps_infer_scaling_list_flag | u(1) | |
|   if( pps_infer_scaling_list_flag ) | | |
|     pps_scaling_list_ref_layer_id | u(6) | |
|   else { | | — SYNPPS03 |
|     pps_scaling_list_data_present_flag | u(1) | |
|     if( pps_scaling_list_data_present_flag ) | | |
|       scaling_list_data( ) | | |
|   } | | |
|   ... | | |
| } | | |

FIG. 17

Fig.18a Slice segment layer RBSP syntax

| slice_segment_layer_rbsp( ) { | Descriptor |
|---|---|
| slice_segment_header( ) | |
| slice_segment_data( ) | |
| rbsp_slice_segment_trailing_bits( ) | |
| } | |

SYNSL01
SYNSL02

Fig.18b Slice segment header syntax

| slice_segment_header( ) { | Descriptor |
|---|---|
| first_slice_segment_in_pic_flag | u(1) |
| ... | |
| slice_pic_parameter_set_id | ue(v) |
| if( !first_slice_segment_in_pic_flag ) { | |
| ... | |
| slice_segment_address | u(v) |
| } | |
| ... | |
| slice_type | ue(v) |
| ... | |
| if( nuh_layer_id > 0 && !all_ref_layers_active_flag && | |
|     NumDirectRefLayers[ nuh_layer_id ] > 0 ) { | |
| inter_layer_pred_enabled_flag | u(1) |
| if( inter_layer_pred_enabled_flag && | |
|     NumDirectRefLayers[ nuh_layer_id ] > 1 ) { | |
| if( !max_one_active_ref_layer_flag ) | |
| num_inter_layer_ref_pics_minus1 | u(v) |
| if( NumActiveRefLayerPics != | |
|     NumDirectRefLayers[ nuh_layer_id ] ) | |
| for( i = 0; i < NumActiveRefLayerPics; i++ ) | |
| inter_layer_pred_layer_idc[ i ] | u(v) |
| } | |
| } | |
| ... | |
| } | |

SYNSH01
SYNSH02
SYNSH03
SYNSH04
SYNSH05

Fig.18c Slice segment data syntax

| slice_segment_data( ) { | Descriptor |
|---|---|
| do { | |
| coding_tree_unit( ) | |
| end_of_slice_segment_flag | ae(v) |
| CtbAddrInTs++ | |
| CtbAddrInRs = CtbAddrTsToRs[ CtbAddrInTs ] | |
| . | |
| } while( !end_of_slice_segment_flag ) | |
| } | |

SYNSD01
SYNSD02

IMAGE DECODING APPARATUS, IMAGE DECODING METHOD

CROSS-REFERENCE TO RELATED APPLICATION

This application is a continuation of International Patent Application No. PCT/JP2014/077931, filed on Oct. 21, 2014, which claims priority to Japanese Patent Application No. JP2013-231347, filed on Nov. 7, 2013 and Japanese Patent Application No. JP2013-219443, filed on Oct. 22, 2013, all of which are hereby incorporated by reference in their entireties.

TECHNICAL FIELD

The present disclosure relates to an image decoding apparatus that decodes hierarchically coded data where images are hierarchically coded, and to an image coding apparatus that generates hierarchically coded data by hierarchically coding images.

BACKGROUND

Information transmitted by a communication system or information recorded in a storage apparatus include images or video. Conventionally, techniques for coding images (including video, hereinafter) in order to transmit and store these images have been known.

Video coding schemes, such as AVC (H.264/MPEG-4 Advanced Video Coding) and its succeeding codec HEVC (High-Efficiency Video Coding) (Non-Patent Literature 1), have been known.(non-patent literature 1)

According to these video coding schemes, typically, a predictive image is generated on the basis of a local decoded image obtained by coding/decoding an input image, and a predictive residue (referred to as a "difference image" or a "residual image"), which is obtained by subtracting the predictive image from the input image (original image), is coded. Methods of generating a predictive image include inter-screen prediction (inter prediction), and intra-screen prediction (intra prediction).

In HEVC, it is assumed that reproduction at a temporally decimated frame rate, such as a case of reproducing 60 fps content at 30 fps, and a technique of achieving temporal scalability is adopted. More specifically, each picture is assigned a numerical value called a temporal identifier (Temporal ID, sub-layer identifier), and a constraint that a picture with a larger temporal identifier does not refer to a picture with a smaller temporal identifier is imposed. Consequently, in the case of decimating pictures with a specific temporal identifier for reproduction, pictures assigned larger temporal identifiers are not required to be decoded.

In recent years, a scalable coding technique or a hierarchical coding technique, that hierarchically codes images according to a required data rate, has been proposed. SHVC (Scalable HEVC) and MV-HEVC (MultiView HEVC) have been known as typical scalable coding schemes (hierarchical coding methods).

SHVC supports spatial scalability, temporal scalability, and SNR scalability. For example, in the case of the spatial scalability, an image down sampled from an original image to have a desired resolution is coded as a lower layer. Next, on a higher layer, inter-layer prediction is performed in order to remove inter-layer redundancy (Non-Patent Literature 2).

MV-HEVC supports viewpoint scalability (view scalability). For example, in the case of coding three viewpoint images that are a viewpoint image 0 (layer 0), a viewpoint image 1 (layer 1) and a viewpoint image 2 (layer 2), inter-layer redundancy can be removed by predicting the viewpoint images 1 and 2 on higher layers from the viewpoint image 0 on a lower layer (layer 0) through inter-layer prediction (Non-Patent Literature 3).

Inter-layer predictions used in scalable coding schemes, such as SHVC and MV-HEVC, include inter-layer image prediction and inter-layer motion prediction. The inter-layer image prediction generates a predictive image on a target layer using texture information (image) of a decoded picture on a lower layer (or a layer different from the target layer). The inter-layer motion prediction generates a predictive value of motion information on the target layer using the motion information of a decoded picture on a lower layer (or a layer different from the target layer). That is, inter-layer prediction is performed using a decoded picture on a lower layer (or a layer different from the target layer) as a reference picture on the target layer.

Besides the inter-layer prediction that removes redundancy in image information or motion information between layers, there also is prediction between parameter sets. In order to remove the redundancy of coding parameters common to layers, in a parameter set (e.g., sequence parameter set SPS, picture parameter set PPS, etc.) that defines a set of coding parameters required to decode/code coding data, the prediction between parameter sets predicts a part of coding parameters in the parameter set used for decoding/coding on an upper layer from among corresponding coding parameters in the parameter set used for decoding/coding on a lower layer (also called reference or inheritance), and omits decoding/coding the part of coding parameters. For example, there is a technique which is notified in SPS and PPS, that predicts scaling list information (quantization matrix) on a target layer from scaling list information on a lower layer (also called syntax prediction between parameter sets).

In the cases of view scalability and SNR scalability, the parameter set used for decoding/coding on each layer contains many common coding parameters. Accordingly, there is a technique called shared parameter set, which removes the redundancy of side information between layers (parameter set) using the parameter sets common to different layers. For example, in Non-Patent Literatures 2 and 3, SPS or PPS (the layer identifier of parameter set has a value of nuhLayerIdA) used for decoding/coding on the lower layer having a layer identifier value of nuhLayerIdA is allowed to be used for decoding/coding on the higher layer having a layer identifier value (nuhLayerIdB) higher than nuhLayerIdA. Through an NAL unit header in an NAL unit that stores coded data of a parameter set, such as coded data on an image or coding parameter, a layer identifier for identifying a layer (also called nuh_layer_id, layerId, or lId), a temporal identifier for identifying a sub-layer associating the layer (also called nuh_temporal_id_plus1, temporalId, or tId), and an NAL unit type (nal_unit_type) for representing the kind of the coded data stored in the NAL unit are notified.

In Non-Patent Literatures 2 and 3, as to a video parameter set VPS that defines a set of coding parameters to be referred to for decoding coded data made up of at least one layer, there is a bit stream constraint "VPS layer identifier is set to zero (nuh_layer_id=0)".

In Non-Patent Literature 4, as to a sequence parameter set SPS that defines a set of coding parameters to be referred to for decoding the target sequence, and a picture parameter set PPS that defines a set of coding parameters to be referred to for decoding each picture in the target sequence, there is bit stream constraint "layer identifiers of SPS and PPS are set to zero (nuh_layer_id=0)" is proposed.

CITATION LIST

Non-Patent Literature

Non-Patent Literature 1: "Recommendation H.265 (04/13)", ITU-T (disclosed on Jun. 7, 2013)

Non-Patent Literature 2: JCTVC-N1008_v3 "SHVC Draft 3", Joint Collaborative Team onVideo Coding (JCT-VC) of ITU-T SG 16 WP 3 and ISO/IEC JTC 1/SC 29/WG 11 14th Meeting: Vienna, AT, 25 Jul.-2 Aug. 2013 (published on Aug. 20, 2013)

Non-Patent Literature 3: JCT3V-E1008_v5 "MV-HEVC Draft Text 5", Joint CollaborativeTeam on 3D Video Coding Extension Development of ITU-T SG 16 WP 3 and ISO/IEC JTC 1/SC 29/WG 11 5th Meeting: Vienna, AT, 27 Jul.-2 Aug. 2013 (published on Aug. 7, 2013)

Non-Patent Literature 4: JCTVC-O0092_v1 "MV-HEVC/SHVC HLS: On nuh_layer_id of SPS and PPS", Joint Collaborative Team on Video Coding (JCT-VC) of ITU-T SG 16 WP 3 and ISO/IEC JTC 1/SC 29/WG 11 15th Meeting: Geneva, CH, 23 Oct.-1 Nov. 2013 (published on Oct. 14, 2013)

SUMMARY

Problem to be Solved

However, according to the constraint on the layer identifier pertaining to VPS, SPS and PPS in the conventional techniques (Non-Patent Literatures 2 to 4), in the case where a bit stream includes a layer A having a layer identifier value of nuhLayerIdA and a layer B having a layer identifier value of nuhLayerIdB during bit stream extraction, and when the coded data on the layer A is discarded and a bit stream consisting only of the coded data on the layer B is extracted through the bit stream extraction, a parameter set on the layer A required to decode the layer B (the layer identifier has a value of nuhLayerIdA) may be discarded. This case causes a problem in that the extracted coded data on the layer B cannot be decoded.

More specifically, as shown in FIG. 1(a), it is assumed that a bit stream includes a layer set A {LayerIdList={nuh_layer_id=0,nuh_layer_id=1,nuh_layer_id=2}} made up of a layer 0 (L#0 in FIG. 1(a)), a layer 1 (L#1 on FIG. 1(a)), and a layer 2 (L#2 on FIG. 1(a)) that have respective layer identifier values of L#0 (nuh_layer_id=0), L#1 (nuh_layer_id=1), and L#2 (nuh_layer_id=2), respectively. In the example of the layer set A in FIG. 1(a), according to the inter-layer dependency relationship in the layer set A, as shown in FIG. 1(a), the VCL on the layer 2 (video coding layer) (VCL L#2 in FIG. 1(a)) depends on the VCL on the layer 1 (VCL L#1 in FIG. 1(a)) as the reference layer of inter-layer prediction (inter-layer image prediction, inter-layer motion prediction) (an upper solid-line arrow in FIG. 1). As shown by thick arrows in FIG. 1(a), according to the reference relationship in parameter set, VPS on the layer 0 (VPS L#0 in FIG. 1(a)) is referred to by the parameter sets on each of the layers 0 to 2 and VCL (SPS L#0, PPS L#0, VCL L#0, SPS L#1, PPS L#1, VCL L#1 and VCL L#2 in FIG. 1(a)). The SPS on the layer 0 is referred to by the PPS and VCL on the layer 0, and the PPS on the layer 0 is referred to by the VCL on the layer 0. Likewise, the SPS on the layer 1 is referred to by the PPS and VCL on the layer 1 and the VCL on the layer 2, and the PPS on the layer 1 is referred to by the VCL on the layer 1 and the VCL on the layer 2.

A sub bit stream that only includes a layer set B {LayerIdListTarget={nuh_layer_id=1,nuh_layer_id=2}}, which is a subset of the layer set A and is a decoding target, is extracted (bit stream extraction) from the bit stream including the layer set A (FIG. 1(b)). However, the parameter set (VPS (VPS L#0 on the FIG. 1(b)) having the layer identifier value L#0 (nuh_layer_id=0) referred to for decoding the coded data on the layers 1 and 2 in the layer set B does not exist in the extracted bit stream. Consequently, a case where the coded data on the layers 1 and 2 cannot be decoded may occur.

The present disclosure is made in view of the above problems, and has an object to achieve an image decoding apparatus and an image coding apparatus that specify a bit stream constraint pertaining to a parameter set, and a bit stream extraction process, and prevents occurrence of a layer that cannot be decoded on a bit stream only including a layer set that is a subset of the layer set generated from the bit stream including the layer set through a bit stream extraction process.

Solution to Problem

To solve the problem, an image decoding apparatus according to an aspect of the present disclosure includes: an image-coded data extractor that extracts image coded data pertaining to a decoding target layer set including at least one layer, from the input image coded data, based on a layer ID list indicating the decoding target layer set; and a picture decoding unit that decodes a picture in the decoding target layer set, from the extracted image coded data, wherein the input image coded data extracted by the image-coded data extractor does not include a non-VCL NAL unit having a layer identifier that is not equal to zero and is not included in the layer ID list.

An image decoding method according to an aspect of the present disclosure is an image decoding method of decoding input image coded data, including: an image-coded data extracting step of extracting image coded data pertaining to a decoding target layer set including at least one layer, from the input image coded data, based on a layer ID list indicating the decoding target layer set; and a picture decoding step of decoding a picture in the decoding target layer set, from the extracted image coded data, wherein the input image coded data extracted in the image-coded data extracting step does not include a non-VCL NAL unit having a layer identifier that is not equal to zero and is not included in the layer ID list.

Advantageous Effects of Disclosure

An aspect of the present disclosure specifies a bit stream constraint pertaining to a parameter set, and a bit stream extraction process, which can prevent occurrence of a layer that cannot be decoded on the bit stream only including a layer set that is a subset of the layer set generated from the bit stream including the layer set through a bit stream extraction process.

BRIEF DESCRIPTION OF DRAWINGS

FIG. 1a & FIG. 1b are diagrams for illustrating an example of a problem occurring when a layer set B that is a subset of a certain layer set A is extracted from a bit stream including the layer set A, FIG. 1a shows an example of the layer set A, and FIG. 1b shows an example of the layer set B after bit stream extraction;

FIG. 2a shows a hierarchical video coding apparatus side, and FIG. 2b shows a hierarchical video decoding apparatus side;

FIG. 6a & FIG. 6b are diagrams showing an example of a syntax included in the NAL unit layer, FIG. 6a shows an example of the syntax configuring the NAL unit layer, and FIG. 6b shows an example of the syntax of an NAL unit header;

FIG. 7 is a diagram showing the relationship of a value of the NAL unit type and the kind of the NAL unit according to the embodiment of the present disclosure;

FIG. 9a, FIG. 9b, FIG. 9c, FIG. 9d, FIG. 9e, FIG. 9f are diagrams for illustrating a configuration of hierarchically coded data according to the embodiment of the present disclosure, FIG. 9a is a diagram showing a sequence layer defining a sequence SEQ, FIG. 9b is a diagram showing a picture layer defining a picture PICT, FIG. 9c is a diagram showing a slice layer defining a slice S, FIG. 9d is a diagram showing a slice data layer defining slice data, FIG. 9e is a diagram showing a coding tree layer defining a coded tree unit included in the slice data, and FIG. 9f is a diagram showing a coding unit layer defining a coding unit (Coding Unit; CU) included in the coding tree;

FIG. 11a is a diagram schematically showing examples of the reference picture lists, and FIG. 11b is a diagram schematically showing examples of reference pictures;

FIG. 12 shows an example of a VPS syntax table according to the embodiment of the present disclosure;

FIG. 13 shows an example of a VPS extension data syntax table according to the embodiment of the present disclosure;

FIG. 14a shows an example of including, as a dependency type, the presence or absence of non-VCL dependency, and FIG. 14b shows an example of including, as a dependency type, the presence or absence of shared parameter set, and the presence or absence of prediction between parameter sets;

FIG. 15 shows an example of an SPS syntax table according to the embodiment of the present disclosure;

FIG. 16 shows an example of an SPS extension data syntax table according to the embodiment of the present disclosure;

FIG. 17 shows an example of a PPS syntax table according to the embodiment of the present disclosure;

FIG. 18a, FIG. 18b & FIG. 18c show examples of a slice layer syntax table according to the embodiment of the present disclosure, FIG. 18a shows an example of a syntax table of the slice header included in the slice layer, and the slice data, FIG. 18b shows an example of a syntax table of the slice header, and FIG. 18c shows an example of a syntax table of the slice data;

FIG. 25a shows the transmitting apparatus mounted with the hierarchical video coding apparatus, and FIG. 25b shows the receiving apparatus mounted with the hierarchical video decoding apparatus;

FIG. 26a shows the recording apparatus mounted with the hierarchical video coding apparatus, and FIG. 26b shows the reproducing apparatus mounted with the hierarchical video decoding apparatus;

DESCRIPTION OF EMBODIMENTS

Figure 2A:
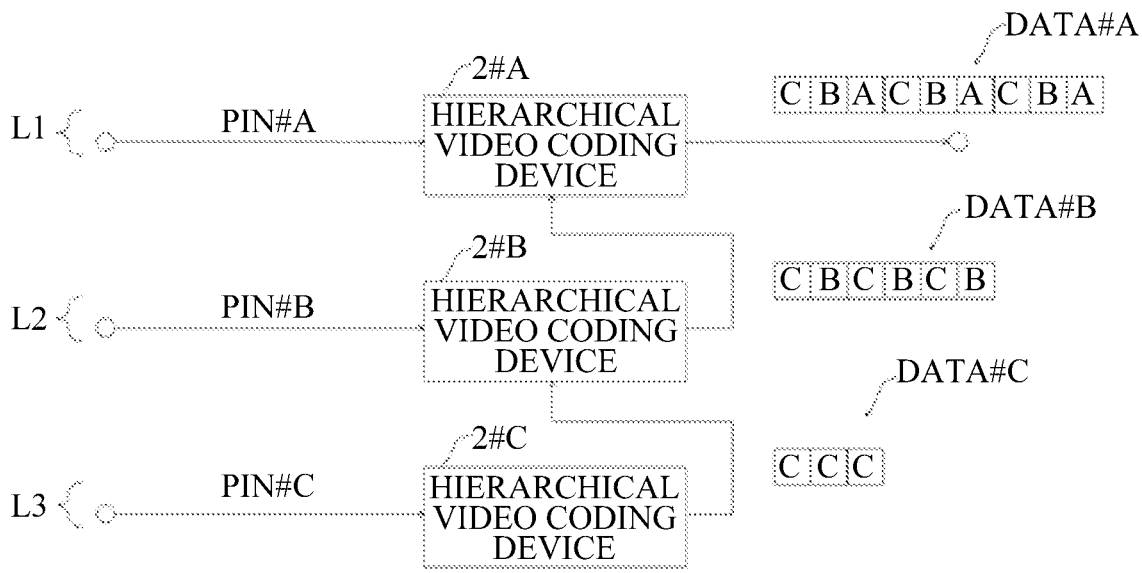
FIG. 2a & FIG. 2b are diagrams for illustrating the layer structure of hierarchically coded data according to an embodiment of the present disclosure.

Referring to FIGS. 2 to 31, a hierarchical video decoding apparatus 1 and a hierarchical video coding apparatus 2 according to an embodiment of the present disclosure are described as follows.

[Overview]

The hierarchical video decoding apparatus (image decoding apparatus) 1 according to this embodiment decodes coded data hierarchically coded by the hierarchical video coding apparatus (image coding apparatus) 2. The hierarchical coding is a coding scheme that codes video hierarchically from a low-quality component to a high-quality component. The hierarchical coding is standardized in, for example, SVC and SHVC. Here, the quality of video broadly means elements that have effects on the appearance of video in subjective and objective viewpoints. The quality of video includes, for example, "resolution", "frame rate", "image quality", and "pixel representation accuracy". Consequently, difference in video quality hereinafter indicates difference in "resolution" etc. in an exemplary manner. However, the difference is not limited thereto. For example, also in the case of that video is quantized in different quantization steps (i.e., the case that video is coded with different coding noise), the video quality can be regarded to be different from each other.

The hierarchical coding technique may be classified into (1) spatial scalability (2) temporal scalability (3) SNR (Signal to Noise Ratio) scalability, and (4) view scalability, in view of types of hierarchized information. The spatial scalability is a technique of hierarchization according to the resolution and the size of an image. The temporal scalability is a technique of hierarchization according to a frame rate (the number of frames per unit time). The SNR scalability is a technique of hierarchization according to coding noise. The view scalability is a technique of hierarchization according to viewpoint positions associated with respective images.

Prior to detailed description on the hierarchical video coding apparatus 2 and the hierarchical video decoding apparatus 1 according to this embodiment, (1) the layer structure of hierarchically coded data generated by the hierarchical video coding apparatus 2 and decoded by the hierarchical video decoding apparatus 1 is described, and subsequently (2) a specific example of data structures that can be adopted in respective layers is described.

[Layer Structure of Hierarchically Coded Data]

Figure 2B:
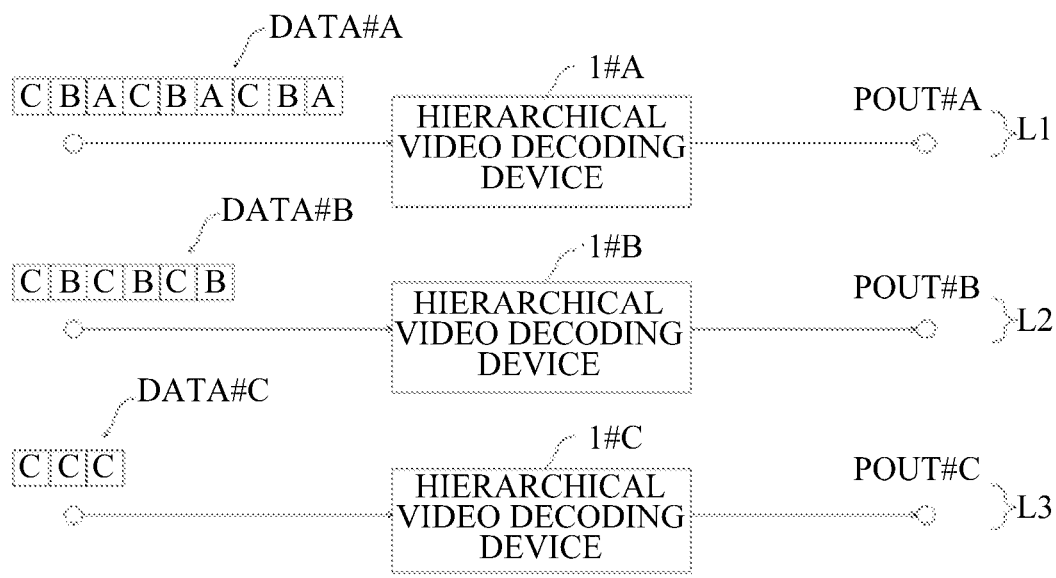

Here, referring to FIG. 2, coding and decoding of hierarchically coded data are described as follows. FIG. 2 is a diagram schematically showing the case of hierarchically coding/decoding video in three hierarchical layers of a lower hierarchical layer L3, a medium hierarchical layer L2, and a higher hierarchical layer L1. That is, in an example shown in FIGS. 2(a) and 2(b), among the three hierarchical layers, the higher hierarchical layer L1 is the highest layer, and the lower hierarchical layer L3 is the lowest layer.

A decoded image corresponding to a specific quality that can be decoded from the hierarchically coded data is hereinafter called a decoded image on a specific hierarchical layer (or a decoded image corresponding to a specific hierarchical layer) (e.g., a decoded image POUT#A on the higher hierarchical layer L1).

FIG. 2(a) shows hierarchical video coding apparatus 2#A to 2#C that generate coded data DATA#A to DATA#C by hierarchically coding respective input images PIN#A to PIN#C. FIG. 2(b) shows hierarchical video decoding apparatus 1#A to 1#C that generate decoded images POUT#A to POUT#C by decoding respective coded data DATA#A to DATA#C having been hierarchically coded.

First, referring to FIG. 2(a), the coding apparatus side is described. The input images PIN#A, PIN#B and PIN#C, which are to be inputs on the coding apparatus side, have been originated from the same image, but are different in image quality (resolution, frame rate, image quality, etc.). The image quality becomes lower in an order of the input images PIN#A, PIN#B and PIN#C.

The hierarchical video coding apparatus 2#C on the lower hierarchical layer L3 codes the input image PIN#C on the lower hierarchical layer L3 to generate the coded data DATA#C on the lower hierarchical layer L3. Basic information required for decoding to obtain the decoded image POUT#C on the lower hierarchical layer L3 is included (indicated as "C" in FIG. 2). The lower hierarchical layer L3 is the lowest hierarchical layer. Consequently, the coded data DATA#C on the lower hierarchical layer L3 is also called basic coded data.

The hierarchical video coding apparatus 2#B on the medium hierarchical layer L2 codes the input image PIN#B on the medium hierarchical layer L2 to generate the coded data DATA#B on the medium hierarchical layer L2 with reference to the coded data DATA#C on the lower hierarchical layer. The coded data DATA#B on the medium hierarchical layer L2 includes not only the basic information "C" included in the coded data DATA#C but also additional information (indicated as "B" in FIG. 2) required for decoding to obtain the decoded image POUT#B on the medium hierarchical layer.

The hierarchical video coding apparatus 2#A on the higher hierarchical layer L1 codes the input image PIN#A on the higher hierarchical layer L1 to generate the coded data DATA#A on the higher hierarchical layer L1 with reference to the coded data DATA#B on the medium layer L2. The coded data DATA#A on the higher hierarchical layer L1 includes not only the basic information "C" required for decoding to obtain the decoded image POUT#C on the lower hierarchical layer L3 and the additional information "B" required for decoding to obtain the decoded image POUT#B on the medium hierarchical layer L2, but also additional information (indicated as "A" in FIG. 2) required for decoding to obtain the decoded image POUT#A on the higher hierarchical layer.

As described above, the coded data DATA#A on the higher hierarchical layer L1 includes information pertaining to the decoded images with variable qualities.

Now, referring to FIG. 2(b), the decoding apparatus side is described. On the decoding apparatus side, the decoding apparatus 1#A, 1#B and 1#C, which correspond to the higher hierarchical layer L1, the medium hierarchical layer L2 and the lower hierarchical layer L3, respectively, decode the coded data DATA#A, DATA#B and DATA#C to output the decoded images POUT#A, POUT#B and POUT#C.

Video with a specific quality can be reproduced by extracting a part of information on the higher hierarchically coded data (also called bit stream extraction) and by decoding the extracted information in a specific decoding apparatus on a lower level.

For example, the hierarchical decoding apparatus 1#B on the medium hierarchical layer L2 may extract the information required for decoding to obtain the decoded image POUT#B (i.e., "B" and "C" included in the hierarchically coded data DATA#A) from the hierarchically coded data DATA#A on the higher hierarchical layer L1, and perform decoding to obtain the decoded image POUT#B. In other words, on the decoding apparatus side, the decoded images POUT#A, POUT#B and POUT#C can be obtained through decoding, on the basis of the information included in the hierarchically coded data DATA#A on the higher hierarchical layer L1.

The hierarchically coded data is not limited to the three-hierarchical-layered data described above. Alternatively, the hierarchically coded data may be hierarchically coded in two hierarchical layers, or hierarchically coded in layers that are more than three hierarchical layers.

A part or the entire coded data pertaining to the decoded image on a specific hierarchical layer may be coded independently of the other hierarchical layers to configure the hierarchically coded data so as to negate the need to refer to information on the other hierarchical layers during decoding on the specific hierarchical layer. For example, the description has been made such that in the example described above with reference to FIGS. 2(a) and 2(b), "C" and "B" are referred to for decoding to obtain the decoded image POUT#B. However, the reference is not limited thereto. The hierarchically coded data can be configured so as to allow the decoded image POUT#B to be obtained through decoding only use of "B". For example, a hierarchical video decoding apparatus can be configured that receives, as input, hierarchically coded data consisting only of "B" and the decoded image POUT#C, for decoding to obtain the decoded image POUT#B.

In the case of achieving the SNR scalability, the hierarchically coded data may be generated so that even when the same original image is used as input images PIN#A, PIN#B and PIN#C, and the decoded images POUT#A, POUT#B and POUT#C have different image qualities. In this case, the hierarchical video coding apparatus on the lower hierarchical layer generates the hierarchically coded data by quantizing the predictive residue using a larger quantization width than the hierarchical video coding apparatus on the higher hierarchical layer does.

In this description, for the sake of illustration, terms are defined as follows. The following terms are used to represent technical issues described below if not otherwise specified.

VCL NAL unit: VCL (Video Coding Layer) NAL unit is an NAL unit containing video (video signal) coded data. For example, the VCL NAL unit contains slice data (CTU coded data), and header information (slice header) commonly used through decoding the slice. Coded data stored in the VCL NAL unit is called VCL.

non-VCL NAL unit: non-VCL (non-Video Coding Layer, non-VCL) NAL unit is an NAL unit that contains coded data, such as header information, which is a set of coding parameters used for decoding to obtain sequences and pictures, such as a video parameter set VPS, sequence parameter set SPS, and picture parameter set PPS. Coded data stored in the non-VCL NAL unit is called non-VCL.

Layer identifier: a layer identifier (also called layer ID) is for identifying the hierarchical layer (layer), and corresponds to the hierarchical layer on a one-to-one basis. The hierarchically coded data contains an identifier used to select partially coded data required for decoding to obtain a decoded image on a specific hierarchical layer. A subset of hierarchically coded data associated with a layer identifier corresponding to a specific layer is also called layer representation.

Typically, for the sake of decoding to obtain a decoded image on a specific hierarchical layer, the layer representation on the hierarchical layer and/or the layer representation corresponding to the lower layer of the hierarchical layer concerned are used. That is, for the sake of decoding to obtain the decoded image on the target layer, the layer representation on the target layer and/or the layer representation on at least one hierarchical layer included in the lower layer of the target layer are used.

Layer: a set of VCL NAL units having the value of layer identifier on the specific hierarchical layer (nuh_layer_id, nuhLayerId) and non-VCL NAL units associated with the VCL NAL units, or a set of syntax structures having hierarchical relationship.

Higher layer: a hierarchical layer disposed higher than a certain hierarchical layer is called a higher layer. For example, in FIG. 2, the higher layers of the lower hierarchical layer L3 are the medium hierarchical layer L2 and the higher hierarchical layer L1. A decoded image on the higher layer means a decoded image with a higher quality (e.g., high resolution, high frame rate, high image quality, etc.).

Lower layer: a hierarchical layer disposed lower than a certain hierarchical layer is called a lower layer. For example, in FIG. 2, the lower layers of the higher hierarchical layer L1 are the medium hierarchical layer L2 and the lower hierarchical layer L3. The decoded image on the lower layer means a decoded image with a lower quality.

Target layer: a hierarchical layer that is a target of decoding or coding. A decoded image corresponding to the target layer is called a target layer picture. Pixels constituting the target layer picture are referred to as target layer pixels.

Reference layer: a specific lower layer to be referred to for decoding to obtain the decoded image corresponding to the target layer is called a reference layer. The decoded image corresponding to the reference layer is called a reference layer picture. Pixels constituting the reference layer are referred to as reference layer pixels.

In the example shown in FIGS. 2(a) and 2(b), the reference layers of the higher hierarchical layer L1 are the medium hierarchical layer L2 and the lower hierarchical layer L3. However, the configuration is not limited thereto. Alternatively, the hierarchically coded data may be configured so as to negate the need to refer to all the lower layers during decoding to obtain the specific layer. For example, the hierarchically coded data may be configured for the reference layer of the higher hierarchical layer L1 to be any of the medium hierarchical layer L2 and the lower hierarchical layer L3. The reference layer can be represented as a layer different from the target layer that is used (referred to) to predict the coding parameter and the like used to decode the target layer. A reference layer directly referred to during inter-layer prediction on the target layer is also called direct reference layer. The direct reference layer B, which is referred to in inter-layer prediction on the direct reference layer A of the target layer, is also called an indirect reference layer of the target layer.

Basic layer: the hierarchical layer arranged on the lowest layer is called a basic layer. A decoded image on the basic layer is a decoded image into which the coded data is decoded and which has the lowest quality, and is called a basic decoded image. In other words, the basic decoded image is a decoded image corresponding to the lowest hierarchical layer. A partially coded data item of the hierarchically coded data required for decoding to obtain the basic decoded image is called basic coded data. For example, basic information "C" contained in hierarchically coded data DATA#A on the higher hierarchical layer L1 is the basic coded data.

Extended Layer: A Higher Layer of the Basic Layer is Called an Extended Layer.

Inter-layer prediction: the inter-layer prediction is prediction of the syntax element value on the target value, a coding parameter used to decode the target layer and the like, on the basis of the syntax element value included in the layer representation on the hierarchical layer (reference layer) different from the layer representation on the target layer, of a value derived from the syntax element value and of the decoded image. The inter-layer prediction that predicts information pertaining to the motion information from the information on the reference layer may be called inter-layer motion information prediction. The inter-layer prediction from the decoded image on the lower layer may be called inter-layer image prediction (or inter-layer texture prediction). The hierarchical layer used for inter-layer prediction is exemplified as the lower layer of the target layer. Prediction in the target layer without using the reference layer may be called intra-layer prediction.

Temporal identifier: a temporal identifier (also called a temporal ID, time identifier, sub-layer ID or sub-layer identifier) is an identifier for identifying the layer pertaining to temporal scalability (hereinafter called sub-layer). The temporal identifier is for identifying a sub-layer, and corresponds to the sub-layer on a one-to-one basis. The coded data contains a temporal identifier used to select partially coded data required for decoding to obtain a decoded image on a specific sub-layer. In particular, the temporal identifier on the highest (uppermost) sub-layer is called the highest (uppermost) temporal identifier (highest TemporalId, highestTid).

Sub-layer: a sub-layer is a layer pertaining to temporal scalability identified by the temporal identifier. For the sake of discrimination from other scalabilities, such as spatial scalability and SNR scalability, this is hereinafter called a sub-layer (also called temporal layer). It is hereinafter assumed that the temporal scalability is achieved by a sub-layer contained in the coded data on the basic layer, or the hierarchically coded data required for decoding on a certain layer.

Layer set: a layer set is a set of layers that include at least one layer.

Bit stream extraction process: a bit stream extraction process is a process that removes (discards) NAL units that are not contained in a set (called a TargetSet) defined by the target highest temporal identifier (highest TemporalId, highestTid) and a layer ID list indicating layers contained in the target layer set (also called LayerSetLayerIdList[ ], LayerIdList[ ]), from a certain bit stream (hierarchically coded data, coded data), and extracts a bit stream (also called a sub-bit-stream) including NAL units contained in the target set. The bit stream extraction is also called sub-bit-stream extraction. It is assumed that the layer IDs contained in the layer set are stored in the respective elements of the layer ID list LayerSetLayerIdList[K] (K=0 . . . N−1, N is the number of layers contained in the layer set) in an ascending order. The target highest temporal identifier is also called HighestTidTarget, the target layer set is also called LayerSetTarget, and the layer ID list of the target layer set (target layer ID list) is also called LayerIdListTarget. The bit stream (image coded data) that is generated through bit stream extraction and includes the NAL units contained in the target set is also called decoding target image coded data (BitsreamToDecode).

Figure 3:
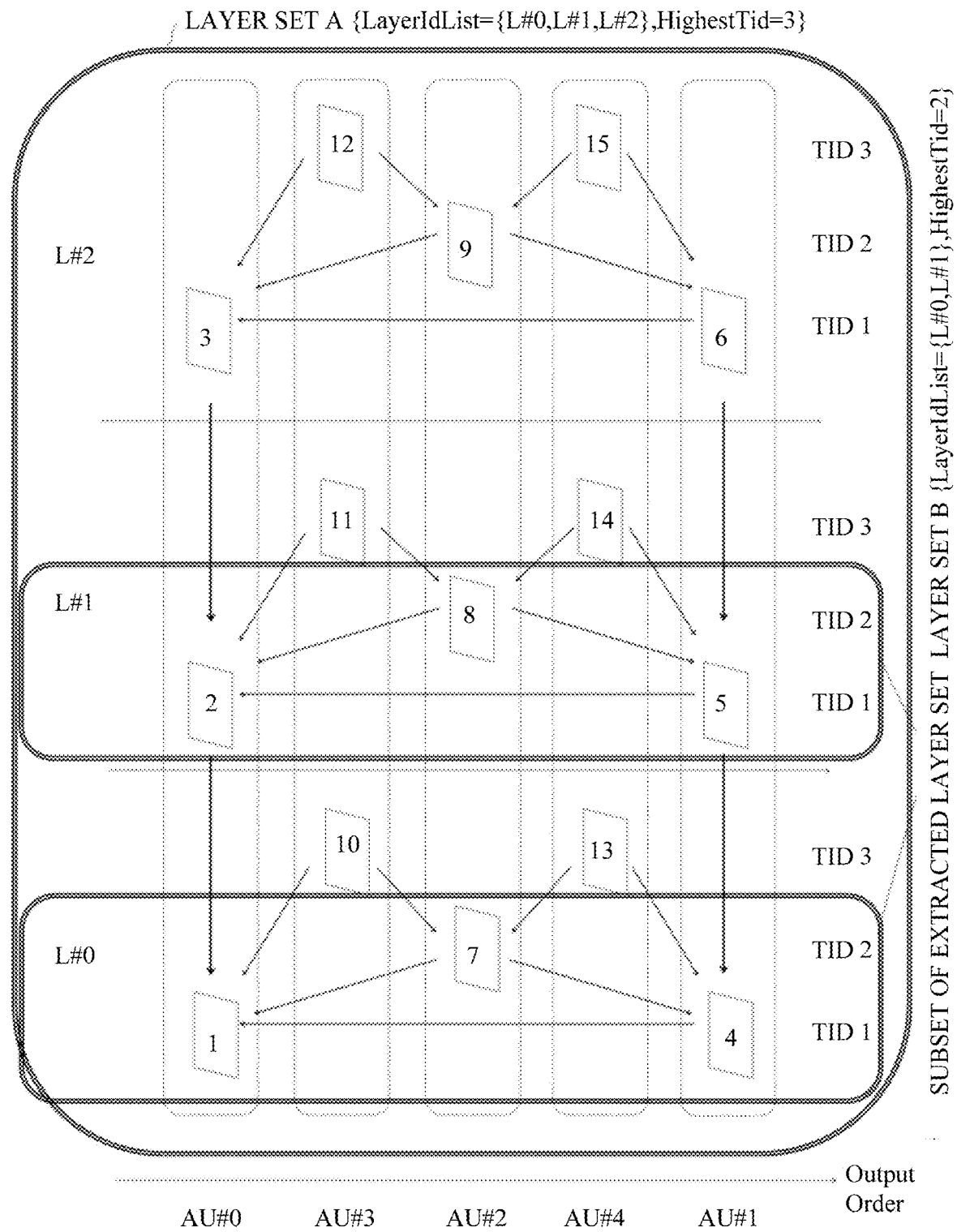
FIG. 3 is a diagram for illustrating layers constituting a certain layer set, and a structure of a sub-layer (temporal layer)
Figure 4:
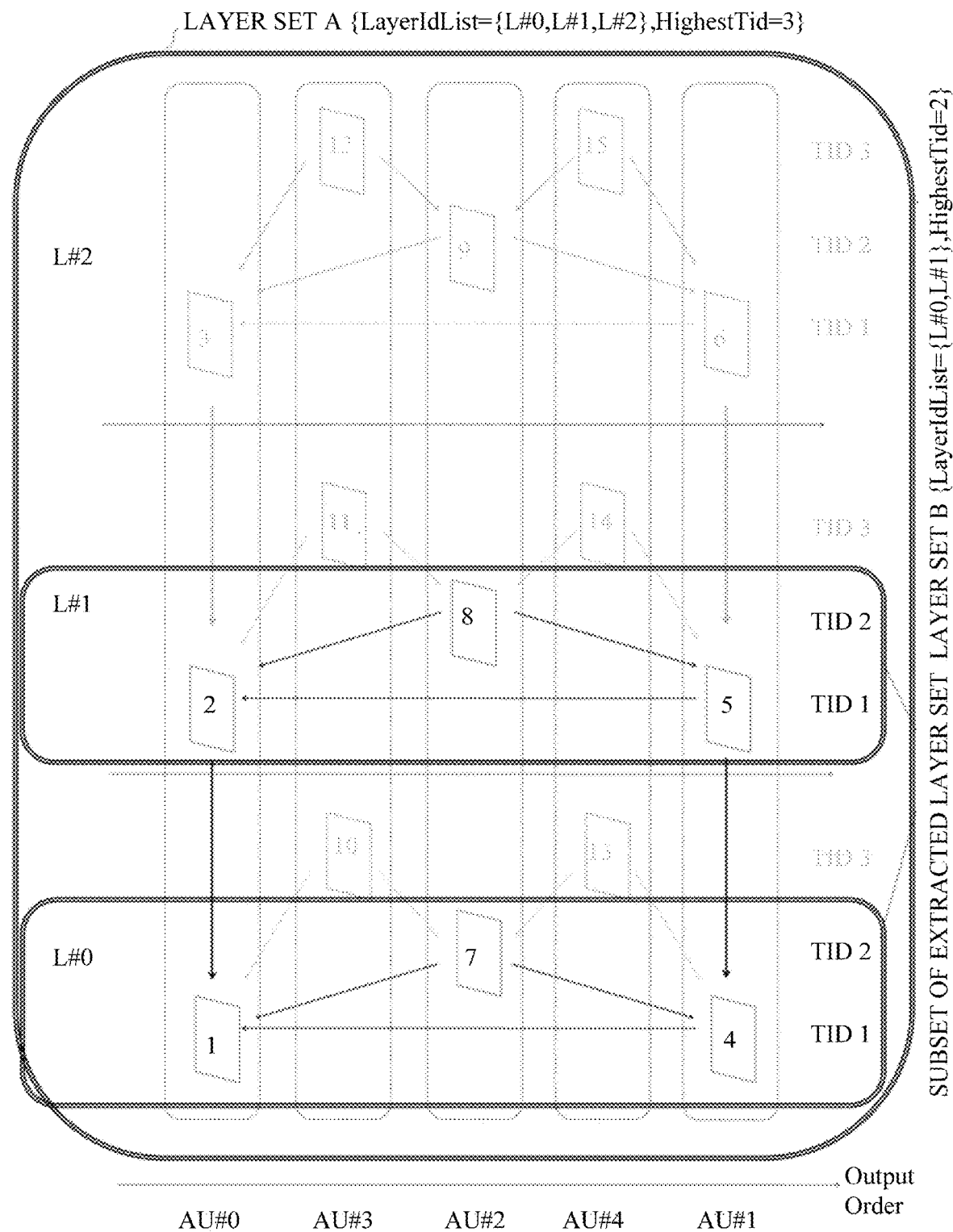
FIG. 4 is a diagram for illustrating layers and sub-layers (temporal layers) that constitute a subset of a layer set extracted by a sub-bit-stream extracting process from the layer set shown in FIG. 3.

Next, referring to FIGS. 3 and 4, an example is described where the bit stream extraction process extracts, from the hierarchically coded data containing a certain layer set A, the hierarchically coded data containing a layer set B, which is a subset of the layer set A.

FIG. 3 shows the configuration of the layer set A that includes three layers (L#0, L#1 and L#2) each made up of three sub-layers (TID1, TID2 and TID3). The layers that constitute a layer set, and sub-layers are hereinafter represented as {layer ID list {L#0, . . . , L#N}, highest temporal ID=K}, or {LayerIdList={L#0, . . . , L#N}, HighestTid=K}. For example, the layer set A in FIG. 3 is represented as {layer ID list {L#0, L#1, L#2}, highest temporal ID=3}, or {LayerIdList={L#0,L#1,L#2}, HighestTid=3}. Here, the symbol L#N indicates a certain layer N, boxes in FIG. 3 each indicate a picture, and the numbers in respective boxes indicate an example of a decoding order. Hereinafter, a picture with a number N is represented as P#N, which is substantially applicable to FIG. 4.

Arrows between pictures represent dependence directions between pictures (reference relationship). Arrows in the same layer represent reference pictures used for inter prediction. Arrows between layers represent reference pictures used for inter-layer prediction (also called reference layer pictures).

AU in FIG. 3 represents an access unit, and a symbol #N indicates the access unit number. Provided that AU at a certain starting point (e.g., the start point of random access) is represented as AU#0, AU#N represents the (N−1)-th access unit, and represents the order of AU contained in the bit stream. That is, in the example of FIG. 3, the access units are stored on the bit stream in an order of AU#0, AU#1, AU#2, AU#3, AU#4 . . . . The access unit represents a set of NAL units complied according to a specific classification rule. AU#0 in FIG. 3 can be regarded as a set of VCL NALs containing coded data of pictures P#1, P#1 and P#3. The details of the access unit are described later.

In the example of FIG. 3, the target set (layer set B) is {LayerIdList={L#0, L#1}, HighestTid=2}. Consequently, layers that are not contained in the target set (layer set B), and sub-layers having values higher than the highest temporal ID (HighestTid=2) are discarded from the bit stream containing the layer set A through bit stream extraction. That is, the layer L#2 and the sub-layer (TID3) that are not included in the layer ID list are discarded. Finally, as shown in FIG. 4, the bit stream containing the layer set B is extracted. In FIG. 4, broken-line boxes represent discarded pictures. Broken-line arrows indicate the dependence directions between the discarded pictures and the reference pictures. As the NAL units constituting the pictures on the layer L#3 and sub-layer TID3 have already been discarded, the dependency relationship has already been broken off SHVC and MV-HEVC adopt concepts of layers and sub-layers in order to achieve the SNR scalability, the spatial scalability, the temporal scalability and the like. As described in FIGS. 3 and 4, in the case of changing the frame rate to achieve the temporal scalability, coded data of pictures (highest temporal ID (TID3)) which are not referred to by another picture are discarded through the bit stream extraction process. In the case of FIGS. 3 and 4, the coded data of the pictures (10, 13, 11, 14, 12 and 15) are discarded, thereby generating coded data at a frame rate of 1/2.

In the case of achieving the SNR scalability, the spatial scalability and the view scalability, the coded data on the layer not contained in the target set are discarded through bit stream extraction, thereby the granularity of each scalability is changed. In the case of FIGS. 3 and 4, the coded data of the pictures (3, 6, 9, 12 and 15) are discarded, thereby generating coded data with a rough granularity of scalability. Repetition of the above process can gradually adjust the granularities of layers and sub-layers.

In FIG. 3, if there is no dependency relationship such as inter-layer prediction or the like between layers L#0 and L#1, the bit stream containing the layer set C{LayerIdList={L#1}, HighestTid=2} that is a subset of the layer set A consisting of a single layer can be extracted from the bit stream of the layer set A through bit stream extraction.

The terms described above are used for the sake of convenience for description. Consequently, the above technical matters may be represented in other terms.

[Data Structure of Hierarchically Coded Data]

The case of using HEVC and its extended scheme is exemplified as the coding scheme for generating coded data on the respective hierarchical layers. However, the example is not limited thereto. Alternatively, the coded data on the respective hierarchical layers may be generated according to a coding scheme, such as MPEG-2 or H.264/AVC.

The lower layer and the higher layer may be coded according to different coding schemes. The coded data on the respective hierarchical layers may be supplied to the hierarchical video decoding apparatus 1 through transmission paths different from each other, or to the hierarchical video decoding apparatus 1 through the same transmission path.

For example, in the case of scalable-coding ultrahigh-definition video (video, 4K video data) through the basic layer and one extended layer and transmitting the coded video, the basic layer may code video data obtained by downscaling and interlacing 4K video data, according to MPEG-2 or H.264/AVC, transmit the coded data through a television broadcasting network, while the extended layer may code 4K video (progressive) through HEVC and transmit the coded video via the Internet.

<Structure of Hierarchically Coded Data DATA>

Prior to detailed description on the image coding apparatus 2 and the image decoding apparatus 1 according to this embodiment, the data structure of hierarchically coded data DATA, which is generated by the image coding apparatus 2 and decoded by the image decoding apparatus 1, are described.

(NAL Unit Layer)

Figure 5:
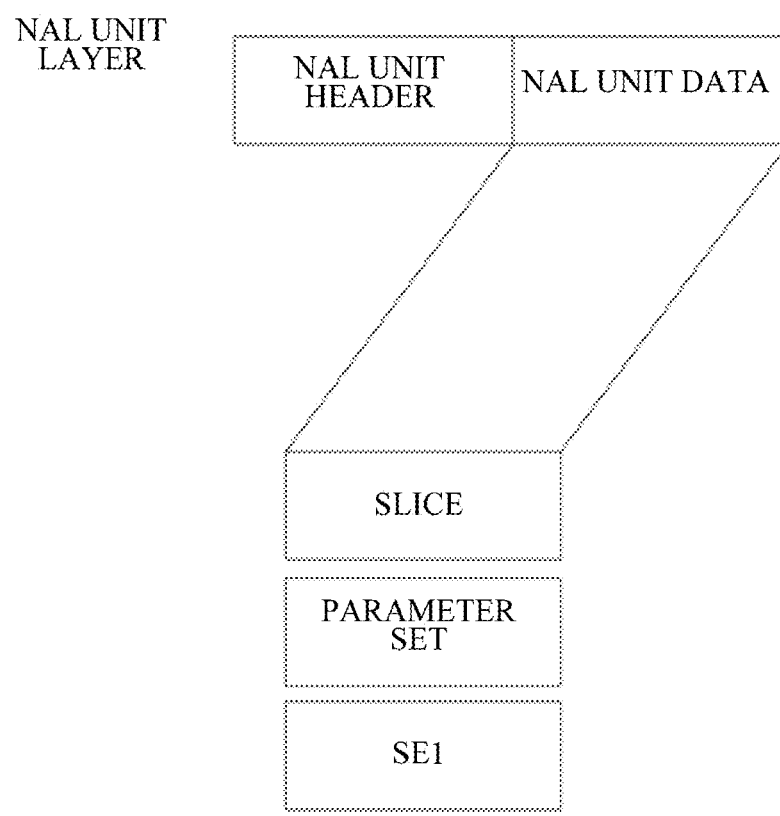
FIG. 5 is a diagram showing an example of the data structure that configures an NAL unit layer.

FIG. 5 is a diagram showing the hierarchical layer data structure of hierarchically coded data DATA. The hierarchically coded data DATA is coded on the basis of a unit called NAL (Network Abstraction Layer) unit.

NAL is a layer provided to abstract communication between a VCL (Video Coding Layer) that is a layer for performing a video coding process, and a lower system for transmitting and accumulating the coded data.

VCL is a layer for performing an image coding process. On VCL, coding is performed. Meanwhile, the so called a lower system corresponds to the file formats of H.264/AVC and HEVC, and the MPEG-2 system etc. In an example described below, the lower system corresponds to decoding processes on the target layer and the reference layer. In NAL, the bit stream generated on VCL is delimited in units that are NAL units, and transmitted to the lower system, which is the destination.

FIG. 6(a) shows a syntax table of an NAL (Network Abstraction Layer) unit. The NAL unit includes a coded data that is coded on VCL, and a header (NAL unit header: nal unit header( ) (SYNNAL01 in FIG. 6)) for allowing the coded data to be appropriately delivered to the lower system, which is the destination. The NAL unit header is, for example, represented according to the syntax shown in FIG. 6(b). In the NAL unit header there are described "nal_unit_type" that represents the type of the coded data stored in the NAL unit, "nuh_temporal_id_plus1" that represents the identifier (temporal identifier) of the sub-layer to which the stored coded data belongs, and "nuh_layer_id" (or nuh_reserved_zero_6bits) that represents the identifier (layer identifier) of the layer to which the stored coded data belongs. Meanwhile, the NAL unit data (SYNNAL02 in FIG. 6) includes a parameter set, SEI, slice, etc., which are described later.

FIG. 7 is a diagram showing the relationship of the value of the NAL unit type and the kind of the NAL unit. As shown in FIG. 7, NAL units having NAL unit types with values ranging from 0 to 15 indicated by SYNA101 are slices of non-RAP (random access picture). NAL units having NAL unit types with values ranging from 16 to 21 indicated by SYNA102 are slices of RAP (random access point picture, IRAP picture). The RAP pictures are roughly classified into BLA pictures, IDR pictures, and CRA pictures. The BLA pictures are further classified into BLA_W_LP, BLA_W_DLP and BLA_N_LP. The IDR pictures are further classified into IDR_W_DLP and IDR_N_LP. Pictures other than the RAP pictures include leading pictures (LP pictures), temporal access pictures (TSA pictures, STSA pictures), and trailing pictures (TRAIL pictures). The coded data on each hierarchical layer is stored in the NAL unit to thus be NAL-multiplexed, and is transmitted to the hierarchical video decoding apparatus 1.

As shown in NAL Unit Type Class in FIG. 7, the NAL units are classified into data (VCL data) constituting pictures and other data (non-VCL), according to the NAL unit type. All the pictures are classified into the VCL NAL units regardless of the kind of picture, such as random access pictures, leading pictures, and trailing pictures. A parameter set that is data required for decoding to obtain the picture, SEI that is auxiliary information on the picture, an access unit delimiter (AUD) that indicates delimitations for the sequence, end of sequence (EOS), an end of bit stream (EOB) (SYNA103 in FIG. 7) and the like are classified into non-VCL NAL units.

(Access Unit)

The set of NAL units complied according to the specific classification rule is called an access unit. In the case where the number of layers is one, the access unit is a set of NAL units configuring one picture. In the case where the number of layers is more than one, the access unit is a set of NAL units configuring pictures on multiple layers at the same time. In order to indicate the delimitation between access units, the coded data may include an NAL unit that is called an access unit delimiter (Access unit delimiter). The access unit delimiter is included between a set of NAL units configuring a certain access unit in the coded data, and a set of NAL units configuring another access unit.

Figure 8:
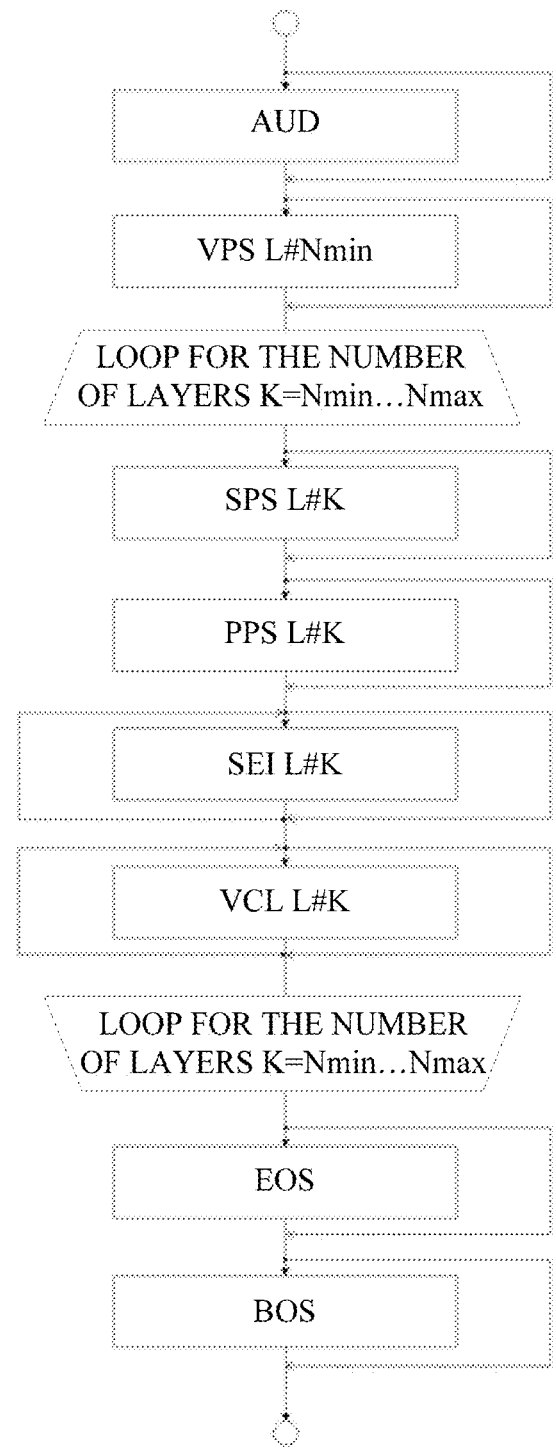
FIG. 8 is a diagram showing an example of a configuration of the NAL unit included in an access unit.

FIG. 8 is a diagram showing an example of the configuration of the NAL unit included in the access unit. As shown in FIG. 8, AU includes NAL units, such as an access unit delimiter (AUD) that shows the leading position of AU, various parameter sets (VPS, SPS, and PPS), various SEIs (Prefix SEI, and Suffix SEI), VCL (slice) constituting one picture in the case where the number of layers is one, VCL constituting pictures as many as the number of layers in the case where the number of layers is more than one, EOS (End of Sequence) showing the end of a sequence, and EOB (End of Bitstream) showing the end of a bit stream. In FIG. 8, codes L#K(K=Nmin . . . Nmax) after VPS, SPS, SEI, and VCL represent layer IDs. According to the example of FIG. 8, SPS, PPS, SEI and VCL of each of the layers L#Nmin to L#Nmax, except VPS, are in AU in an ascending order of the layer ID. The VPS is transmitted only through that with the lowest layer ID. FIG. 8 shows whether a specific NAL unit is present in AU or repetitively present, by means of arrows. For example, the case of presence of the specific NAL unit in AU is indicated by an arrow passing through the NAL unit. The case of absence of the specific NAL unit in AU is indicated by an arrow skipping this NAL unit. For example, an arrow that does not pass through AUD but is toward VPS indicates the case of absence of AUD in AU. Although the VPS having a higher layer ID other than the lowest one may be included in AU, the image decoding apparatus ignores the VPS having the layer ID other than the lowest one. Various parameter sets (VPS, SPS and PPS), and SEI, which is auxiliary information, may be included as a part of the access unit as shown in FIG. 8, or transmitted to a decoder through what is different from the bit stream.

In particular, an access unit including an IRAP picture with a layer identifier nuhLayerId=0 is called an IRAP access unit (random access point access unit). An IRAP access unit that performs initialization of a process of decoding all the layers included in the decoding target layer set is called an initialization IRAP access unit. According to the decoding order, a set ranging from the initialization IRAP access unit and through a non-initialization TRAP access unit with at least zero (access unit other than the initialization TRAP access unit) and to the next initialization IRAP access unit (note that the next initialization TRAP access unit is excluded) is also called CVS (Coded Video Sequence; hereinafter, including sequence SEQ).

FIG. 9 is a diagram showing the hierarchical layer data structure of hierarchically coded data DATA. The hierarchically coded data DATA includes a sequence and multiple pictures configuring the sequence in an exemplary manner. FIGS. 9(a) to 9(f) are diagrams showing a sequence layer defining a sequence SEQ, a picture layer defining a picture PICT, a slice layer defining a slice S, a slice data layer defining slice data, a coding tree layer defining a coded tree unit included in the slice data, and a coding unit layer defining a coding unit (Coding Unit; CU) included in the coding tree, respectively.

(Sequence Layer)

The sequence layer defines a set of data referred to by the image decoding apparatus 1 to decode the processing target sequence SEQ (hereinafter, also called a target sequence). As shown in FIG. 9(a), the sequence SEQ contains a video parameter set, a sequence parameter set (SPS), a picture parameter set (PPS), a picture PICT, and supplemental enhancement information (SEI). Here, the value shown after # indicates the layer ID. FIG. 9 shows an example of presence of the coded data having #0 and #1, i.e., the layer ID of zero and the layer ID of one. However, the kinds of layers and the number of layers are not limited thereto.

(Video Parameter Set)

The video parameter set VPS defines a set of coding parameters referred to by the image decoding apparatus 1 for decoding the coded data made up of at least one layer. For example, an VPS identifier (video_parameter_set_id) used for identifying the VPS referred to by the after-mentioned sequence parameter set and another syntax element, the number of layers included in the coded data (vps_max_layers_minus1), the number of sub-layers included in the layer (vps_sub_layers_minus1), the number of layer sets (vps_num_layer_sets_minus1) defining the set of layers including at least one layer represented in the coded data, layer set configuration information (layer_id_included_flag [i][j]) defining the set of layers constituting the layer set, inter-layer dependency relationship (direct dependency flag direct_dependency_flag[i][j], layer dependency type direct dependency_type[i][j]) and the like are defined. Multiple VPSs may be in the coded data. In this case, a VPS used for decoding is selected from among the VPSs for each target sequence. The VPS used for decoding to obtain a specific sequence belonging to a certain layer is called an active VPS. VPSs applied to the basic layer and the extended layer may be discriminated, and the VPS for the basic layer (layer ID=0) may be called an active VPS while the VPS for the extended layer (layer ID>0) may be called an active layer VPS. Hereinafter, the VPS means the active VPS for the target sequence belonging to a certain layer, if not otherwise specified. The VPS that has the layer ID=nuhLayerIdA and is used to decode the layer having the layer ID=nuhLayerIdA may be used for decoding the layer (nuhLayerIdB, nuhLayerIdB>nuhLayerIdA) with a layer ID higher than nuhLayerIdA.

(Bit Stream Constraint Pertaining to VPS)

As to VPS, a bit stream constraint (also called bit stream conformance) "the VPS has the same layer ID as the layer ID that is the lowest layer ID in the VCL included in the access unit, and the temporal ID is zero (tId=0)" is assumed between the decoder and the encoder. Here, the bit stream conformance is a constraint required to be satisfied by a bit stream decoded by the hierarchical video decoding apparatus (here, the hierarchical video decoding apparatus according to the embodiment of the present disclosure). Likewise, as to a bit stream generated by the hierarchical video coding apparatus (here, the hierarchical video coding apparatus according to the embodiment of the present disclosure), the bit stream conformance is required to be satisfied to securely allow the bit stream to be decoded by the hierarchical video decoding apparatus. That is, in consideration of the bit stream conformance, the bit stream is required to satisfy at least the following condition CX1.

CX1: "in the case where the VPS with the layer identifier nuhLayerIdA is an active VPS of the layer with the layer identifier nuhLayerIdB(nuhLayerIdB>=nuhLayerIdA), the layer identifier nuhLayerIdA is the same as the lowest layer identifier in the VCL included in the access unit".

Alternatively, the condition CX1 can also be represented as the following condition CX1'.

CX1': "in the case where the VPS having the layer identifier nuh_layer_id equal to nuhLayerIdA is an active VPS of the layer having the layer identifier nuh_layer_id equal to the nuhLayerIdB (nuhLayerIdB>=nuhLayerIdA), the layer identifier nuhLayerIdA is equal to the lowest layer identifier in the VCL included in the access unit".

In other words, the bit stream constraint CX1 (CX1') means that the VPS referred to by the target layer is the VCL included in the access unit that is the set of NAL units of the target layer set and belongs to the same layer as the VCL having the lowest layer identifier.

"The VPS referred to by the target layer is the VCL included in the access unit that is the set of NAL units of the target layer set, and belongs to the same layer as the VCL having the lowest layer identifier" means "in the case where the layer in the layer set B that is the subset of the layer set A refers to VPS of the layer 'included in the layer set A but is not included in the layer set B' in the layer set A, in the layer set B extracted through bit stream extraction, the VPS having the same coding parameter as the aforementioned VPS is included in the layer set B". The VPS having the same coding parameter as the aforementioned VPS indicates that the VPS identifier and the syntax in another VPS are the same as the aforementioned VPS except the layer identifier and the temporal identifier. Consequently, provision of the bit stream constraint can solve the problem in that the VPS is not included in the layer set on the bit stream after bit stream extraction. That is, it can prevent occurrence of the layer that cannot be decoded on the bit stream that is generated through the bit stream extraction process from the bit stream on a certain layer set and only includes a layer set that is a sub-set of the layer set.

VARIATION EXAMPLE 1 OF BIT STREAM CONSTRAINT PERTAINING TO VPS

The constraint pertaining to the VPS may be "the layer ID of VPS is the lowest layer ID in the layer set, and the temporal ID is zero (tId=0)".

That is, in consideration of the bit stream conformance, the bit stream is required to satisfy at least the following condition CX2.

CX2: "in the case where the VPS with the layer identifier nuhLayerIdA is an active VPS of the layer with the layer identifier nuhLayerIdB (nuhLayerIdB>=nuhLayerIdA), the layer identifier nuhLayerIdA is the lowest layer identifier in the layer set".

The condition CX2 may also be represented as the following condition CX2'.

CX2': "in the case where the VPS having the layer identifier nuh_layer_id equal to nuhLayerIdA is an active VPS of the layer having the layer identifier nuh_layer_id equal to the nuhLayerIdB (nuhLayerIdB>=nuhLayerIdA), the layer identifier nuhLayerIdA is the lowest layer identifier in the layer set".

In other words, the bit stream constraint CX2 (CX2') means that the VPS referred to by the target layer is the VPS having the lowest layer identifier in the target layer set.

"The VPS referred to by the target layer is the VPS having the lowest layer identifier in the target layer set" means "in the case where the layer in the layer set B that is the subset of the layer set A refers to VPS of the layer 'included in the layer set A but is not included in the layer set B' in the layer set A, in the layer set B extracted through bit stream extraction, the VPS having the same coding parameter as the aforementioned VPS is included in the layer set B".

Consequently, provision of the bit stream constraint can solve the problem in that the VPS is not included in the layer set on the bit stream after bit stream extraction. That is, the problem that can occur in the conventional art shown in FIG. 1 can be solved, or it can prevent occurrence of the layer that cannot be decoded on the bit stream that is generated through the bit stream extraction process from the bit stream on a certain layer set and only includes the layer set of a sub-set of the layer set.

(Sequence Parameter Set)

The sequence parameter set SPS defines a set of coding parameters referred to by the image decoding apparatus 1 for decoding the target sequence. For example, the active VPS identifier (sps_video_parameter_set_id) indicating the active VPS referred to by the target SPS, the SPS identifier (sps_seq_parameter_set_id) used to identify SPS referred to by the after-mentioned picture parameter set and other syntax elements, and the width and height of a picture are defined. Multiple SPSs may be in the coded data. In this case, an SPS used for decoding is selected from among the SPSs for each target sequence. The SPS used to decode a specific sequence belonging to a certain layer is also called an active SPS. SPSs applied to the basic layer and the extended layer may be discriminated, and the SPS for the basic layer may be called an active SPS while the SPS for the extended layer may be called an active layer SPS. Hereinafter, the SPS means the active SPS used for decoding the target sequence belonging to a certain layer, if not otherwise specified. The SPS that has the layer ID=nuhLayerIdA and is used to decode the sequence belonging to the layer having the layer ID=nuhLayerIdA may be used for decoding the sequence belonging to the layer (nuhLayerIdB, nuhLayerIdB>nuhLayerIdA) with a layer ID higher than nuhLayerIdA. A constraint that the temporal ID of SPS is zero (tId=0) (also called bit stream constraint) is hereinafter assumed between the decoder and the encoder, if not otherwise specified.

(Picture Parameter Set)

The picture parameter set PPS defines a set of coding parameters referred to by the image decoding apparatus 1 for decoding each picture in the target sequence. For example, the set includes the active SPS identifier (pps_seq_parameter_set_id) indicating the active SPS referred to by the target PPS, the PPS identifier (pps_pic_parameter_set_id) used to identify PPS referred to by an after-mentioned slice header and other syntax elements, the reference value (pic_init_qp_minus26) of quantization width used for picture decoding, a flag (weighted_pred_flag) representing application of weighted prediction, and a scaling list (quantization matrix). Note that multiple PPSs may be present. In this case, any of PPSs is selected from each picture in the target sequence. The PPS used for decoding to obtain a specific picture belonging to a certain layer is called an active PPS. PPSs applied to the basic layer and the extended layer may be discriminated, and the PPS for the basic layer may be called an active PPS while the PPS for the extended layer may be called an active layer PPS. Hereinafter, the PPS means the active PPS for the target picture belonging to a certain layer, if not otherwise specified. The PPS that has the layer ID=nuhLayerIdA and is used to decode the picture belonging to the layer having the layer ID=nuhLayerIdA may be used for decoding the picture belonging to the layer (nuhLayerIdB, nuhLayerIdB>nuhLayerIdA) with a layer ID higher than nuhLayerIdA.

The active SPS and the active PPS may be set to different SPS and PPS for each layer. That is, the decoding process can be performed with reference to different SPS and PPS for each layer.

(Picture Layer)

The picture layer defines a set of data referred to by the hierarchical video decoding apparatus 1 to decode the processing target picture PICT (hereinafter, also called a target picture). As shown in FIG. 9(b), the picture PICT includes slices S0 to SNS-1 (NS is the total number of slices included in the picture PICT).

Hereinafter, in the case where the slices S0 to SNS-1 are not required to be discriminated from each other, the description may be sometimes made without the subscripts of codes. This omission is also applicable to other data which is included in after-mentioned hierarchically coded data DATA and to which a subscript is added.

(Slice Layer)

The slice layer defines a set of data referred to by the hierarchical video decoding apparatus 1 to decode the processing target slice S (hereinafter, also called a target slice). As shown in FIG. 9(c), the slice S includes a slice header SH, and slice data SDATA.

The slice header SH includes a coding parameter group referred to by the hierarchical video decoding apparatus 1 to define the method of decoding the target slice. For example, an active PPS identifier (slice_pic_parameter_set_id) that designates a PPS (active PPS) referred to decode the target slice is included. The SPS referred to by the active PPS is designated by the active SPS identifier (pps_seq_parameter_set_id) included in the active PPS. Furthermore, the VPS (active VPS) referred to by the active SPS is designated by the active VPS identifier (sps_video_parameter_set_id) included in the active SPS.

Figure 10:
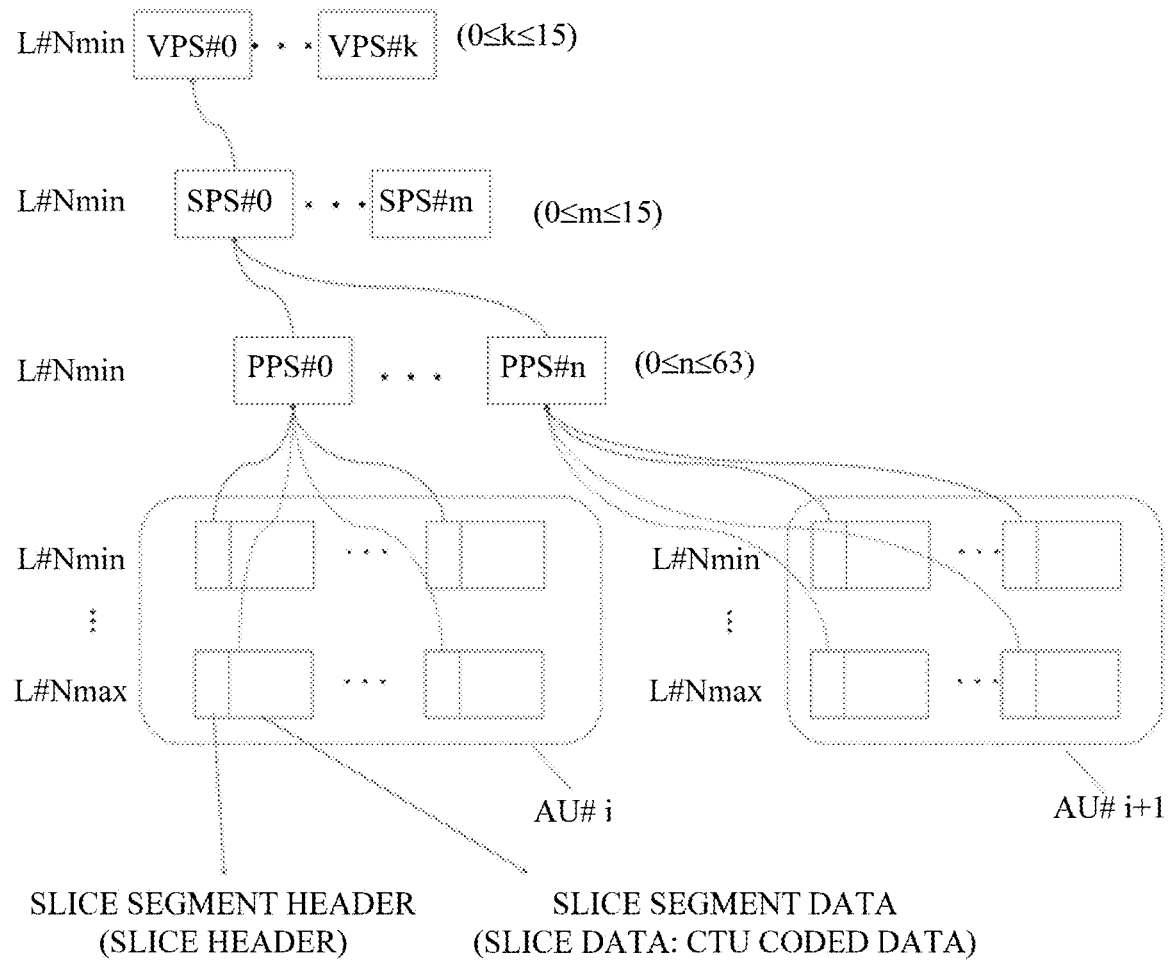
FIG. 10 is a diagram for illustrating a shared parameter set according to this embodiment.

For example, with reference to FIG. 10, sharing of the parameter set between layers in this embodiment (shared parameter set) is described. FIG. 10 represents the reference relationship between the header information and the coded data constituting the access unit (AU). In the example of FIG. 10, each of the slices constituting a picture belonging to the layers L#K (K=Nmin . . . Nmax) in each AU includes the active PPS identifier that designates the PPS to be referred to in the slice header, and designates the PPS (active PPS) to be used for decoding (also called activates) by means of the identifier when decoding of each slice is started. In the same picture, the coding parameter of each of PPS, SPS and VPS to be referred by each slice have to be the same as each other. In the activated PPS, the active SPS identifier that identifies the SPS (active SPS) to be referred to for the decoding process is included. The SPS (active SPS) used for decoding is identified (activated) by means of the identifier. Likewise, in the activated SPS, the active VPS identifier that identifies the VPS (active VPS) to be referred to for the process of decoding the sequence belonging to each layer is included. The VPS (active VPS) used for decoding is identified (activated) by means of the identifier.

According to the above procedures, the parameter set required to perform the process of decoding the coded data on each layer is established. In the example of FIG. 10, it is assumed that the layer identifier of each of parameter sets (VPS, SPS and PPS) is the lowest layer ID=L#Nmin belonging to a certain layer set. The slice having the layer ID=L#Nmin refers to the parameter set having the same layer ID. That is, in the example of FIG. 10, the slice with the layer ID=L#Nmin in AU#i refers to the PPS with the layer ID=L#Nmin and the PPS identifier=0. This PPS refers to the SPS with the layer ID=L#Nmin and the SPS identifier=0. This SPS refers to the VPS with the layer ID=L#Nmin and the VPS identifier=0. Meanwhile, the slice with the layer ID=L#K(K>Nmin) (L#Nmax in FIG. 10) in the AU#i can refer to the PPS and SPS having the same layer ID (=L#K), while this slice can also refers to the PPS and SPS on the lower layer L#M (K>M) (M=Nmin, L#Nmin in FIG. 10) than L#K. That is, the shared parameter set is referred to between layers. Consequently, the need of redundant transmission of the parameter set including the same coding parameter as that on the lower layer is negated on the higher layer. Therefore, the amount of codes pertaining to the redundant parameter set can be reduced, and the amount of processing pertaining to decoding/coding can be reduced.

The identifier of the higher parameter set to be referred to by each piece of the header information (slice header, PPS and SPS) is not limited to the example of FIG. 10. In the case of VPS, the identifier may be selected from among the VPS identifiers k=0 . . . 15. In the case of SPS, the identifier may be selected from among the SPS identifiers m=0 . . . 15. In the case of PPS, the identifier may be selected from among the PPS identifiers n=0 . . . 63.

The slice type designation information (slice type) that designates the slice type is an example of the coding parameter included in the slice header SH.

Slice types that can be designated by the slice type designation information include (1) I slice that only uses intra prediction during coding, (2) P slice that uses monodirectional prediction or the intra prediction during coding, and (3) B slice that uses the mono-directional prediction, bi-directional prediction, or intra prediction during coding.

(Slice DATA Layer)

The slice data layer defines a set of data referred to by the hierarchical video decoding apparatus 1 to decode the processing target slice data SDATA. As shown in FIG. 9(d), the slice data SDATA includes a coded tree block (CTB: Coded Tree Block). The CTB is a fixed-size block (e.g., 64×64) in s slice, and also called the largest cording unit (LCU).

(Coding Tree Layer)

As shown in FIG. 9(e), the coding tree layer defines the set of data referred to by the hierarchical video decoding apparatus 1 to decode the processing target coded tree block. The coded tree unit is split according to recursive quadtree splitting. The nodes of a tree structure obtained by the recursive quadtree splitting is called coding tree. A quadtree intermediate node is a coded tree unit (CTU). The coded tree block itself is defined as the highest CTU. The CTU includes a split flag (split_flag). When the split_flag is one, it is split into four coded tree units CTU. When the split_flag is zero, the coded tree unit CTU is split into four coded units (CUs). The coded unit CU is an end node of the coding tree layer, and this layer is not split further. The coded unit CU serves as a basic unit of the coding process.

The size of the coded tree unit CTU and the possible sizes of respective coded units depend on size designation information on the minimum coded node included in the sequence parameter set SPS, and the difference in hierarchical depth between the maximum coded node and the minimum coded node. For example, in the case where the size of the minimum coded node is 8×8 pixels and the difference in hierarchical depth between the maximum coded node and the minimum coded node is three, the size of the coded tree unit CTU is 64×64 pixels and the size of the coded node may be any of four sizes, that is, 64×64 pixels, 32×32 pixels, 16×16 pixels, and 8×8 pixels.

A partial region on a target picture decoded from the coded tree unit is called a coding tree block (CTB). A CTB corresponding to a luma picture, which is the luma component of a target picture, is called luma CTB. In other words, the partial region that is on the luma picture and decoded from the CTU is called luma CTB. Meanwhile, a partial region corresponding to a color-difference picture and decoded from the CTU is called a color-difference CTB. Typically, in the case where the color format of an image is determined, the luma CTB size and the color-difference CTB size can be transformed into each other. For example, in the case where the color format is 4: 2: 2, the color-difference CTB size is half of the luma CTB size. In the following description, the CTB size means the luma CTB size, if not otherwise specified. The CTU size is the luma CTB size corresponding to CTU.

(Coding Unit Layer)

As shown in FIG. 9(f), the coding unit layer defines the set of data referred to by the hierarchical video decoding apparatus 1 to decode the processing target coding unit. More specifically, the coding unit CU includes a CU header CUH, a predictive tree, and a transform tree. The CU header CUH defines whether the coded unit is a unit using intra prediction or a unit using inter prediction and the like. The coded unit is along a route of a prediction tree (PT) and a transform tree (TT). A region that is in a picture and corresponds to CU is called a coding block (CB). The CB on the luma picture is called luma CB, and the CB on a color-difference picture is called a color-difference CB. The CU size (size of coded node) means the luma CB size.

(Transform Tree)

The transform tree (hereinafter, abbreviated as TT) has the coded unit CU split into one or more transform blocks, and defines the position and size of each transform block. In other words, the transform block is one or more regions that do not overlap with each other and constitute the coded unit CU. The transform tree includes one or more transform blocks obtained through the aforementioned splitting. The information pertaining to the transform tree included in CU and information included in the transform tree are called TT information.

Splitting in the transform tree is classified into splitting that assigns a region having the same size as the coded unit as a transform block, and splitting according to recursive quadtree splitting as with the aforementioned tree block splitting. The transform process is performed for each transform block. Hereinafter, the transform block, which is a unit of transform, is also called a transform unit (TU).

The transform tree TT includes TT splitting information SP_TT that designates a pattern of splitting the target CU into each transform block, and quantization predictive residue $QD_1$ to $QD_{NT}$ (NT is the total number of transform units TU included in the target CU).

More specifically, the TT splitting information SP_TT is information for determining the shape of each transform block included in the target CU, and the position in the target CU. For example, the TT splitting information SP_TT can be achieved using information (split_transform_unit_flag) indicating whether to split the target node or not, and information indicating the depth of splitting (transfoDepth). For example, in the case where the CU size is 64×64, each transform block obtained by splitting can be a size ranging from 32×32 pixels to 4×4 pixels.

Each quantization predictive residue QD is coded data generated by the hierarchical video coding apparatus 2 applying the following processes 1 to 3 to the target block, which is a transform block to be processed.

Process 1: Apply frequency transform (e.g., DCT transform (Discrete Cosine Transform) and DST transform (Discrete Sine Transform), etc.) to the predictive residue obtained by subtracting the predictive image from the coding target image.

Process 2: Quantize the transform coefficients obtained in the process 1.

Process 3: Variable-length code the transform coefficients quantized in the process 2.

The aforementioned quantization parameter qp represents the magnitude of the quantization step QP used by the hierarchical video coding apparatus 2 to quantize the transform coefficients ($QP=2^{qp/6}$).

(Predictive Tree)

The predictive tree (hereinafter, abbreviated as PT) has the coded unit CU split into one or more predictive blocks, and defines the position and size of each predictive block. In other words, the predictive block is one or more regions that do not overlap with each other and constitute the coded unit CU. The predictive tree includes one or more predictive blocks obtained through the aforementioned splitting. The information pertaining to the predictive tree included in CU and information included in the predictive tree are called PT information.

The predicting process is performed for each predictive block. Hereinafter, the predictive block, which is the unit of prediction, is also called prediction unit (PU).

The splitting types of the predictive tree are roughly classified into two cases, i.e., a case of intra prediction and a case of inter prediction. The intra prediction is prediction in the same picture. The inter prediction means a predicting process performed between pictures different from each other (e.g., between displayed times, and between layer images). That is, the inter prediction adopts, as the reference picture, any of the reference picture on the same layer as the target layer (intra-layer reference picture) and the reference picture on the reference layer of the target layer (inter-layer reference picture), and generates the predictive image from the decoded image on the reference picture.

In the case of intra prediction, the splitting methods are 2N×2N (the same size as that of the coded unit) and N×N.

In the case of inter prediction, the splitting methods perform coding according to part mode of the coded data, and these methods are 2N×2N (the same size as that of the coded unit), 2N×N, 2N×nU, 2N×nD, N×2N, nL×2N, nR×2N, N×N, etc. Note that $N=2^m$ (m is any integer at least one). The number of splitting is any of 1, 2 and 4. Consequently, the number of PUs included in CU ranges from one to four. These PUs are sequentially represented as PU0, PU1, PU2 and PU3.

(Prediction Parameter)

The predictive image of the predictive unit is derived according to the prediction parameters accompanying the predictive unit. The prediction parameters include prediction parameters for intra prediction, and prediction parameters for inter prediction.

The intra prediction parameters are parameters for decoding intra prediction (prediction mode) for each intra PU. The parameters for decoding the prediction mode includes mpm_flag that is a flag pertaining to MPM (Most Probable Mode; the same applies hereafter), mpm_idx that is an index for selecting MPM, and rem_idx that is an index for designating the prediction mode other than MPM. Here, the MPM is an estimated prediction mode having a high possibility to be selected in the target partition. For example, the estimated prediction mode estimated on the basis of the prediction mode assigned to a partition around the target partition, DC mode typically having a high occurrence probability, and Planar mode may be included in the MPM. Hereinafter, in the case where it is simply represented as "prediction mode", this representation indicates the luma prediction mode if not otherwise specified. The color-difference prediction mode is represented as "color-difference prediction mode" to discriminate this mode from the luma prediction mode. The parameters for decoding the prediction mode include chroma_mode that is a parameter for designating the color-difference prediction mode.

The inter prediction parameter includes a prediction list usage flags predFlagL0 and predFlagL1, reference picture indices refIdxL0 and refIdxL1, and vectors mvL0 and mvL1. Each of the prediction list usage flags predFlagL0 and predFlagL1 is a flag indicating whether reference picture lists called L0 reference list and L1 reference list are used or not. In the case where the value is one, the corresponding reference picture list is used. The case where the two reference picture lists are used, i.e., the case where predFlagL0=1 and predFlagL1=1 corresponds to the bidirectional prediction. The case where one reference picture is used, i.e., the case of (predFLagL0, predFlagL1)=(1, 0) or (predFlagL0, predFlagL1)=(0, 1) corresponds to single prediction.

The syntax elements for deriving the inter prediction parameters included in the coded data include, for example, the splitting mode part mode, merge flag merge_flag, marge index merge_idx, inter prediction identifier inter_pred_idc, reference picture index refIdxLX, prediction vector index mvp_LX_idx, and difference vector mvdLX. Each value of the prediction list usage flag is derived on the basis of the inter prediction identifier as follows.

predFlagL0=inter prediction identifier & 1
predFlagL1=inter prediction identifier>>1

Here, "&" is a logical multiplication, ">>" is right shift.

(Examples of Reference Picture List)

Figure 11A:
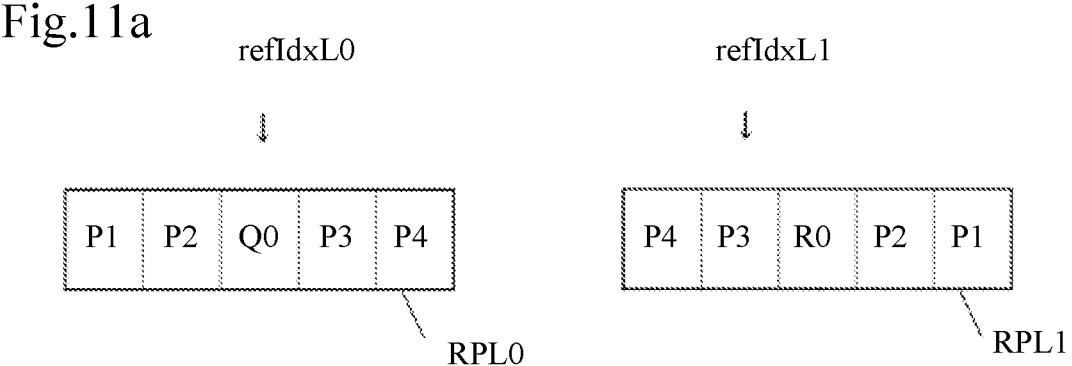
FIG. 11a & FIG. 11b are diagrams for illustrating reference picture lists and reference pictures.

An example of the reference picture list is now described. The reference picture list is a sequence made up of reference pictures stored in a decoded picture buffer. FIG. 11(*a*) is a diagram schematically showing examples of reference picture lists. In the reference picture list RPL0, five rectangles laterally arranged in a row indicate respective reference pictures. Symbols P1, P2, Q0, P3 and P4 shown from the left end toward the right are symbols for indicating the respective reference pictures. Likewise, in the reference picture list RPL1, symbols P4, P3, R0, P2 and P1 laterally arranged from the left end toward the right are symbols for indicating the respective reference pictures. "P" of P1 and the like indicates the target layer P. "Q" of Q0 indicates a layer Q different from the target layer P. Likewise, "R" of R0 indicates a layer R different from the target layer P and the layer Q. Subscripts attached to P, Q and R indicate the picture order number POC. A downward arrow immediate below of refIdxL0 shows that the reference picture index refIdxL0 is an index that refers to the reference picture Q0 from the reference picture list RPL0 in the decoded picture buffer. Likewise, a downward arrow immediate below of refIdxL1 shows that the reference picture index refIdxL1 is an index that refers to the reference picture P3 from the reference picture list RPL1 in the decoded picture buffer.

(Examples of Reference Picture)

Figure 11B:
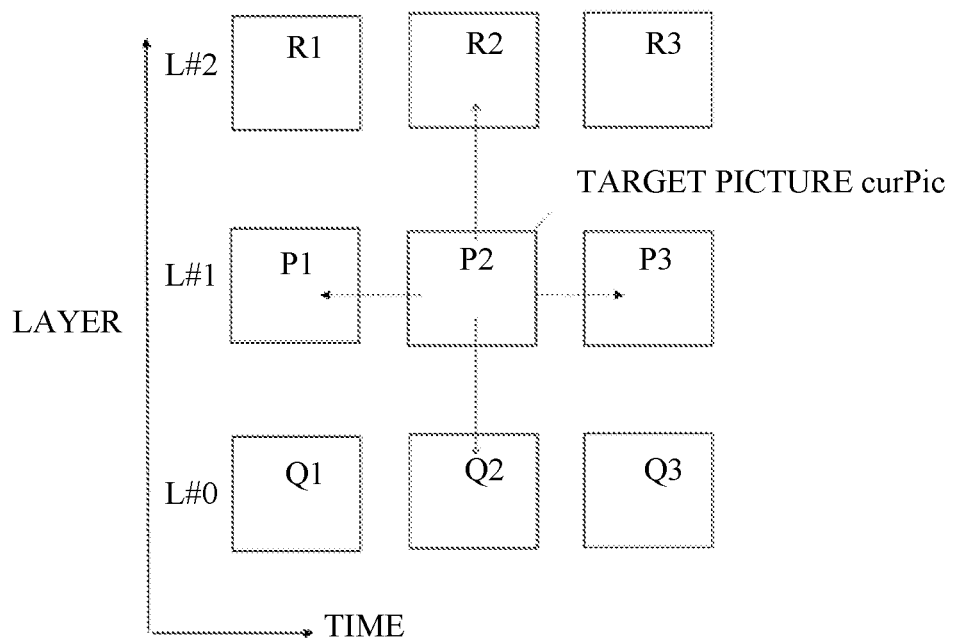

Examples of reference pictures used for deriving vectors are now described. FIG. 11(b) is a diagram schematically showing examples of reference pictures. In FIG. 11(b), the abscissa axis indicates the display time, and the ordinate axis indicates the number of layers. Illustrated rectangles arranged in vertical three rows and horizontal three columns (total nine) indicate respective pictures. Among the nine rectangles, the rectangle on the second column from the left on the low row indicates the decoding target picture (target picture), and the residual eight rectangles show the respective reference pictures. The reference pictures Q2 and R2 indicated by the downward arrow from the target picture are pictures at the same display time as that of the target picture but on different layers. In inter-layer prediction with reference to the target picture curPic(P2), the reference picture Q2 or R2 is used. The reference picture P1 indicated by the left arrow from the target picture is a past picture on the same layer as the target picture. The reference picture P3 indicated by the right arrow from the target picture is a future picture on the same layer as the target picture. Motion prediction with reference to the target picture uses the reference picture P1 or P3.

(Merge Prediction and AMVP Prediction)

The method of decoding (coding) the inter prediction parameters includes a merge prediction (merge) mode, and an AMVP (Adaptive Motion Vector Prediction) mode. A merge flag merge_flag is a flag for identifying these modes. In each of the merge prediction mode and the AMVP mode, the prediction parameter of the target PU is derived using the prediction parameter of the block having already been processed. The merge prediction mode is a mode that uses the prediction parameter having already derived as it is without including the prediction list usage flag predFlagLX (inter prediction identifier inter_pred_idc), reference picture index refIdxLX, and vector mvLX in the coded data. The AMVP mode is a mode that includes the inter prediction identifier inter_pred_idc, reference picture index refIdxLX, and vector mvLX in the coded data. The vector mvLX is coded as the prediction vector index mvp_LX_idx indicating the prediction vector, and the difference vector (mvdLX).

The inter prediction identifier inter_pred_idc is data indicating the types and the number of reference pictures, and has any of values Pred_L0, Pred_L1 and Pred_Bi. Pred_L0 and Pred_L1 indicate use of a reference picture stored in the reference picture list, which is one of lists called the L0 reference list and L1 reference list, respectively. Both cases indicate use of a single reference picture (single prediction). Predictions using the L0 reference list and the L1 reference list are called L0 prediction and L1 prediction, respectively. Pred_Bi indicates use of two reference pictures (bi-prediction), and use of two reference pictures stored in the L0 reference list and the L1 reference list. The prediction vector index mvp_Lx_idx is an index that indicates the prediction vector, and the reference picture index refIdxLX is an index that indicates the reference picture stored in the reference picture list. LX is a description used in the case without discrimination between the L0 prediction and the L1 prediction. Replacement of LX with any of L0 and L1 discriminates the parameter for the L0 reference list and the parameter for the L1 reference list from each other. For example, refIdxL0 is a representation of the reference picture index used for the L0 prediction, refIdxL1 is a representation of the reference picture index used for the L1 prediction, and refIdx (refIdxLX) is a representation of the reference picture index used in the case without discrimination between refIdxL0 and refIdxL1.

The merge index merge_idx is an index indicating what prediction parameter is used as the prediction parameter of the decoding target block among the prediction parameter candidates (merge candidates) derived from blocks having already been processed.

(Motion Vector and Displacement Vector)

Vectors mvLX include a motion vector and a displacement vector (disparity vector). The motion vector is a vector indicating the positional deviation between the position of a block in a picture at a certain display time on a certain layer, and the position of the corresponding block on the picture on the same layer at a different display time (e.g., adjacent discrete time). The displacement vector is a vector indicating the positional deviation between the position of a block in a picture at a certain display time on a certain layer, and the position of the corresponding block on the picture on the different layer at the same display time. The picture on a different layer encompasses the case of a picture at the same resolution but a different quality, the case of a picture in a different viewpoint, and the case of a picture at a different resolution. In particular, a displacement vector corresponding to a picture in a different viewpoint is called a disparity vector. In the following description, in the case where the motion vector and the displacement vector are not discriminated from each other, the vector is simply called the vector mvLX. The prediction vector and the difference vector pertaining to vector mvLX are called the prediction vector mvpLX and the difference vector mvdLX, respectively. It is discriminated whether the vector mvLX and the difference vector mvdLX are motion vectors or displacement vectors, using the reference picture index refIdxLX accompanying the vector.

Each of the parameters having been described above may be separately coded. Alternatively, the parameters may be integrally coded in a complex manner. In the case of integrally coding the parameters in a complex manner, an index is assigned to a combination of parameter values. The assigned index is coded. If a parameter can be derived from another parameter or decoded information, coding of the parameter concerned can be omitted.

[Hierarchical Video Decoding Apparatus]

The configuration of the hierarchical video decoding apparatus 1 according to this embodiment is hereinafter described with reference to FIGS. 19 to 21.

(Configuration of Hierarchical Video Decoding Apparatus)

The configuration of the hierarchical video decoding apparatus 1 according to this embodiment is described. FIG. 19 is a diagram schematically showing the configuration of the hierarchical video decoding apparatus 1 according to this embodiment. The hierarchical video decoding apparatus 1 decodes the hierarchically coded data DATA supplied from the hierarchical video coding apparatus 2 on the basis of the layer ID list LayerIdListTarget of the target layer set LayerSetTarget, which is the decoding target and is included in the hierarchically coded data DATA supplied from the outside, and of target highest temporal identifier HighestTidTarget that designates the highest sub-layer accompanying the decoding target layer, and generates the decoded image POUT#T on each layer included in the target layer set. That is, the hierarchical video decoding apparatus 1 decodes the coded data on pictures on layers in an ascending order from the lowest layer ID to the highest layer ID included in the target layer set, and generates the decoded images (decoded pictures). In other words, the coded data of the pictures on each layer is decoded in the order of the layer ID list LayerIdListTarget[0] . . . LayerIdListTarget[N−1] (N is the number of layers included in the target layer set) of the target layer set.

Figure 19:
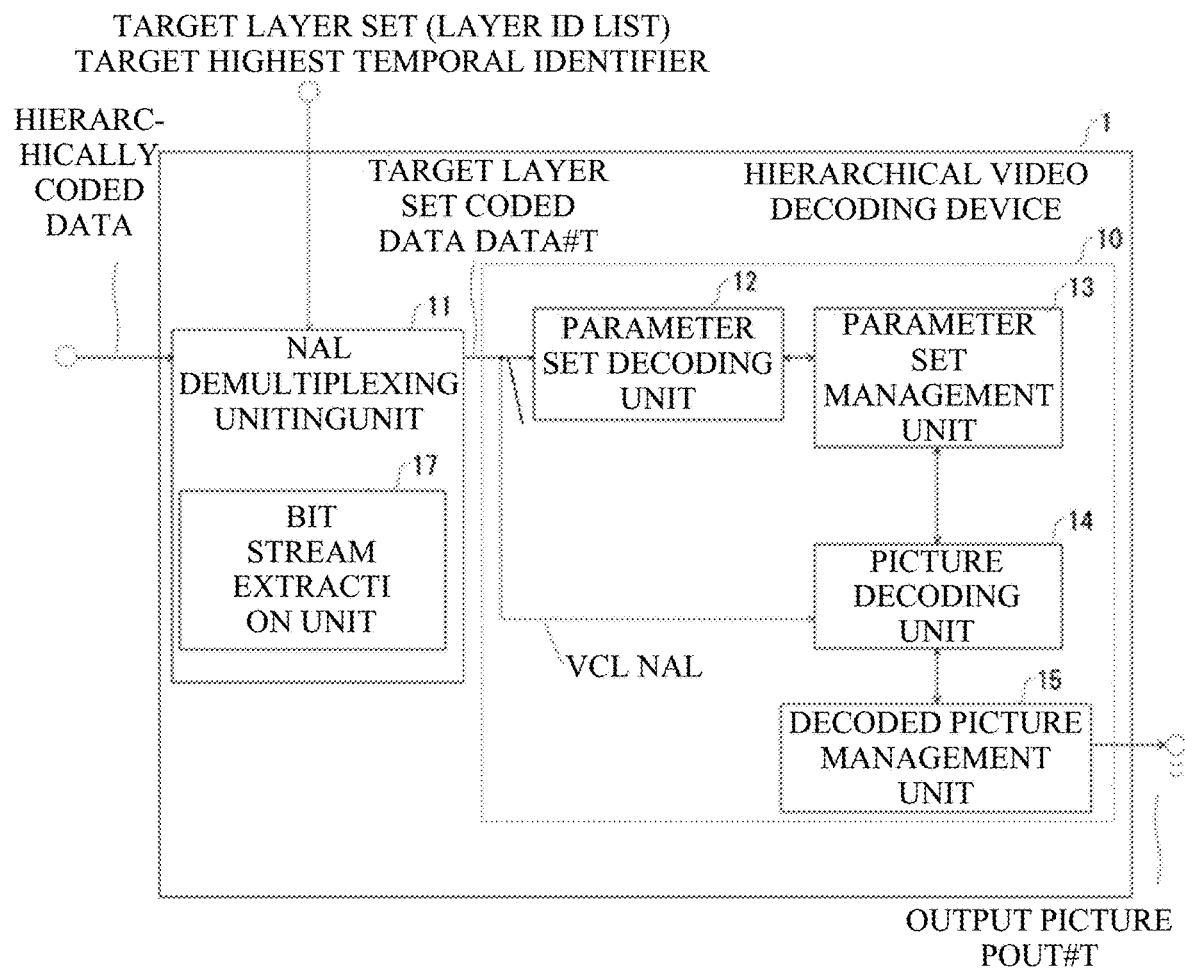
FIG. 19 is a diagram schematically showing a configuration of a hierarchical video decoding apparatus according to this embodiment.

As shown in FIG. 19, the hierarchical video decoding apparatus 1 includes an NAL demultiplexing unit 11, and a target layer set picture decoding unit 10. Furthermore, the target layer set picture decoding unit 10 includes a parameter set decoding unit 12, a parameter set management unit 13, a picture decoding unit 14, and a decoded picture management unit 15. The NAL demultiplexing unit 11 further includes a bit stream extraction unit 17.

The hierarchically coded data DATA includes not only an NAL generated by VCL, but also an NAL that includes parameter sets (VPS, SPS and PPS), SEI and the like. These NALs are called non-VCL NALs (non-VCLs), which are discriminated from VCL NALs.

In a schematic view, the bit stream extraction unit 17 included in the NAL demultiplexing unit 11 performs a bit stream extraction process on the basis of the layer ID list LayerIdListTarget on the layer constituting the target layer set LayerSetTarget supplied from the outside, and of the target highest temporal identifier HighestTidTarget, and extracts, from the hierarchically coded data DATA, the target highest temporal identifier HighestTidTarget and the target layer set coded data DATA#T (BitstreamToDecode) made up of NAL units included in a set (called a target set TargetSet) defined by the layer ID list LayerIdListTarget of the target layer set LayerSetTarget. The details of processes having high relationship with the present disclosure in the bit stream extraction unit 17 are described later.

Subsequently, the NAL demultiplexing unit 11 demultiplexes the target layer set coded data DATA#T (BitstreamToDecode) extracted from the bit stream extraction unit 17, refers to the NAL unit type included in the NAL unit, the layer identifier (layer ID), and the temporal identifier (temporal ID), and supplies the NAL unit included in the target layer set to the target layer set picture decoding unit 10.

The target layer set picture decoding unit 10 supplies the non-VCL NAL to the parameter set decoding unit 12, and supplies the VCL NAL to the picture decoding unit 14, among the NALs included in the supplied target layer set coded data DATA#T. That is, the target layer set picture decoding unit 10 decodes the header (NAL unit header) of the supplied NAL unit, and supplies the non-VCL coded data to the parameter set decoding unit 12 and supplies the VCL coded data to the picture decoding unit 14, together with the decoded NAL unit type, the layer identifier, and the temporal identifier, on the basis of the NAL unit type, the layer identifier and the temporal identifier, which are included in the decoded NAL unit header.

The parameter set decoding unit 12 decodes the input non-VCL NAL to obtain the parameter set, i.e., the VPS, the SPS and the PPS, and supplies the sets to the parameter set management unit 13. The details of processes having high relationship with the present disclosure in the parameter set decoding unit 12 are described later.

The parameter set management unit 13 holds the decoded parameter sets for each of the identifiers of the parameter sets, and thus holds the coding parameters of the parameter sets. More specifically, in the case of the VPS, the VPS coding parameter is held for each VPS identifier (video_parameter_set_id). In the case of the SPS, the SPS coding parameter is held for each SPS identifier (sps_seq_parameter_set_id). In the case of the PPS, the PPS coding parameter is held for each PPS identifier (pps_pic_parameter_set_id).

The parameter set management unit 13 supplies the after-mentioned picture decoding unit 14 with the coding parameter of the parameter set (active parameter set) referred to by the picture decoding unit 14 for picture decoding. More specifically, first, the active PPS is designated by means of the active PPS identifier (slice_pic_parameter_set_id) included in the slice header SH decoded by the picture decoding unit 14. Next, the active SPS is designated by means of the active SPS identifier (pps_seq_parameter_set_id) included in the designated active PPS. Finally, the active VPS is designated by means of the active VPS identifier (sps_video_parameter_set_id) included in the active SPS. Subsequently, the coding parameters of the designated active PPS, active SPS, and active VPS are supplied to the picture decoding unit 14. The designation of the parameter set referred to for picture decoding is also called "activation of the parameter set". For example, designations of the active PPS, active SPS, and active VPS are called "activation of PPS", "activation of SPS" and "activation of VPS", respectively.

The picture decoding unit 14 generates the decoded picture on the basis of the input VCL NAL, the active parameter sets (active PPS, active SPS and active VPS) and the reference picture, and supplies the picture to the decoded picture management unit 15. The supplied decoded picture is recorded in a buffer in the decoded picture management unit 15. The details of the picture decoding unit 14 are described later.

The decoded picture management unit 15 records the input decoded picture in the internal decoded picture buffer (DPB), while generating the reference picture list and determining the output picture. The decoded picture management unit 15 outputs the decoded picture recorded in the DPB, as an output picture POUT#T, at a predetermined timing, to the outside.

(Bit Stream Extraction Unit 17)

The bit stream extraction unit 17 performs the bit stream extraction process on the basis of the layer ID list LayerIdListTarget on the layer constituting the target layer set LayerSetTarget supplied from the outside, and of the target highest temporal identifier HighestTidTarget, and removes (discards), from the input hierarchically coded data DATA, the target highest temporal identifier HighestTidTarget, and NAL units that are not included in a set (called a target set TargetSet) defined by the layer ID list LayerIdListTarget of the target layer set LayerSetTarget, and thus extracts and outputs the target layer set coded data DATA#T (BitstreamToDecode) made up of NAL units included in the target set TargetSet.

Figure 27:
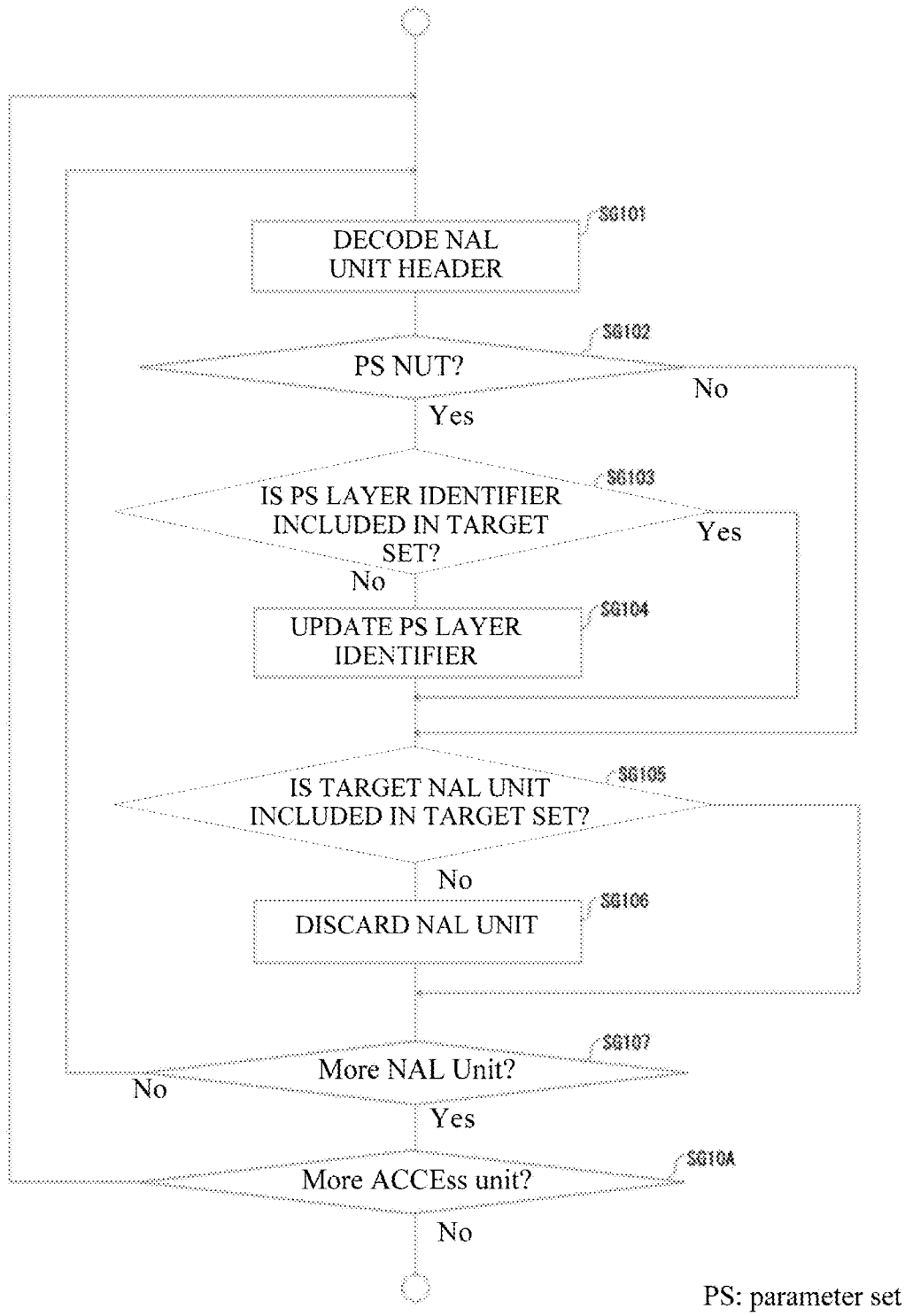
FIG. 27 is a flowchart for illustrating the operation of a bit stream extraction unit according to this embodiment.
Figure 28:
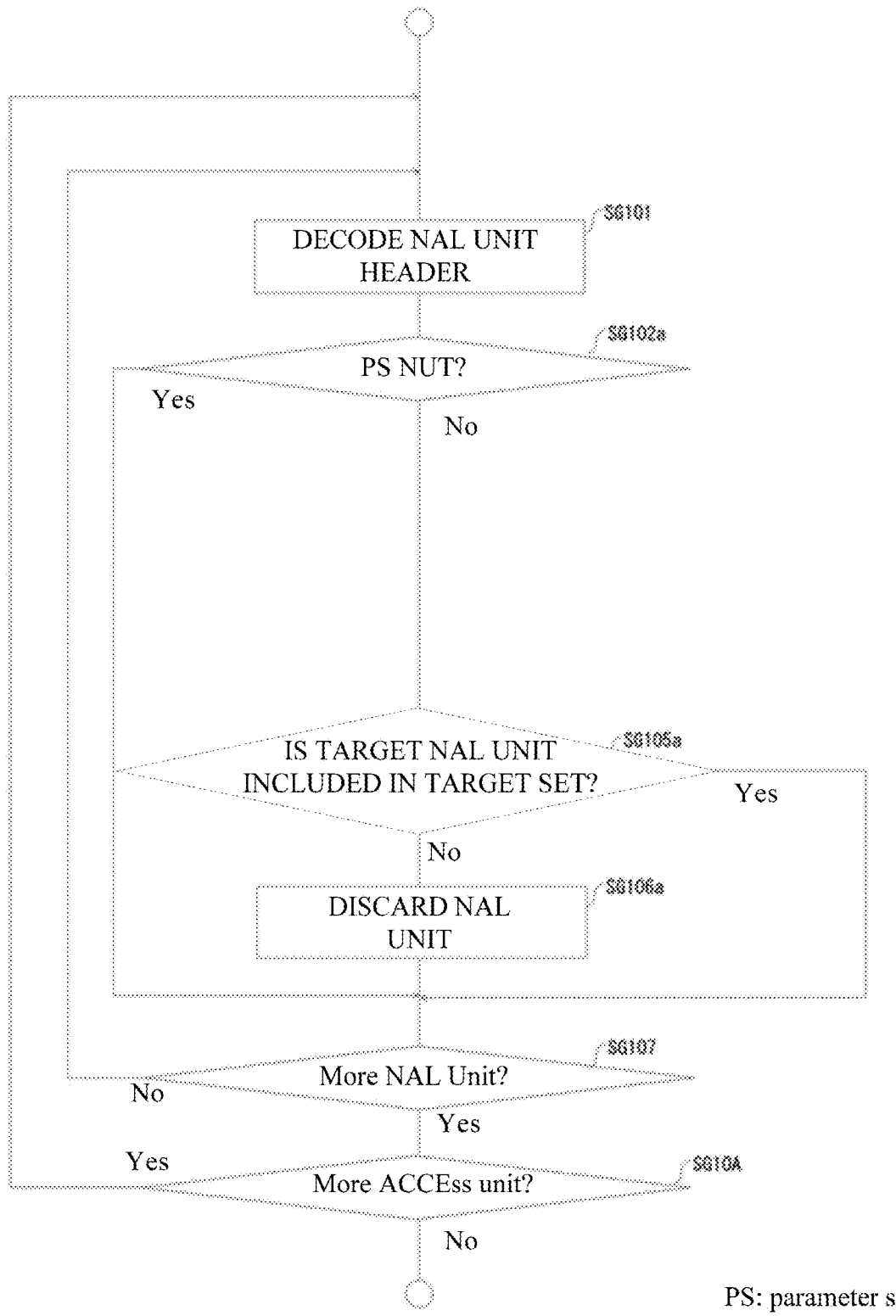
FIG. 28 is a flowchart for illustrating the operation of Variation Example 1 of the bit stream extraction unit according to this embodiment.

Hereinafter, referring to FIG. 27, the schematic operation of the bit stream extraction unit 17 according to this embodiment is described. FIG. 27 is a flowchart showing a bit stream extraction process in units of the access unit in the bit stream extraction unit 17.

(SG101) The bit stream extraction unit 17 decodes the NAL unit header of the supplied target NAL unit according to the syntax table shown in FIG. 6(b). That is, an NAL unit type (nal_unit_type), a layer identifier (nuh_layer_id) and a temporal identifier (nuh_temporal_id_plus1) are decoded. The layer identifier nuhLayerId of the target NAL unit is set in the "nuh_layer_id". The temporal identifier temporalId of the target NAL unit is set in the "nuh_temporal_id_plus1−1".

(SG102) It is determined whether the NAL unit type (nal_unit_type) of the target NAL unit is a parameter set or not on the basis of the "nal_unit_type" and "Name of nal_unit_type" shown in FIG. 7. Here, to satisfy the conformance condition CX1, it is determined whether the NAL unit type is "VPS NUT" (nal_unit_type==32) or not. That is, in the case where the NAL unit type is the video parameter set (YES in SG102), the processing transitions to step SG103. In the other case (No in SG102), the processing transitions to step SG105.

(SG103) It is determined whether the layer identifier of the target NAL unit is included in the target set or not. More specifically, it is determined whether or not a value identical to the layer identifier of the target NAL unit is in the layer ID list LayerIdListTarget of the layer constituting the target layer set LayerSetTarget. In the case where the layer identifier of the target NAL unit is in LayerIdListTarget (YES in SG103), the processing transitions to step SG105. In the other case (No in SG103), that is, in the case where the layer identifier of the target NAL unit is not in LayerIdListTarget, the processing transitions to step SG104.

(SG104) The layer identifier of the target NAL unit is updated to the lowest layer identifier in the LayerIdListTarget. That is, the identifier is updated to "nuh_layer_id=LayerIdListTarget[0]".

(SG105) It is determined whether or not the layer identifier of the target NAL unit and the temporal identifier are included in the target set TargetSet, on the basis of the layer ID list LayerIdListTarget of the layer constituting the target layer set LayerSetTarget, and of the target highest temporal identifier. More specifically, it is determined whether the following conditions (1) to (2) are satisfied or not. In the case where at least any of the conditions is satisfied (true) (YES in SG105), the processing transitions to step SG106. In the other case (No in SG105), the processing transitions to step SG107.

(1) In the case "a value identical to the layer identifier of the target NAL unit is in the layer ID list LayerIdListTarget of the layer constituting the target layer set LayerSetTarget", it is determined to be true. In the other case (the value identical to the layer identifier of the target NAL unit is not in the layer ID list LayerIdListTarget of the layer constituting the target layer set LayerSetTarget), it is determined to be false.

(2) In the case "the temporal identifier of the target NAL unit is equal to or less than the target highest temporal identifier HighestTidTarget", it is determined to be true. In the other case (the temporal identifier of the target NAL unit is greater than the target highest temporal identifier HighestTidTarget), it is determined to be false.

(SG106) The target NAL unit is discarded. That is, as the target NAL unit is not included in the target set TargetSet, the bit stream extraction unit 17 removes the target NAL unit from the input hierarchically coded data DATA.

(SG107) It is determined whether any unprocessed NAL unit is in the same access unit or not. In the case where any unprocessed NAL unit is present (YES in SG107), the processing transitions to step SG101 to continue the bit stream extraction in units of the NAL unit constituting the target access unit. In the other case (No in SG107), the processing transitions to step SG10A.

(SG10A) It is determined whether the access unit next to the target access unit is in the input hierarchically coded data DATA or not. In the case where the next access unit is present (YES in SG10A), the processing transitions to step SG101 to continue the process for the next access unit. In the case where the next access unit is absent (No in SG10A), the bit stream extraction process is finished.

The operation of the bit stream extraction unit 17 according to Embodiment 1 has thus been described above. The steps are not limited to the above steps. Alternatively, the steps may be changed in an implementable range.

The bit stream extraction unit 17, which has been described above, performs the bit stream extraction process on the basis of the layer ID list LayerIdListTarget on the layer constituting the target layer set LayerSetTarget supplied from the outside, and of the target highest temporal identifier HighestTidTarget, and removes (discards), from the input hierarchically coded data DATA, the target highest temporal identifier HighestTidTarget, and NAL units that are not included in a set (called a target set TargetSet) defined by the layer ID list LayerIdListTarget of the target layer set LayerSetTarget, and thus extracts and outputs the target layer set coded data DATA#T (BitstreamToDecode) made up of NAL units included in the target layer set TargetSet. Furthermore, the bit stream extraction unit 17 is characterized in that, in the case where the layer identifier of the video parameter set is not included in the target set TargetSet, this extractor updates (rewrites) the layer identifier of the video parameter set to the lowest layer identifier in the target set TargetSet.

The operation of the bit stream extraction unit 17 assumes "the AU constituting the input hierarchically coded data DATA includes one (at the maximum) VPS having the lowest layer identifier in the AU". However, the operation is not limited thereto. For example, a VPS having a layer identifier other than the lowest layer identifier in the AU may be included in the AU. In this case, the bit stream extraction unit 17 may regard the VPS of the layer identifier to be updated as what is a layer identifier that is not included in the target set TargetSet and is the lowest layer identifier, in step SG104. Typically, since the VPS having the layer identifier "nuhLayerId=0" is the VPS having the lowest layer identifier, this VPS is regarded as that to be updated, and the other VPSs that are not included in the target set TargetSet are discarded.

Consequently, the bit stream extraction unit 17 according to this embodiment described above can prevent the problem in that the VPS is not included in the layer set in the bit stream after bit stream extraction. That is, it can prevent occurrence of the layer that cannot be decoded on the bit stream that is generated through the bit stream extraction process from the bit stream on a certain layer set and only includes the layer set of a sub-set of the layer set.

(Parameter Set Decoding Unit 12)

The parameter set decoding unit 12 decodes the input target layer set coded data to obtain the parameter sets (VPS, SPS and PPS) to be used to decode the target layer set. The coding parameters of the decoded parameter sets are supplied to the parameter set management unit 13, and recorded with respect to the identifier of each parameter set.

Typically, the parameter set is decoded on the basis of a predetermined syntax table. That is, a bit sequence is read from the coded data according to the procedures defined in the syntax table, and decoded to obtain the syntax value of the syntax included in the syntax table. A variable may be derived on the basis of the decoded syntax value and included into the parameter set to be output, if necessary. Consequently, the parameter set output from the parameter set decoding unit 12 can be represented as the syntax value of the syntax pertaining to the parameter sets (VPS, SPS and PPS) included in the coded data, and a set of variables derived from the syntax value.

Hereinafter, the syntax table having high relationship with the present disclosure among syntax tables used for decoding in the parameter set decoding unit 12 is mainly described.

(Video Parameter Set VPS)

The video parameter set VPS is a parameter set for defining the parameters common to multiple layers, and includes the VPS identifier for identifying each VPS, and information on the maximum number of layers, layer set information, and inter-layer dependence information, as layer information.

The VPS identifier is an identifier for identifying each VPS, and included in the VPS as the syntax "video_parameter_set_id" (SYNVPS01 in FIG. 12). The VPS identified by the active VPS identifier (sps_video_parameter_set_id) included in the after-mentioned SPS is referred to during a process of decoding the coded data on the target layer in the target layer set.

The information on the maximum number of layers is information that indicates the maximum number of layers in the hierarchically coded data, and is included as the syntax "vps_max_layers_minus1" (SYNVPS02 in FIG. 12)" in the VPS. The maximum number of layers in the hierarchically coded data (hereinafter, the maximum number of layers MaxNumLayers) is set to a value of (vps_max_layers_minus1+1). The maximum number of layers defined here is the maximum number of layers pertaining not to temporal scalability but to other scalabilities (SNR scalability, spatial scalability, view scalability, etc.).

The information on the maximum number of sub-layers is information that indicates the maximum number of sub-layers in the hierarchically coded data, and is included as the syntax "vps_max_sub_layers_minus1" (SYNVPS03 in FIG. 12)" in the VPS. The maximum number of sub-layers in the hierarchically coded data (hereinafter, the maximum number of sub-layers MaxNumSubLayers) is set to a value of (vps_max_sub_layers_minus1+1). The maximum number of sub-layers defined here is the maximum number of layers pertaining to the temporal scalability.

The maximum layer identifier information is information that indicates the layer identifier (layer ID) of the highest layer included in the hierarchically coded data, and is included as the syntax "vps_max_layer_id" (SYNVPS04 in FIG. 12) in the VPS. In other words, the information is the maximum value of the layer ID (nuh_layer_id) of the NAL unit included in the hierarchically coded data.

The information on the number of layer sets is information that indicates the total number of layer sets in the hierarchically coded data, and is included as the syntax "vps_num_layer_sets_minus1" (SYNVPS05 in FIG. 12)" in the VPS. The number of layer sets in the hierarchically coded data (hereinafter, the number of layer sets NumLayerSets) is set to a value of (vps_num_layer_sets_minus1+1).

The layer set information is a list that represents a set of layers constituting a layer set included in the hierarchically coded data (hereinafter, layer ID list LayerSetLayerIdList), and is decoded from the VPS. The VPS includes the syntax indicating whether the j-th layer (layer identifier nunLayerIdJ) is included in the i-th layer set or not "layer_id_included_flag[i][j]" (SYNVPS06 in FIG. 12). The layer set is made up of layers having a layer identifier with a syntax value of one. That is, the layer j constituting the layer set i is included in the layer ID list LayerSetLayerIdList[i].

A VPS extension data presence/absence flag "vps_extension_flag" (SYNVPS07 in FIG. 12) is a flag representing whether the VPS further includes the VPS extension data vps_extension( ) or not (SYNVPS08 in FIG. 12). In this Description, in the case of describing "flag indicating whether to be XX or not" or "XX presence/absence flag", one is regarded as the case of presence of XX, and zero is regarded as the case of absence of XX. In logical negation, logical multiplication or the like, one is treated as true, and zero is treated as false (the same applies hereafter). Note that an actual apparatus and method may use another value as the true value or the false value.

The inter-layer dependence information is decoded from the VPS extension data (vps_extension( ) included in the VPS. The inter-layer dependence information included in the VPS extension data is described with reference to FIG. 13. FIG. 13 shows a part that is of the syntax table referred to during VPS extension decoding and pertains to the inter-layer dependence information.

The VPS extension data (vps_extension( ) includes direct dependency flag "direct_dependency_flag[i][j]" (SYNVPS0A in FIG. 13) as the inter-layer dependence information. The direct dependency flag direct_dependency_flag[i][j] represents whether the i-th layer directly depends on the j-th layer or not. In the case of direct dependence, the flag has a value of one. In the case without direct dependence, the flag has a value of zero. Here, the case where the i-th layer directly depends on the j-th layer and the case where the i-th layer is regarded as the target layer to be subjected to the decoding process means that there is a possibility that the parameter set pertaining to the j-th layer, the decoded picture, and the related decoded syntax are directly referred to by the target layer. On the contrary, the case where the i-th layer does not directly depend on the j-th layer and the case where the i-th layer is regarded as the target layer to be subjected to the decoding process means that there is a possibility that the parameter set pertaining to the j-th layer, the decoded picture, and the related decoded syntax are not directly referred to. In other words, when the direct dependency flag of the i-th layer to the j-th layer is one, the j-th layer can be a direct reference layer of the i-th layer. A set of layers that can be a direct reference layer to a certain layer, that is, a set of layers with the corresponding direct dependency flag having a value of one, is called a direct dependency layer set. The layer with i=0, i.e., the 0-th layer (basic layer) has no direct dependency relationship with the j-th layer (extended layer). Consequently, the direct dependency flag "direct_dependency_flag[i][j]" has a value of zero. As indicated such that the i-loop including SYNVPS0A in FIG. 13 starts at one, decoding/coding of the direct dependency flag of the j-th layer (extended layer) to the 0-th layer (basic layer) may be omitted.

Here, the reference layer ID list RefLayerId[iNuhLId][ ] that indicates the direct reference layer set to the i-th layer (layer identifier iNuhLId=nunLayerIdI), and the direct reference layer IDX list DirectRefLayerIdx[iNuhLId][ ] that represents the sequential number of the element in an ascending order of the j-th layer that is the reference layer of the i-th layer in the direct reference layer set are derived by the following expression. The reference layer ID list RefLayerId[ ][ ] is a two-dimensional array. In the first array element, the layer identifier of the target layer (layer i) is stored. In the second array element, the layer identifier of the k-th reference layer in an ascending order in the direct reference layer set is stored. The direct reference layer IDX list DirectRefLayerIdx[ ][ ] is a two-dimensional array. In the first array element, the layer identifier of the target layer (layer i) is stored. In the second array element, the index (direct reference layer IDX) that represents the sequential number of the element in an ascending order of the layer identifier in the direct reference layer set is stored.

The reference layer ID list, and the direct reference layer IDX list are derived according to the following pseudocode. The layer identifier nuhLayerId of the i-th layer is represented according to the syntax "layer_id_in_nuh[i]" (not shown in FIG. 13) on the VPS. Hereinafter, to shorten the representation of the layer identifier of the i-th layer "layer_id_in_nuh[i]", it is represented as "nuhLId#i". In the case of layer_id_in_nuh[j], "nuhLId#j". The array NumDirectRefLayers[ ] represents the number of direct reference layers referred to by the layer having the layer identifier iNuhLId.

(Derivation of Reference Layer ID List and Direct Reference Layer IDX List)

The reference layer ID list, and the direct reference layer IDX list are derived according to the following pseudocode.

```
for(i=0; i< vps_max_layers_minus1+1; i++){
  iNuhLId = nuhLId#i;
  NumDirectRefLayers[iNuhLId] = 0;
  for(j=0; j<i; j++){
    if( direct_dependency_flag[i][j]){
      RefLayerId[iNuhLId][NumDirectRefLayers[iNuhLId]] = nuhLId#j;
      NumDirectRefLayers[iNuhLId]++;
      DirectRefLayerIdx[iNuhLId][nuhLId#j]=
      NumDirectRefLayers[iNuhLId] - 1;
    }
  } // end of loop on for(j=0; j<i; i++)
} // end of loop on for(i=0; i< vps_max_layers_minus1+1; i++)
```

The pseudocode can be represented in steps as follows.

(SL01) The start point of a loop pertaining to derivation of the reference layer ID list pertaining to the i-th layer, and the direct reference layer IDX list. Before the loop is started, the variable i is initialized to zero. The process in the loop is executed when the variable i is less than the number of layers "vps_max_layers_minus1+1". The variable i is incremented by "1" every time the process in the loop is executed one time.

(SL02) The layer identifier nuhLID#i of the i-th layer is set in the variable iNuhLid. Furthermore, the number of direct reference layers NumDirectRefLayers[iNuhLID] of the layer identifier nuhLID#i is set to zero. (SL03) The start point of a loop pertaining to addition of elements on the j-th layer to the reference layer ID list pertaining to the i-th layer and the direct reference layer IDX list. Before the loop is started, the variable j is initialized to zero. The process in the loop is executed when the variable j (j-th layer) is less than that of the i-th layer (j<i). The variable j is incremented by "1" every time the process in the loop is executed one time.

(SL04) The direct dependency flag (direct_dependency_flag[i][j]) of the j-th layer to the i-th layer is determined. When the direct dependency flag is one, the processing transitions to step SL05 to execute the processes in steps SL05 to SL07. When the direct dependency flag is zero, the processing transitions to step SL0A, skipping the processes in steps SL05 to SL07.

(SL05) The layer identifier nuhLID#j is set in the (NumDirectRefLayers[iNuhLId])-th element of the reference layer ID list RefLayerId[iNuhLId][ ]. That is, RefLayerId[iNuhLId][NumDirectRefLayers[iNuhLId]]=nuhLId#j;

(SL06) The value of the number of direct reference layers NumDirectRefLayers[iNuhLId] is incremented by "1". That is, NumDirectRefLayers[iNuhLId]++;

(SL07) A value "the number of direct reference layers−1" is set, as the direct reference layer index (direct reference layer IDX), to the (nuhLId#i)-th element of the direct reference layer IDX list DirectRefLayerIdx[iNuhLid][ ]. That is, DirectRefLayerIdx[iNuhLId][nuhLId#j]=NumDirectRefLayers[iNuhLId]−1;

(SL0A) The end point of the loop pertaining to addition of elements on the j-th layer to the reference layer ID list pertaining to the i-th layer and the direct reference layer IDX list.

(SL0B) The end point of the loop pertaining to derivation of the reference layer ID list on the i-th layer, and the direct reference layer IDX list.

Through use of the reference layer ID list and direct reference layer IDX list, which have been described above, the sequential number of the element (direct reference layer IDX) indicated by the layer ID of the k-th layer of the direct reference layer set among all the layers, and conversely, the sequential number of the element indicated by the direct reference layer IDX in the direct reference layer set can be grasped. The deriving procedures are not limited to the aforementioned steps, and may be changed in an implementable range.

The inter-layer dependence information contains the syntax "direct_dependency_len_minusN" (layer dependency type bit length) (SYNVPS0C in FIG. 13) that indicates the after-mentioned layer dependency type (direct_dependency_type[i][j]) bit length M. Here, N is a value defined by the total number of kinds of layer dependency types, and is an integer of at least two. The maximum amount of the bit length M is, for example, 32. Provided that N=2, the range of direct_dependency_type[i][j] is from 0 to (2^32−2). More generally, according to representation with N defined by the bit length M and the total number of layer dependency types, the range of direct_dependency_type[i][j] is from 0 to (2^M−N).

The inter-layer dependence information contains the syntax "direct_dependency_type[i][j]" (SYNVPS0D in FIG. 13) that indicates the layer dependency type indicating the reference relationship between the i-th layer and the j-th layer. More specifically, when the direct dependency flag direct_dependency_flag[i][j] is one, each bit value of the layer dependency type (DirectDepType[i][j]=direct_dependency_type[i][j]+1) indicates the presence/absence flag of the kind of layer dependency type on the j-th layer, which is the reference layer to the i-th layer. For example, the presence/absence flags of the kinds of the layer dependency types include the presence/absence flag of the inter-layer image prediction (SamplePredEnabledFlag; inter-layer image prediction presence/absence flag), the presence/absence flag of the inter-layer motion prediction (MotionPredEnabledFlag; inter-layer motion prediction presence/absence flag), and the presence/absence flag of the non-VCL dependency (NonVCLDepEnabledFlag; non-VCL dependency presence/absence flag). The presence/absence flag of the non-VCL dependency indicates presence or absence of the inter-layer dependency relationship pertaining to the header information (parameter sets of SPS, PPS, etc.) included in the non-VCL NAL unit. For example, the presence or absence of the sharing of the parameter set between layers (shared parameter set), which will be described later, and the presence or absence of a part of the syntax prediction in the parameter set between layers (e.g., scaling list information (quantization matrix) etc.) (also called syntax prediction between parameter sets, or prediction between parameter sets) are included. The value coded according to the syntax "direct_dependency_type[i][j]" is the value of layer dependency type−1, i.e., the value of "DirectDepType[i][j]−1" in the example of FIG. 14.

Figure 14A:
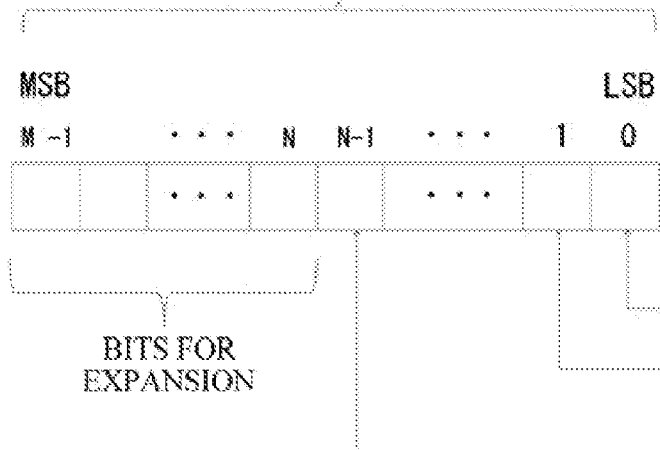
FIG. 14a & FIG. 14b are diagrams showing a layer dependency type according to this embodiment.
Figure 14B:
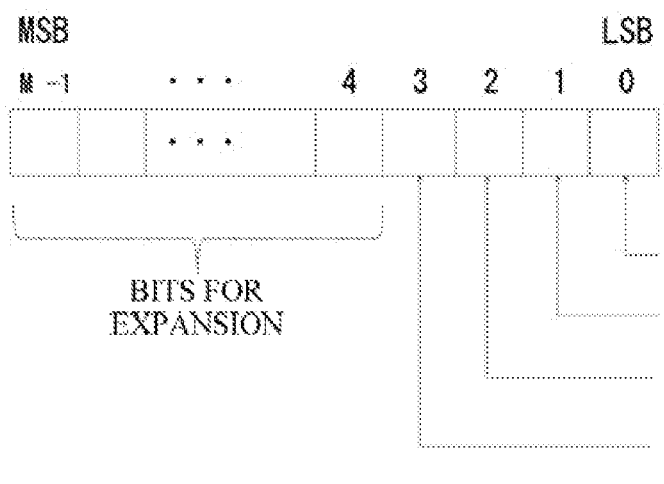

Here, FIG. 14(*a*) shows an example of the correspondence between the value of the layer dependency type according to this embodiment (DirectDepType[i][j]=direct_dependency_type[i][j]+1), and the kinds of layer dependency types. As shown in FIG. 14(*a*), the value of the least significant bit (0 bit) of the layer dependency type indicates the presence or absence of the inter-layer image prediction. The value of the first bit next to the least significant bit indicates the presence or absence of the inter-layer motion prediction. The value of (N−1)-th bit subsequent to the least significant bit indicates the presence or absence of the non-VCL dependency. Each of bits between the N-th bit from the least significant bit and the most significant bit ((M−1)-th bit) are bits for extension of the dependency type.

The presence/absence flag of each layer dependency type on the reference layer j to the target layer i (layer identifier iNuhLId=nunLayerIdI) is derived by the following expression.

SamplePredEnabledFlag[iNuhLId][j]=((direct_dependency_type[i][j]+1) & 1);
MotionPredEnabledFlag[iNuhLId][j]=((direct_dependency_type[i][j]+1) & 2)>>1;
NonVCLDepEnabledFlag [iNuhLid][j]=((direct_dependency_type[i][j]+1) & (1<<(N−1)))>>(N−1);

Alternatively, through use of the variable DirectDepType[i][j] instead of (direct_dependency_type[i][j]+1), representation according to the following expression can be made.
SamplePredEnabledFlag[iNuhLId][j]=((DirectDepType[i][j]) & 1);
MotionPredEnabledFlag[iNuhLId][j]=((DirectDepType[i][j]) & 2)>>1;
NonVCLDepEnabledFlag [iNuhLid][j]=((DirectDepType[i][j]) & (1<<(N−1)))>>(N−1);

In the example of FIG. 14(*a*), the (N−1)-th bit is configured to be the non-VCL dependency type (non-VCL dependency presence/absence flag). However, the configuration is not limited thereto. For example, it may be configured so that N=3, and the second bit from the least significant bit can be configured to be a bit representing the presence or absence of the non-VCL dependency type. The position of bit representing the presence/absence flag for each dependency type may be changed within an implementable range. Each presence/absence flag may be derived according to the aforementioned derivation of the reference layer ID list and the direct reference layer IDX list, which is adopted as step SL08 and executed. The deriving procedures are not limited to the aforementioned steps, and may be changed in an implementable range.

(Derivation of Indirect Dependency Flag and Dependency Flag)

Figure 31:
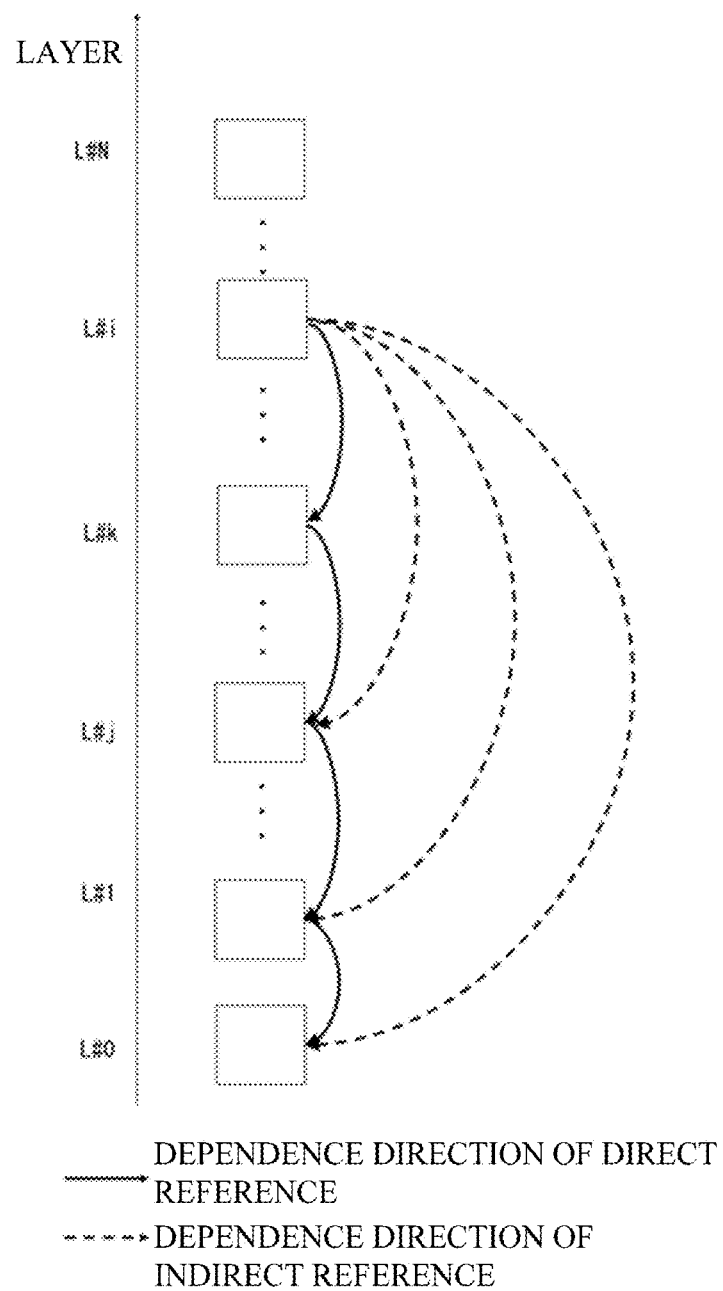
FIG. 31 is a diagram for illustrating indirect reference layers.

Here, the indirect dependency flag (IndirectDependencyFlag[i][j]) that represents the dependency relationship on whether the i-th layer indirectly depends on the j-th layer or not (whether the j-th layer is the indirect reference layer of the i-th layer or not) can be derived from the after-mentioned pseudocode with reference to the direct dependency flag (direct_dependency_flag[i][j]). Likewise, the dependency flag (DependencyFlag[i][j]) that represents the dependency relationship on whether the i-th layer directly depends on the j-th layer (when the direct dependency flag is one, the j-th layer is also called the direct reference layer of the i-th layer) or whether the layer indirectly depends thereon or not (when the indirect dependency flag is one, the j-th layer is also called the indirect reference layer of the i-th layer) can be derived from the after-mentioned pseudocode with reference to the direct dependency flag (direct_dependency_flag[i][j]) and the indirect dependency flag (IndirectDepdendencyFlag[i][j]). Here, referring to FIG. 31, the indirect reference layer is described. In FIG. 31, the number of layers is N+1. The j-th layer (L#j in FIG. 31; called layer j) is lower layer than the i-th layer (L#i in FIG. 31; called layer i) (j<i). It is also assumed that there is a layer k that is higher than the layer j and lower than the layer i (L#k in FIG. 31) (j<k<i). In FIG. 31, the layer k is directly depends on the layer j (a solid-line arrow in FIG. 31; the layer j is the direct reference layer of the layer k direct_dependency_flag[k][j]=1), and the layer i directly depends on the layer k (the layer k is the direct reference layer of the layer j direct_dependency_flag[i][k]==1). Here, the layer i indirectly depends on the layer j through the layer k (a broken arrow in FIG. 31). Consequently, the layer j is called the indirect reference layer of the layer i. In other words, in the case where the layer i depends on the layer j through one or more layers k (i<k<j), the layer j is the indirect reference layer of the layer i.

The indirect dependency flag IndirectDependencyFLag[i][j] represents whether the i-th layer indirectly depends on the j-th layer or not. In the case of indirect dependence, the flag has a value of one. In the case without indirect dependence, the flag has a value of zero. Here, the case where the i-th layer indirectly depends on the j-th layer and the i-th layer is regarded as the target layer to be subjected to the decoding process means that there is a possibility that the parameter set pertaining to the j-th layer, the decoded picture, and the related decoded syntax are indirectly referred to by the target layer. On the contrary, the case where the i-th layer does not indirectly depend on the j-th layer and the i-th layer is regarded as the target layer to be subjected to the decoding process means that there is a possibility that the parameter set pertaining to the j-th layer, the decoded picture, and the related decoded syntax are not indirectly referred to. In other words, when the indirect dependency flag of the i-th layer to the j-th layer is one, the j-th layer can be an indirect reference layer of the i-th layer. A set of layers that can be an indirect reference layer to a certain layer, that is, the set of layers with the corresponding indirect dependency flag having a value of one, is called an indirect dependency layer set. The layer with i=0, i.e., the 0-th layer (basic layer) has no indirect dependency relationship with the j-th layer (extended layer). Consequently, the indirect dependency flag "IndirectDepedencyFlag[i][j]" has a value of zero. Derivation of the indirect dependency flag of the j-th layer (extended layer) to the 0-th layer (basic layer) can be omitted.

The dependency flag DependencyFLag[i][j] represents whether the i-th layer depends on the j-th layer or not. In the case of dependence, the flag has a value of one. In the case without dependence, the flag has a value of zero. Reference and dependency pertaining to the dependency flag DependencyFLag[i][j] include both of direct and indirect manners (direct reference, indirect reference, direct dependency, and indirect dependency), if not otherwise specified. Here, the case where the i-th layer depends on the j-th layer and the i-th layer is regarded as the target layer to be subjected to the decoding process means that there is a possibility that the parameter set pertaining to the j-th layer, the decoded picture, and the related decoded syntax are referred to by the target layer. On the contrary, the case where the i-th layer does not depend on the j-th layer and the i-th layer is regarded as the target layer to be subjected to the decoding process means that the parameter set pertaining to the j-th layer, the decoded picture, and the related decoded syntax are not referred to. In other words, when the dependency flag of the i-th layer to the j-th layer is one, the j-th layer can be a direct reference layer or an indirect reference layer of the i-th layer. A set of layers that can be a direct reference layer or an indirect reference layer to a certain layer, that is, the set of layers with the corresponding dependency flag having a value of one, is called a dependency layer set. The layer with i=0, i.e., the 0-th layer (basic layer) has no dependency relationship with the j-th layer (extended layer). Consequently, the dependency flag "DependencyFLag[i][j]" has a value of zero. Derivation of the dependency flag of the j-th layer (extended layer) to the 0-th layer (basic layer) can be omitted.

```
(Pseudocode)

for(i=0; i< vps_max_layers_minus1+1; i++){
for(j=0; j<i; j++){
IndirectDependencyFlag[i][j] = 0;
        DependencyFlag[i][j] = 0;
        for(k=j+1; k<i; k++){
        if(     direct_dependency_flag[k][j]      &&      direct_dependency_flag[i][k]
&& !direct_dependency_flag[i][j]){
        IndirectDependencyFlag[i][j] = 1;
        }
        }
        DependencyFlag[i][j]           =           (direct_dependency_flag[i][j]         |
IndirectDependencyFlag[i][j]);
        } // end of loop on for(j=0; j<i; i++)
        } // end of loop on for(i=0; i< vps_max_layers_minus1+1; i++)
```

The pseudocode can be represented in steps as follows.

(SN01) The start point of a loop pertaining to derivation of the indirect dependency flag and the dependency flag that pertain to the i-th layer. The variable i is initialized to zero before the loop starts. The process in the loop is executed when the variable i is less than the number of layers "vps_max_layers_minus1+1". The variable i is incremented by "1" every time the process in the loop is executed one time.

(SN02) The start point of a loop pertaining to derivation of the indirect dependency flag and the dependency flag that pertain to the i-th layer and the j-th layer. Before the loop is started, the variable j is initialized to zero. The process in the loop is executed when the variable j (j-th layer) is less than that of the i-th layer (j<i). The variable j is incremented by "1" every time the process in the loop is executed one time.

(SN03) The value of the j-th element of the indirect dependency flag lndirectDependencyFLag[i][ ] is set to zero. The value of the j-th element of the dependency flag DependencyFLag[i][ ] is set to zero. That is, IndirectDependencyFlag[i][j]=0, and DependencyFlag[i][j]=0.

(SN04) The start point of a loop for searching for whether the j-th layer is the indirect reference layer of the i-th layer or not. Before the loop is started, the variable k is initialized to "j+1". The process in the loop is executed when the variable k has a value less than the variable i. The variable k is incremented by "1" every time the process in the loop is executed one time.

(SN05) To determine whether the j-th layer is the i-th indirect reference layer, the following conditions (1) to (3) are determined.

(1) It is determined whether the j-th layer is the k-th direct reference layer. More specifically, when the direct dependency flag (direct_dependency_flag[k][j]) of the j-th layer to the k-th layer is one, it is determined to be true (direct reference layer), and when the direct dependency flag is zero (not direct reference layer), it is determined to be false.

(2) It is determined whether the k-th layer is the i-th direct reference layer. More specifically, when the direct dependency flag (direct_dependency_flag[i][k]) of the k-th layer to the i-th layer is one, it is determined to be true (direct reference layer), and when the direct dependency flag is zero (not direct reference layer), it is determined to be false.

(3) It is determined whether the j-th layer is not the i-th direct reference layer. More specifically, when the direct dependency flag (direct_dependency_flag[i][j]) of the j-th layer to the i-th layer is zero (not direct reference layer), it is determined to be true, and when the direct dependency flag is one (direct reference layer), it is determined to be false.

In the case where all of the conditions (1) to (3) are true (i.e., the direct dependency flag of the j-th layer to the k-th layer direct_dependency_flag[k][j] is one, and the direct dependency flag of the k-th layer to the i-th layer direct_dependency_flag[i][k] is one, and the direct dependency flag of the j-th layer to the i-th layer direct_dependency_flag[i][j] is zero), the processing transitions to step SN06. In the other cases (at least any one of the conditions (1) to (3) is false, i.e., the direct dependency flag of the j-th layer to the k-th layer direct_dependency_flag[k][j] is zero, or the direct dependency flag of the k-th layer to the i-th layer direct_dependency_flag[i][k] is zero, or the direct dependency flag of the j-th layer to the i-th layer direct_dependency_flag[i][j] is one), the processing transitions to step SN07, skipping the process in step SN06.

(SN06) In the case where all the conditions (1) to (3) are true, the j-th layer to the i-th layer is determined as the indirect reference layer, and the value of the j-th element of the indirect dependency flag IndirectDependencyFlag[i][ ] is set to one. That is, IndirectDependencyFlag[i][j]=1.

(SN07) The end point of the loop for searching for whether the j-th layer is the indirect reference layer of the i-th layer or not.

(SN08) On the basis of the direct dependency flag (direct_dependency_flag[i][j]), and the indirect dependency flag (IndirectDependencyFlag[i][j]), the value of the dependency flag (DependencyFlag[i][j]) is set. More specifically, the value of the logical sum of the value of the direct dependency flag (direct_dependency_flag[i][j]) and the value of the indirect dependency flag (direct_dependency_flag[i][j]) is adopted as the value of the dependency flag (DependencyFlag[i][j]). That is, derivation is made according to the following expression. In the case where the value of the direct dependency flag is one or the value of the indirect dependency flag is one, the value of the dependency flag is one. In the other cases (the value of the direct dependency flag is zero and the value of the indirect dependency flag is zero), the value of the dependency flag is zero. The following deriving expression is only one example, and can be changed in the range where the value set by the dependency flag is the same.

DependencyFlag[i][j]=(direct_dependency_flag[i][j]|IndirectDependencyFlag[i][j]);

(SN0A) The end point of the loop pertaining to derivation of the indirect dependency flag and the dependency flag that pertain to the i-th layer and the j-th layer.

(SN0B) The end point of the loop pertaining to derivation of the indirect dependency flag and the dependency flag that pertain to the i-th layer.

As described above, the indirect dependency flag (IndirectDependencyFlag[i][j]) representing the dependency relationship where the i-th layer indirectly depends on the j-th layer is thus derived, which allows grasping whether the j-th layer is the indirect reference layer of the i-th layer.

The dependency flag (DependencyFlag[i][j]) representing the dependency relationship in the case where the i-th layer depends on the j-th layer (the direct dependency flag is one or the indirect dependency flag is one) is derived, which allows grasping whether the j-th layer is the direct reference layer or the indirect reference layer of the i-th layer. The deriving procedures are not limited to the aforementioned steps, and may be changed in an implementable range. For example, the indirect dependency flag, and the dependency flag may be derived by the following pseudocode.

(SO03) The start point of a loop that searches for whether the layer j is the indirect reference layer of the layer i or not. Before the loop is started, the variable j is initialized to zero. The process in the loop is executed when the variable j (layer j) is less than that of the layer k (j<k). The variable j is incremented by "1" every time the process in the loop is executed one time.

(SO04) To determine whether the layer j is the indirect reference layer of the layer i, the following conditions (1) to (3) are determined.

(1) It is determined whether the layer j is the direct reference layer or the indirect reference layer of the layer k. More specifically, when the direct dependency flag (direct_dependency_flag[k][j]) of the layer j to the layer k is one or the indirect dependency flag (IndirectDependencyFlag[k][j]) of the layer j to the layer k is one, it is determined to be true (the direct reference layer or the indirect reference layer). When the direct dependency flag is zero (not direct reference layer) and the indirect dependency flag is zero (not indirect reference layer), it is determined to be false.

(2) It is determined whether the layer k is the direct reference layer of the layer i. More specifically, when the direct dependency flag (direct_dependency_flag[i][k]) of the

```
(Pseudocode)

// derive indirect reference layers of layer i
for(i=2; i< vps_max_layers_minus1+1; i++){
for(k=1; k<i; k++){
for(j=0; j<k; j++){
if( (direct_dependency_flag[k][j] || IndirectDependencyFlag[k][j])
direct_dependency_flag[i][k] && !direct_dependency_flag[i][j]){
IndirectDependencyFlag[i][j] = 1;
}
} // end of loop on for(j=0; j<k; j++)
} // end of loop on for(k=1; k<i; k++)
} // end of loop on for(i=2; i< vps_max_layers_minus1+1; i++)
        // derive dependence layers (direct or indirect reference layers) of layer i
        for(i=0; i< vps_max_layers_minus1+1; i++){
            for(j=0; j<i; j++){
            DependencyFlag[i][j]        =       (direct dependency flag[i][j]    |
IndirectDependencyFlag[i][j]);
        } // end of loop on for(j=0; j<i; i++)
        } // end of loop on for(i=0; i< vps_max_layers_minus1+1; i++)
```

The pseudocode can be represented in steps as follows. It is assumed that before the start of step SO01, the values of all of the elements of the indirect dependency flag IndirectDependencyFlag[ ][ ] and the dependency flag DependencyFlag[ ][ ] have been already initialized to zero.

(SO01) The start point of a loop pertaining to derivation of the indirect dependency flag pertaining to the i-th layer (layer i). Before the loop is started, the variable i is initialized to two. The process in the loop is executed when the variable i is less than the number of layers "vps_max_layers_minus1+1". The variable i is incremented by "1" every time the process in the loop is executed one time. The variable i is thus started at two because the indirect reference layer occurs on the third or higher layer.

(SO02) The start point of a loop pertaining to k-th layer (layer k) (j<k<i), which is lower than the i-th layer (layer i) and higher than the j-th layer (layer j). Before the loop is started, the variable i is initialized to one. The process in the loop is executed when the variable k (layer k) is less than that of the layer i (k<i). The variable k is incremented by "1" every time the process in the loop is executed one time. The variable k is thus started at one because the indirect reference layer occurs on the third or higher layer.

layer k to the layer i is one, it is determined to be true (direct reference layer), and when the direct reference layer is zero (not direct reference layer), it is determined to be false.

(3) It is determined whether the layer j is not the direct reference layer of the layer i. More specifically, when the direct dependency flag (direct_dependency_flag[i][j]) of the layer j to the layer i is zero (not direct reference layer), it is determined to be true, and when the direct reference layer is one (direct reference layer), it is determined to be false.

In the case where all of the conditions (1) to (3) are true (i.e., (the direct dependency flag of the layer j to the layer k is one or the indirect dependency flag thereof is one), and the direct dependency flag of the layer j to the layer i direct_dependency_flag[i][k] is one, and the direct dependency flag of the layer j to the layer i direct_dependency_flag[i][j] is zero), the processing transitions to step 5005. In the other cases (the cases where at least any one of the conditions (1) to (3) is false, i.e., the direct dependency flag of the layer j to the layer k is zero, and the indirect dependency flag thereof is zero), or the direct dependency flag of the layer to the layer i direct_dependency_flag[i][k] is zero, or the direct dependency flag of the layer to the layer i direct_dependency_flag[i][j] is one), the processing transitions to step 5006, skipping the process in step 5005.

(S005) In the case where all the conditions (1) to (3) are true, the layer j is determined as the indirect reference layer of the layer i, and the value of the j-th element of the indirect dependency flag IndirectDependencyFlag[i][ ] is set to one. That is, IndirectDependencyFlag[i][j]=1.

(S006) The end point of the loop that searches for whether the layer j is the indirect reference layer of the layer i or not.

(S007) The end point of the loop pertaining to the layer k (j<k<i) that is lower than the layer i and higher than the layer j.

(S008) The end point of the loop pertaining to derivation of the indirect dependency flag pertaining to the layer i.

(S00A) The start point of a loop pertaining to derivation of the dependency flag pertaining to the layer i.

Before the loop is started, the variable i is initialized to zero. The process in the loop is executed when the variable i is less than the number of layers "vps_max_layers_minus1+1". The variable i is incremented by "1" every time the process in the loop is executed one time.

(S00B) The start point of a loop that searches for whether the layer j is the dependence layer of the layer i (the direct reference layer or the indirect reference layer). Before the loop is started, the variable j is initialized to zero. The process in the loop is executed when the variable j is less than the variable i (j<i). The variable j is incremented by "1" every time the process in the loop is executed one time.

(S00C) On the basis of the direct dependency flag (direct_dependency_flag[i][j]) and the indirect dependency flag (IndirectDependencyFlag[i][j]), the value of the dependency flag (DependencyFlag[i][j]) is set. More specifically, the value of the logical sum of the value of the direct dependency flag (direct_dependency_flag[i][j]) and the value of the indirect dependency flag (direct_dependency_flag[i][j]) is adopted as the value of the dependency flag (DependencyFlag[i][j]). That is, derivation is made according to the following expression. In the case where the value of the direct dependency flag is one or the value of the indirect dependency flag is one, the value of the dependency flag is one. In the other case (the value of the direct dependency flag is zero and the value of the indirect dependency flag is zero), the value of the dependency flag is zero. The following deriving expression is only one example, and can be changed in the range where the value set in the dependency flag is the same.

DependencyFlag[i][j]=(direct_dependency_flag[i][j]|IndirectDependency Flag[i][j]);

(S00D) The end point of the loop that searches for whether the layer j is the dependence layer of the layer i (the direct reference layer or the indirect reference layer).

(S00E) The end point of the loop pertaining to derivation of the dependency flag pertaining to the layer i.

As described above, the indirect dependency flag (IndirectDependencyFlag[i][j]) representing the dependency relationship where the layer i indirectly depends on the layer j is thus derived, which allows grasping whether the layer j is the indirect reference layer of the layer i. The dependency flag (DependencyFlag[i][j]) representing the dependency relationship in the case where the layer i depends on the layer j (the direct dependency flag is one or the indirect dependency flag is one) is thus derived, which allows grasping whether the layer j is the dependence layer (the direct reference layer or the indirect reference layer) of the layer i. The deriving procedures are not limited to the aforementioned steps, and may be changed in an implementable range.

In the above example, the dependency flag DipendecyFlag[i][j] indicating whether the j-th layer with respect to the i-th layer is a direct reference layer or an indirect reference layer is derived for indices i and j on all the layers. Alternatively, the layer identifier of the i-th layer nuhLId#i and the layer identifier of the j-th layer nuhLId#j may be used to derive the dependency flag between the layer identifiers (inter-layer-identifiers dependency flag LIdDipendencyFlag[ ][ ]. In this case, it is assumed that in the aforementioned step SN08 or SO0C, the first element of the inter-layer-identifiers dependency flag (LIdDependencyFlag[ ][ ]) is the layer identifier of the i-th layer nuhLId#i and the second element is the layer identifier of the j-th layer nuhLId#j, the value of the inter-layer-identifiers dependency flag (LIdDependencyFlag[nuhLId#i][nuhLId#j]) is derived. That is, as described below, in the case where the value of the direct dependency flag is one or the value of the indirect dependency flag is one, the value of the inter-layer-identifiers dependency flag is one. In the other case (the value of the direct dependency flag is zero and the value of the indirect dependency flag is zero), the value of the inter-layer-identifiers dependency flag is zero.

LIdDependencyFlag[nuhLId#i][nuhLId#j]=(direct_dependency_flag[i][j]|IndirectDependencyFlag[i][j]);

As described above, the inter-layer-identifiers dependency flag (Lid0DependencyFlag[nuhLId#i][nuhLId#j]) representing that the i-th layer having the layer identifier nuhLId#i is directly or indirectly depends on the j-th layer having the layer identifier nuhLId#j or not is thus derived, which allows grasping whether the j-th layer having the layer identifier nuhLId#j is a direct reference layer or an indirect reference layer of the i-th layer having the layer identifier nuhLId#i. The aforementioned procedures are not limited thereto, and may be changed in an implementable range.

(Sequence Parameter Set SPS)

The sequence parameter set SPS defines a set of coding parameters referred to by the image decoding apparatus 1 for decoding the target sequence.

The active VPS identifier is an identifier for designation of the active VPS to which the target SPS refers, and is included in SPS as the syntax "sps_video_parameter set_id" (SYNSPS01 in FIG. 15). The parameter set decoding unit 12 may decode the active VPS identifier included in the sequence parameter set SPS, which is the decoding target, read, from the parameter set management unit 13, the active VPS coding parameter designated by the active VPS identifier, and refer to the active VPS coding parameter when decoding each syntax of the decoding target SPS thereafter. In the case where each syntax of the decoding target SPS does not depend on the active VPS coding parameter, the VPS activating process at the time of decoding the active VPS identifier of the decoding target SPS is not required.

The SPS identifier is an identifier for identifying each SPS, and included in the SPS as the syntax "sps_seq_parameter set_id" (SYNSPS02 in FIG. 15). The SPS identified by the active SPS identifier (pps_seq_parameter_set_id) included in the after-mentioned PPS is referred to during a process of decoding the coded data on the target layer in the target layer set.

(Picture Information)

The SPS includes, as picture information, information that defines the size of a decoded picture on the target layer. For example, the picture information includes information on the width and height of the decoded picture on the target layer. The picture information decoded from SPS contains the width of the decoded picture (pic_width_in_luma_samples) and the height of the decoded picture (pic_height_in_luma_samples) (not shown in FIG. 15). The value of the syntax "pic_width_in_luma_samples" corresponds to the width of the decoded picture in units of luma pixels. The value of the syntax "pic_height_in_luma_samples" corresponds to the height of the decoded picture in units of luma pixels.

A syntax group indicated by SYNSPS04 in FIG. 15 is information (scaling list information) pertaining to the scaling list (quantization matrix) used through the entire target sequence. In the scaling list information, "sps_infer_scaling_list_flag" (SPS scaling list estimation flag) is a flag that indicates whether or not the information pertaining to the target SPS scaling list is estimated from the active SPS scaling list information on the reference layer indicated by "sps_scaling_list_ref_layer_id". When the SPS scaling list estimation flag is one, the scaling list information on the SPS is estimated (copied) from the scaling list information on the active SPS on the reference layer identified by "sps_scaling_list_ref_layer id". When the SPS scaling list estimation flag is zero, the scaling list information is notified based on "sps_scaling_list_data_present_flag" through SPS.

An SPS extension data presence/absence flag "sps_extension_flag" (SYNSPS05 in FIG. 15) is a flag representing whether the SPS further includes the SPS extension data sps_extension( ) or not (SYNSPS06 in FIG. 15).

The SPS extension data (sps_extension( )) contains, for example, inter-layer position correspondence information (SYNSPS0A in FIG. 16) and the like.

(Picture Parameter Set PPS)

The picture parameter set PPS defines a set of coding parameters referred to by the image decoding apparatus 1 for decoding each picture in the target sequence.

The PPS identifier is an identifier for identifying each PPS, and included in the PPS as the syntax "sps_seq_parameter set_id" (SYNSPS02 in FIG. 15). The PPS identified by the active PPS identifier (slice_pic_parameter_set_id) included in the after-mentioned slice header is referred to during a process of decoding the coded data on the target layer in the target layer set.

The active SPS identifier is an identifier for designation of the active SPS to which the target PPS refers, and is included in PPS as the syntax "pps_seq_parameter_set_id" (SYNSPS02 in FIG. 17). The parameter set decoding unit 12 may decode the active SPS identifier included in the picture parameter set PPS, which is the decoding target, read, from the parameter set management unit 13, the active SPS coding parameter designated by the active SPS identifier, invokes the coding parameter of the active VPS to which the active SPS refers, and refer to the coding parameters of the active SPS and active VPS when decoding each syntax of the decoding target PPS thereafter. In the case where each syntax of the decoding target PPS does not depend on the coding parameters of the active SPS and active VPS, SPS and VPS activating processes at the time of decoding the active SPS identifier of the decoding target PPS are not required.

A syntax group indicated by SYNPPS03 in FIG. 17 is information (scaling list information) pertaining to the scaling list (quantization matrix) used when the picture that refers to the target PPS is decoded. In the scaling list information, "pps_infer_scaling_list_flag" (scaling list estimation flag) is a flag that indicates whether or not the information pertaining to the target PPS scaling list is estimated from the active PPS scaling list information on the reference layer identified by "pps_scaling_list_ref_layer_id". When the PPS scaling list estimation flag is one, the scaling list information on the PPS is estimated (copied) from the scaling list information on the active PPS on the reference layer identified by "sps_scaling_list_ref_layer_id". When the PPS scaling list estimation flag is zero, the scaling list information is notified based on "sps_scaling_list_data_present_flag" through PPS.

(Picture Decoding Unit 14)

The picture decoding unit 14 generates the decoded picture on the basis of the input VCL NAL unit and the active parameter set, and outputs the decoded picture.

Figure 20:
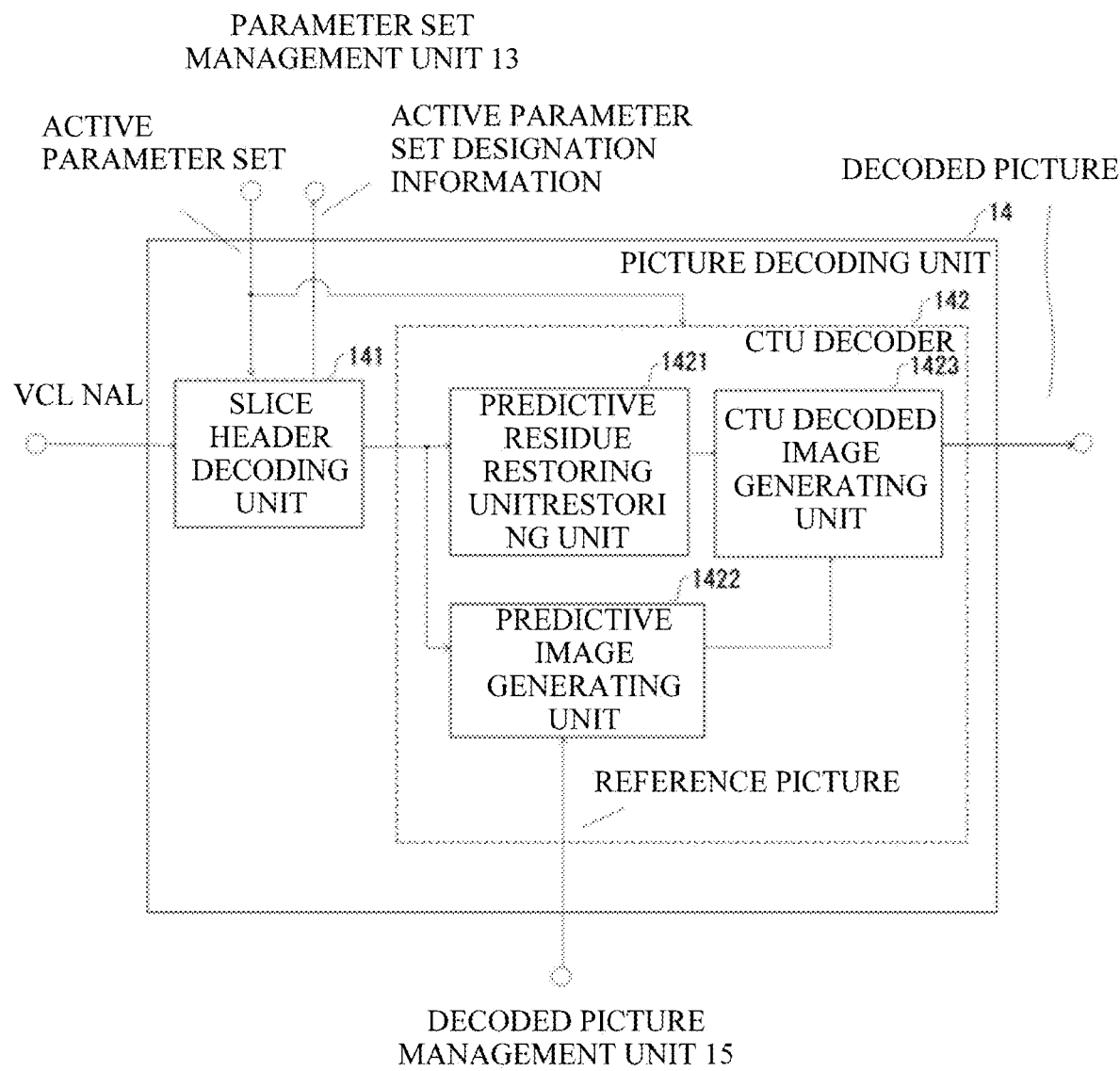
FIG. 20 is a schematic diagram showing a configuration of a target layer set picture decoding unit according to this embodiment.
Figure 21:
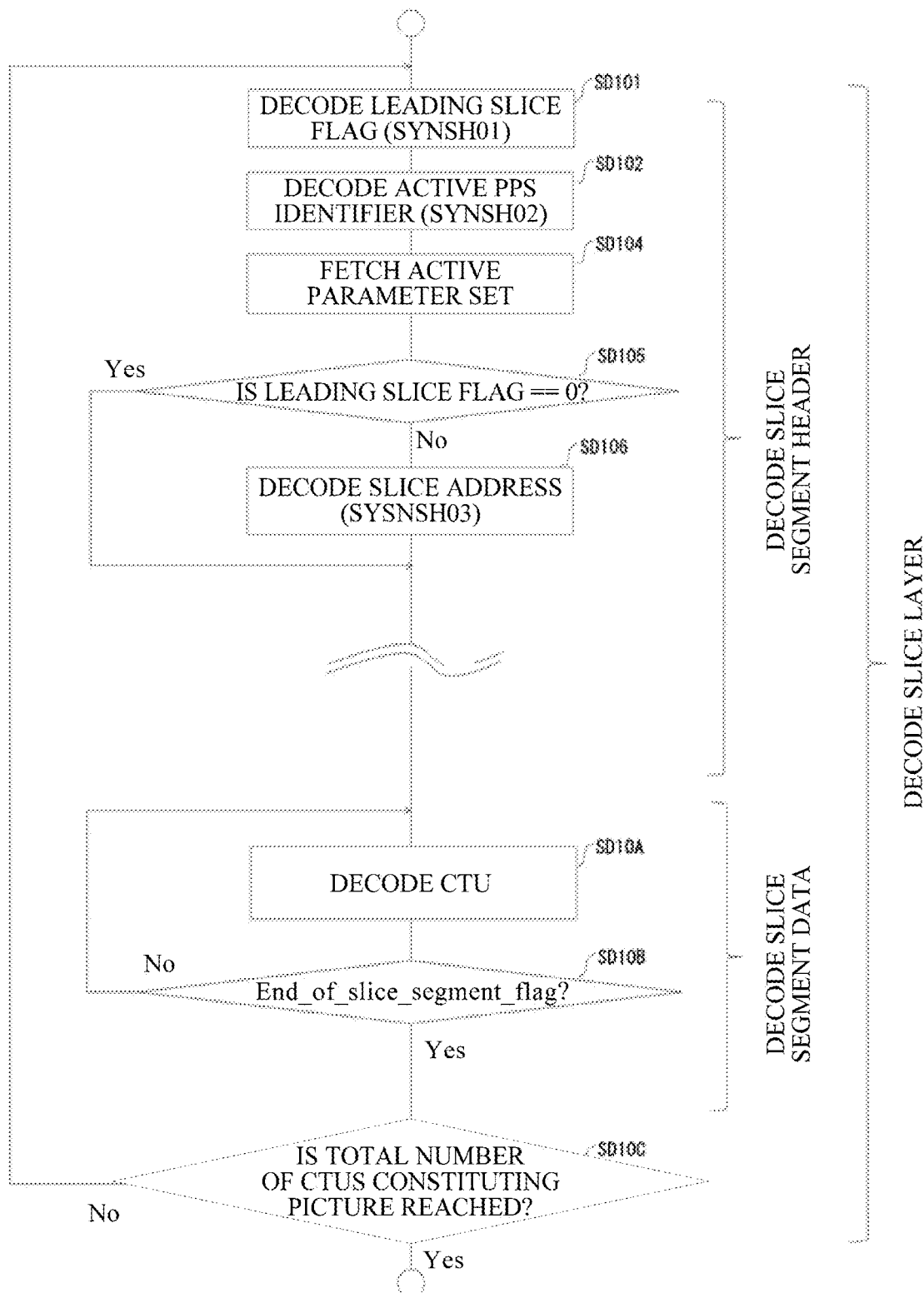
FIG. 21 is a flowchart for illustrating the operation of a picture decoding unit according to this embodiment.

Referring to FIG. 20, the schematic configuration of the picture decoding unit 14 is described. FIG. 20 is a functional block diagram showing the schematic configuration of the picture decoding unit 14.

The picture decoding unit 14 includes a slice header decoding unit 141, and a CTU decoding unit 142. The CTU decoding unit 142 further includes a predictive residue restoring unit 1421, a predictive image generating unit 1422, and a CTU decoded image generating unit 1423.

(Slice Header Decoding Unit 141)

The slice header decoding unit 141 decodes the slice header on the basis of the input VCL NAL unit and the active parameter set. The decoded slice header is output to the CTU decoding unit 142, together with the input VCL NAL unit.

(CTU Decoding Unit 142)

In a schematic view, the CTU decoding unit 142 performs decoding to obtain a decoded image in a region corresponding to each of CTUs included in the slices constituting the picture, on the basis of the input slice header, the slice data included in the VCL NAL unit, and the active parameter set, thus generating the decoded image of the slice. The CTU size for the target layer included in the active parameter set (the syntax to which log 2_min_luma_coding_block_size_minus3, and log 2_diff_max_min_luma_coding_block_size in the SYNSPS03 in FIG. 15 correspond) is used as the CTU size here. The decoded image of the slice is output, as a part of the decoded picture, to the slice position indicated by the input slice header. The decoded image of CTU is generated by the predictive residue restoring unit 1421, the predictive image generating unit 1422 and the CTU decoded image generating unit 1423 in the CTU decoding unit 142.

The predictive residue restoring unit 1421 decodes the predictive residue information (TT information) contained in the input slice data, and generates and outputs the predictive residue of the target CTU.

The predictive image generating unit 1422 generates the predictive image on the basis of the prediction method and prediction parameters indicated by the predictive information (PT information) contained in the input slice data, and outputs the image. Here, the decoded image of the reference picture and the coding parameter therefore are used if necessary. For example, in the case of using inter prediction or inter-layer image prediction, the corresponding reference picture is read from the decoded picture management unit 15.

The CTU decoded image generating unit 1423 adds the input predictive image to the predictive residue, generates and outputs the decoded image of the target CTU.

<Decoding Process in Picture Decoding Unit 14>

Hereinafter, referring to FIG. 21, the schematic operation of the picture decoding on the target layer i in the picture decoding unit 14 is described. FIG. 21 is a flowchart showing the decoding process in units of slices that constitute the picture on the target layer i in the picture decoding unit 14.

(SD101) The leading slice flag of the decoding target slice (first_slice_segment_in_pic_flag) is decoded. When the leading slice flag is one, the decoding target slice is the leading slice in the decoding order in the picture (hereinafter, processing order), and the position (hereinafter, CTU address) in a raster scanning order in the picture in the leading CTU in the decoding target slice is set to zero. Furthermore, a counter numCtu of the number of processed CTUs (hereinafter, the number of processed CTUs numCtu) in the picture is set to zero. When the leading slice flag is zero, the leading CTU address of the decoding target slice is set on the basis of the slice address decoded in the SD106, which will be described later.

(SD102) The active PPS identifier (slice_pic_parameter_set_id) that designates an active PPS referred to during decoding the decoding target slice is decoded.

(SD104) The active parameter set is fetched from the parameter set management unit 13. That is, a PPS having the PPS identifier (pps_pic_parameter_set_id) identical to the active PPS identifier (slice_pic_parameter_set_id) to which the decoding target slice refers is regarded as the active PPS, and the coding parameter of the active PPS is fetched (read) from the parameter set management unit 13. Furthermore, an SPS having the SPS identifier (sps_seq_parameter_set_id) identical to the active SPS identifier (pps_seq_parameter_set_id) in the active PPS is regarded as the active SPS, and the coding parameter of the active SPS is fetched from the parameter set management unit 13. Moreover, a VPS having the VPS identifier (vps_video_parameter_set_id) identical to the active VPS identifier (sps_video_parameter_set_id) in the active SPS is regarded as the active VPS, and the coding parameter of the active VPS is fetched from the parameter set management unit 13.

(SD105) It is determined whether the decoding target slice is the leading slice in the processing order in the picture or not on the basis of the leading slice flag. In the case where the leading slice flag is zero (YES in SD105), the processing transitions to step SD106. In the other case (No in SD105), the process in SD106 is skipped. In the case where the leading slice flag is one, the slice address of the decoding target slice is zero.

(SD106) The slice address (slice_segment_address) of the decoding target slice is decoded, and the leading CTU address of the decoding target slice is set. For example, the leading slice CTU address=slice_segment_address.

. . . not shown . . . .

(SD10A) The CTU decoding unit 142 generates a CTU decoded image in a region corresponding to each of CTUs included in the slices constituting the picture, on the basis of the input slice header, active parameter set, and each of pieces of CTU information (SYNSD01 in FIG. 18) in the slice data included in the VCL NAL unit. Furthermore, after each of the pieces of CTU information, there is a slice end flag (end_of_slice_segment_flag) indicating whether the CTU is the end of the decoding target slice or not (SYNSD02 in FIG. 18). After each CTU is decoded, the value of the number of processed CTUs is incremented by one (numCtu++).

(SD10B) It is determined whether the CTU is the end of the decoding target slice or not on the basis of the slice end flag. In the case where the slice end flag is one (YES in SD10B), the processing transitions to step SD10C. In the other case (No in SD10B), the processing transitions to SD10A to decode the subsequent CTU information.

(SD10C) It is determined whether the number of processed CTUs numCtu reaches the total number of CTUs (PicSizeInCtbsY) that constitute the picture or not. That is, it is determined whether numCtu==PicSizeInCtbsY or not. In the case where numCtu is equal to PicSizeInCtbsY (YES in SD10C), the decoding process in units of slices that constitute the decoding target picture is finished. In other case (numCtu<PicSizeInCtbsY) (No in SD10C), the processing transitions to SD101 to continue the decoding process in units of slices that constitute the decoding target picture.

The operation of the picture decoding unit 14 according to Embodiment 1 is thus described above. The steps are not limited to the above steps. Alternatively, the steps may be changed in an implementable range.

(Advantageous Effects of Video Decoding Apparatus 1)

The hierarchical video decoding apparatus 1 (hierarchical image decoding apparatus) according to this embodiment, which has been described above, includes the bit stream extraction unit 17 that performs the bit stream extraction process on the basis of the layer ID list LayerIdListTarget on the layer constituting the target layer set LayerSetTarget supplied from the outside, and of the target highest temporal identifier HighestTidTarget, and removes (discards), from the input hierarchically coded data DATA, the target highest temporal identifier HighestTidTarget, and NAL units that is not included in a set (called a target set TargetSet) defined by the layer ID list LayerIdListTarget of the target layer set LayerSetTarget, and thus extracts the target layer set coded data DATA#T (BitstreamToDecode) made up of NAL units included in the target layer set TargetSet. Furthermore, in the case where the layer identifier of the video parameter set is not included in the target set TargetSet, the bit stream extraction unit 17 is characterized by updating (rewriting) the layer identifier of the video parameter set to the lowest layer identifier in the target set TargetSet. The operation of the bit stream extraction unit 17 assumes "the AU constituting the input hierarchically coded data DATA includes one (at the maximum) VPS having the lowest layer identifier in the AU". However, the operation is not limited thereto. For example, a VPS having a layer identifier other than the lowest layer identifier in the AU may be included in the AU. In this case, the bit stream extraction unit 17 may regard the VPS of the layer identifier to be updated as what is a layer identifier that is not included in the target set TargetSet and is the lowest layer identifier, in step SG104 in FIG. 27. Typically, since the VPS having the layer identifier "nuhLayerId=0" is the VPS having the lowest layer identifier, this VPS is regarded as that to be updated, and the other VPSs that are not included in the target set TargetSet are discarded.

Consequently, the hierarchical video decoding apparatus 1 according to this embodiment can prevent the problem in that the VPS is not included in the layer set on the bit stream after bit stream extraction. That is, it can prevent occurrence of the layer that cannot be decoded on the bit stream that is generated through the bit stream extraction process from the bit stream on a certain layer set and only includes the layer set of a sub-set of the layer set.

As the parameter sets (VPS, SPS and PPS) used to decode the target layer, the parameter set used to decode the reference layer is shared (referred to), which can omit the decoding process pertaining to the parameter set on the target layer. That is, the parameter set can be decoded with a smaller amount of code.

VARIATION EXAMPLE 1 OF BIT STREAM EXTRACTION UNIT 17

As shown in FIG. 27, according to the bit stream extraction unit 17 of Embodiment 1, in the case where the VPS layer identifier is not included in the target set TargetSet, the VPS layer identifier is updated (rewritten) to the lowest layer identifier in the target set TargetSet to thereby cause the VPS to be necessarily included in the target set TargetSet. However, the configuration is not limited thereto. For example, it may be so configured that the bit stream extraction unit 17 does not update the layer identifier of the VPS that is not included in the layer ID list LayerIdListTarget configuring the target set TargetSet, omits discarding of the NAL unit of the VPS, and includes the VPS in the bit stream of the extracted target set TargetSet. Hereinafter, referring to FIG. 28, the operation of the bit stream extraction unit 17' according to Variation Example 1 is described. Operations common to those of the bit stream extraction unit 17 according to Embodiment 1 are assigned the same symbols, and are not described.

(SG102*a*) It is determined whether the NAL unit type (nal_unit_type) of the target NAL unit is a parameter set or not on the basis of the "nal_unit_type" and "Name of nal_unit_type" shown in FIG. 7. Here, to satisfy the conformance condition CY1, which will be described below, it is determined whether the NAL unit type is "VPS NUT" (nal_unit_type=32) or not. That is, when the NAL unit type is the video parameter set (YES in SG102*a*), the processing transitions to step SG107, omitting the operations pertaining to the VPS in steps SG105*a* and SG106*a*. In the other case (No in SG102*a*), the processing transitions to step SG105*a*.

(SG105*a*) It is determined whether or not the layer identifier and the temporal identifier of the target NAL unit are included in the target set TargetSet, on the basis of the layer ID list LayerIdListTarget of the layer constituting the target layer set LayerSetTarget, and of the target highest temporal identifier. The detailed operations are the same as those in step SG105 in FIG. 27. Consequently, the description thereof is omitted.

(SG106*a*) The target NAL unit is discarded. That is, as the target NAL unit has not been included in the target set TargetSet, the bit stream extraction unit 17' removes the target NAL unit from the input hierarchically coded data DATA.

The operation of the bit stream extraction unit 17' according to Variation Example 1 is thus described above. The steps are not limited to the above steps. Alternatively, the steps may be changed in an implementable range.

The bit stream extraction unit 17' according to Variation Example 1, which has been described above, is characterized by performing the bit stream extraction process on the basis of the layer ID list LayerIdListTarget on the layer constituting the target layer set LayerSetTarget supplied from the outside, and of the target highest temporal identifier HighestTidTarget, and removing (discarding), from the input hierarchically coded data DATA, the target highest temporal identifier HighestTidTarget, and NAL units that is not included in a target set TargetSet defined by the layer ID list LayerIdListTarget of the target layer set LayerSetTarget, except the NAL units whose NAL unit types are VPS, and thus extracting and outputting the target layer set coded data DATA#T (BitstreamToDecode) made up of NAL units included in the target set TargetSet. In other words, in the case where the layer identifier of the video parameter set is not included in the target set TargetSet, the bit stream extraction unit 17' does not discard the NAL unit of the video parameter set, and includes the VPS into the bit stream of the target set TargetSet.

The operation of the bit stream extraction unit 17' assumes "the AU constituting the input hierarchically coded data DATA includes one (at the maximum) VPS having the lowest layer identifier in the AU". However, the operation is not limited thereto. For example, a VPS having a layer identifier other than the lowest layer identifier in the AU may be included in the AU. In this case, the bit stream extraction unit 17' may add a condition, to step SG102*a*, "whether the VPS layer identifier is a layer identifier that is not included in the target set TargetSet and is the lowest layer identifier". Typically, since the VPS having the layer identifier "nuhLayerId=0" is the VPS having the lowest layer identifier, this VPS is regarded as the VPS to be included in the target set TargetSet, and the other VPSs that are not included in the target set TargetSet are discarded.

Consequently, the bit stream extraction unit 17' according to Variation Example 1 described above can prevent the problem in that the VPS is not included in the layer set on the bit stream after bit stream extraction. That is, it can prevent occurrence of the layer that cannot be decoded on the bit stream that is generated through the bit stream extraction process from the bit stream on a certain layer set and only includes the layer set of a sub-set of the layer set.

CONSTRAINT ON VPS ACCORDING TO VARIATION EXAMPLE 1 OF BIT STREAM EXTRACTION UNIT 17

To perform bit stream extraction described with reference to the bit stream extraction unit 17' according to Variation Example 1, the bit stream is required to satisfy the following condition CY1 as a bit stream conformance.

CY1: "the target set TargetSet (layer set) includes the VPS having the layer identifier equal to the lowest layer identifier among those of all the layers";

In other words, the bit stream constraint CY1 is "the VPS included in the access unit belongs to the same layer as the VCL having the lowest layer identifier among all the layers (including layers that are not included in the access unit).

"The VPS included in the access unit belongs to the same layer as that of the VCL having the lowest layer identifier among all the layers (including layers that are not included in the access unit) means "in the case where the layer in the layer set B that is a subset of the layer set A refers to the VPS on the layer 'included in the layer set A but is not included in the layer set B' in the layer set A, in the layer set B extracted through bit stream extraction, the VPS having the same coding parameter as the aforementioned VPS is included in the layer set B". The VPS having the same coding parameter as the aforementioned VPS indicates that the VPS identifier and the syntax in another VPS are the same as those of the aforementioned VPS except the layer identifier and the temporal identifier. Consequently, provision of the bit stream constraint can solve the problem in that the VPS is not included in the layer set on the bit stream after bit stream extraction. That is, it can prevent occurrence of the layer that cannot be decoded on the bit stream that is generated through the bit stream extraction process from the bit stream on a certain layer set and only includes the layer set of a sub-set of the layer set.

In the aforementioned conformance condition CY1, "the target set TargetSet (layer set) includes the VPS having the same layer identifier as the lowest layer identifier among those of all the layers". The configuration is not limited thereto. For example, the lowest layer identifier may be adopted as the layer identifier nuhLayerId=0(nuh_layer_id=0). That is, in consideration of the bit stream conformance, the bit stream is required to satisfy at least the following condition CY2.

CY2: "the target set TargetSet (layer set) includes the VPS having the same layer identifier as the layer identifier nuh_layer_id=0"

The conformance condition CY2 also exerts advantageous effects analogous to those of the conformance condition CY1. Furthermore, in the case of the constraints of the conventional arts (Non-Patent Literatures 2 and 3) (the VPS layer identifier is zero), when a certain layer in TargetSet during bit stream extraction refers to the VPS with nuh_layer_id=0, the VPS with nuh_layer_id=0 that is not included in TargetSet is not discarded. Consequently, the layer in TargetSet can be prevented from being undecodable.

VARIATION EXAMPLE 1A OF BIT STREAM EXTRACTION UNIT 17

Furthermore, in the case of the constraints (the layer identifiers of VPS/SPS/PPS are zero) of the conventional art (Non-Patent Literature 4), in addition to CY2, at least CY3 and CY4 are required to be satisfied as bit stream conformances.

CY3: "the target set TargetSet (layer set) includes the SPS having the same layer identifier as the layer identifier nuh_layer_id=0"

CY4: "The target set TargetSet (layer set) includes the PPS having the layer identifier equal to the layer identifier nuh_layer_id=0".

In the case of applying the bit stream constraints CY2 to CY4, it may be so configured that the operations of the bit stream extraction unit 17' according to Variation Example 1 (step G102 in FIG. 28) are changed to the following process (SG102a').

(SG102a') It is determined whether the NAL unit type (nal_unit_type) of the target NAL unit is a parameter set or not on the basis of the "nal_unit_type" and "Name of nal_unit_type" shown in FIG. 7. Here, to satisfy the conformance conditions CY2 to CY4, it is determined whether the NAL unit type is "VPS NUT" (nal_unit_type==32) or "SPS NUT" (nal_unit_type==33) or "PPS NUT" (nal_unit_type==34). That is, in the case where the NAL unit type is any parameter set of the VPS, SPS and PPS (YES in SG102a'), the processing transitions to step SG107. In the other case (No in SG102a), the processing transitions to step SG105a.

The operation of the bit stream extraction is thus described above. The steps are not limited to the above steps. Alternatively, the steps may be changed in an implementable range. The bit stream extraction unit 17' having been subjected to the aforementioned change is called a bit stream extraction unit 17'a according to Variation Example 1a.

Furthermore, according to the bit stream extraction unit 17'a, in the case of the constraints of the conventional arts (Non-Patent Literature 4) (the VPS/SPS/PPS layer identifiers are zero), when a certain layer in TargetSet during bit stream extraction refers to the VPS/SPS/PPS with nuh_layer_id=0, the VPS/SPS/PPS with nuh_layer_id=0 that is not included in TargetSet is not discarded. Consequently, the layer in TargetSet can be prevented from being undecodable.

VARIATION EXAMPLE 2 OF BIT STREAM EXTRACTION UNIT 17

Figure 29:
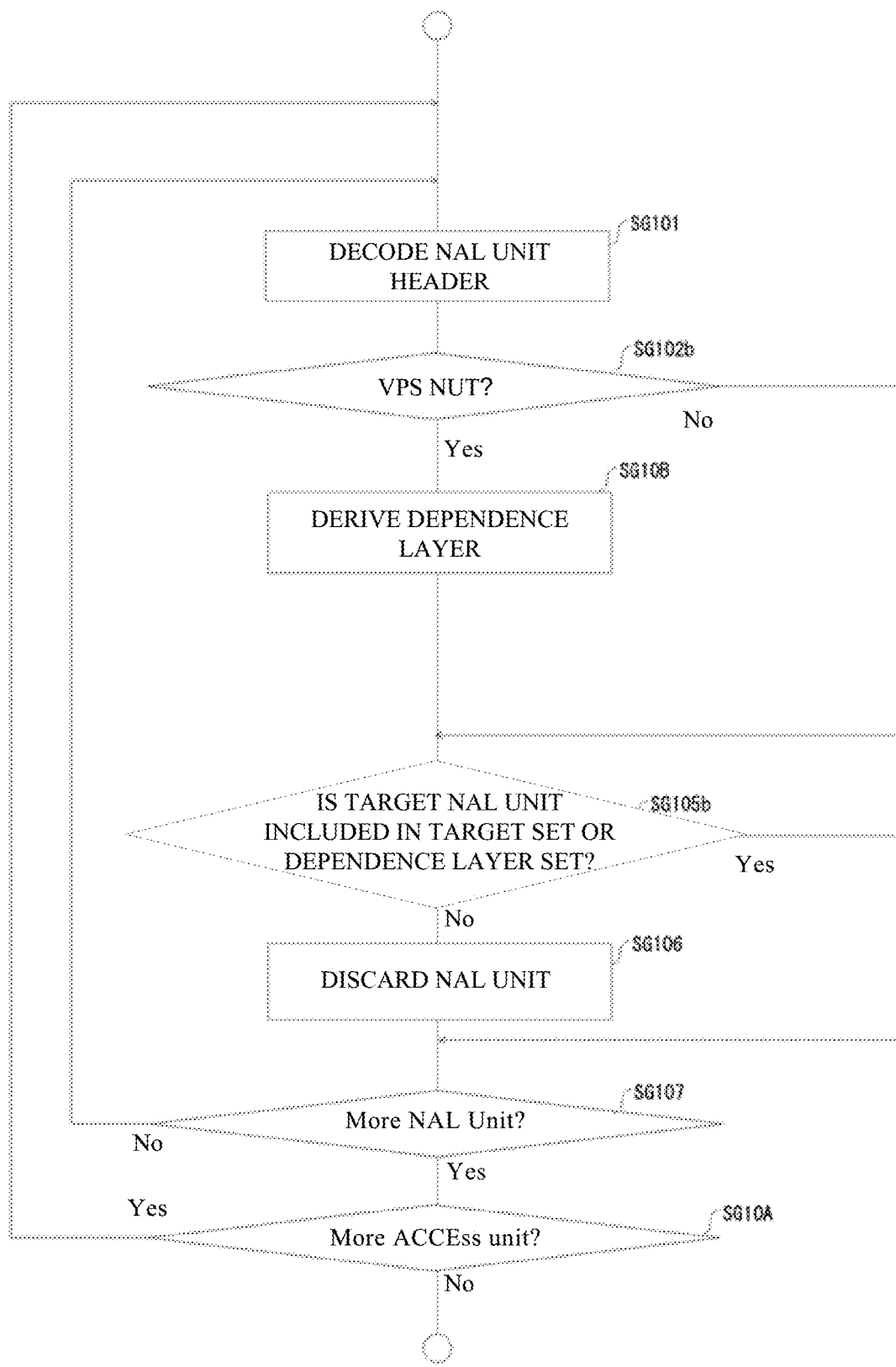
FIG. 29 is a flowchart for illustrating the operation of Variation Example 2 of the bit stream extraction unit according to this embodiment.

As shown in FIG. 27, according to the bit stream extraction unit 17 of Embodiment 1, in the case where the VPS layer identifier is not included in the target set TargetSet, the VPS layer identifier is updated (rewritten) to the lowest layer identifier in the target set TargetSet to thereby cause the VPS to be necessarily included in the target set TargetSet. However, the configuration is not limited thereto. For example, it may be so configured that the bit stream extraction unit 17 omits discarding of NAL units of the VCL and non-VCL pertaining to the reference layer (the direct reference layer and the indirect reference layer) on which each layer in the target set TargetSet depends and which is not included in the layer ID list LayerIdListTarget constituting the target set TargetSet, and the extracted target set TargetSet includes the VCL and the non-VCL. Hereinafter, referring to FIG. 29, the operation of the bit stream extraction unit 17" according to Variation Example 2 is described. Operations common to those of the bit stream extraction unit 17 according to Embodiment 1 are assigned the same symbols, and are not described. The bit stream extraction unit 17" has the same function as VPS decoder means in the parameter set decoding unit 12 in order to derive the dependence layer from the VPS coding parameter. FIG. 29 is a flowchart showing a bit stream extraction process in units of the access unit in the bit stream extraction unit 17".

(SG102b) It is determined whether the NAL unit type (nal_unit_type) of the target NAL unit is a parameter set or not on the basis of the "nal_unit_type" and "Name of nal_unit_type" shown in FIG. 7. Here, to satisfy the conformance condition CZ1, which will be described below, it is determined whether the NAL unit type is "VPS NUT" (nal_unit_type==32) or not. That is, in the case where the NAL unit type is the video parameter set (YES in SG102b), the processing transitions to step SG103. In the other case (No in SG102), the processing transitions to step SG105.

(SG10B) The bit stream extraction unit 17" decodes the target NAL unit, which is VPS, and derives the dependence layer (dependence layer set) of each layer included in the target set TargetSet. More specifically, according to the procedures described in (Derivation of Reference Layer ID List and Direct Reference Layer IDX List) and (Derivation of Indirect Dependency Flag and Dependency Flag), the inter-layer-identifiers dependency flag LIdDipendecyFlag[ ][ ] indicating whether the j-th layer with the layer identifier nuhLId#j to the i-th layer with the layer identifier nuhLId#i is the direct reference layer or the indirect reference layer is derived. Instead of the inter-layer-identifiers dependency flag, the dependency flag DependencyFlag[i][j] may be derived that indicates whether the j-th layer (layer identifier nuhLId#j) to the aforementioned j-th layer (layer identifier nuhLId#i) is the direct reference layer or the indirect reference layer.

(SG105b) It is determined whether or not the layer identifier and the temporal identifier of the target NAL unit are included in the target set TargetSet, or whether or not the layer identifier and the temporal identifier of the target NAL unit are the dependence layers of the layer included in the target set TargetSet, on the basis of the layer ID list LayerIdListTarget of the layer constituting the target layer set LayerSetTarget, of the target highest temporal identifier and of the dependency flag (inter-layer-identifiers dependency flag LIdDependencyFlag[ ][ ]). More specifically, it is determined whether the following conditions (1) to (3) are satisfied or not. In the case where at least any of the conditions is satisfied (true) (YES in SG105), the processing transitions to step SG106. In the other case (No in SG105b), the processing transitions to step SG107.

(1) In the case "a value identical to the layer identifier of the target NAL unit is in the layer ID list LayerIdListTarget of the layer constituting the target layer set LayerSetTarget", it is determined to be true. In the other case (the value identical to the layer identifier of the target NAL unit is not in the layer ID list LayerIdListTarget of the layer constituting the target layer set LayerSetTarget), it is determined to be false.

(2) In the case "the temporal identifier of the target NAL unit is equal to or less than the target highest temporal identifier HighestTidTarget", it is determined to be true. In the other case (the temporal identifier of the target NAL unit is greater than the target highest temporal identifier HighestTidTarget), it is determined to be false.

(3) It is determined whether the layer identifier nuhLayerId of the target NAL unit is the direct reference layer or the indirect reference layer to each layer (LayerIdListTarget[k] (k=0 . . . n−1, (n is the number of layers included in LayerSetTarget)) included in the target layer set LayerSetTarget on the basis of the inter-layer-identifiers dependency flag LIdDependencyFLag[LayerIdListTarget[k]][nuhLayerId](k=0 . . . n−1).

More specifically, on any of the layers k included in the target layer set LayerSetTarget, in the case where the value of the inter-layer-identifiers dependency flag LIdDependencyFLag[LayerIdListTarget[k]][nuhLayerId] is one, it is determined to be true. In the other cases (on all the layers k included in the target layer set LayerSetTarget, the value of the inter-layer-identifiers dependency flag LIdDependencyFLag[[LayerIdListTarget[k]][nuhLayerId] is zero), it is determined to be false. The determination may be based on DepFlag, which is also derived by the following expression. That is, in the case where DepFlag, which is the logical sum of the inter-layer-identifiers dependency flag LIdDepedencyFlag[LayerIdListTarget[k]][nuhLayerId] (k=0 . . . n−1) is one, it is determined to be true. In the case where DepFlag is zero, it is determined to be false.

DepFlag=0; for(k=0; i<k; i++) {DepFlag|=LIdDependencyFLag[LayerIdListTarget[k]][nuhLayerId];}

(SG106b) The target NAL unit is discarded. That is, as the target NAL unit is not included in the target set TargetSet or the dependence layer of the target set TargetSet, the bit stream extraction unit 17 removes the target NAL unit from the input hierarchically coded data DATA.

The operation of the bit stream extraction unit 17" according to Variation Example 2 has thus been described above. The steps are not limited to the above steps. Alternatively, the steps may be changed in an implementable range.

The bit stream extraction unit 17" according to Variation Example 2, which has been described above, is characterized by performing the bit stream extraction process on the basis of the layer ID list LayerIdListTarget on the layer constituting the target layer set LayerSetTarget supplied from the outside, of the target highest temporal identifier HighestTidTarget and of the dependence layer information (the dependency flag (LIdDependencyFlag[ ][ ] or DependencyFLag[ ][ ])) derived from the VPS, removing (discarding), from the input hierarchically coded data DATA, the target highest temporal identifier HighestTidTarget, an aggregation target set TargetSet defined by the layer ID list LayerIdListTarget of the target layer set LayerSetTarget, and NAL units that are not included in the dependence layer of the target set TargetSet, and thus extracting and outputting the target set TargetSet and the target layer set coded data DATA#T (BitstreamToDecode) made up of NAL units included in the dependence layer of the target set TargetSet. In other words, the bit stream extraction unit 17" does not discard the NAL unit contained on the dependence layer of the target set TargetSet, and includes the NAL unit contained on the dependence layer into the bit stream of the target set TargetSet.

The operation of the bit stream extraction unit 17" assumes "the AU constituting the input hierarchically coded data DATA includes one (at the maximum) VPS having the lowest layer identifier in the AU". However, the operation is not limited thereto. For example, a VPS having a layer identifier other than the lowest layer identifier in the AU may be included in the AU. In this case, the bit stream extraction unit 17" may regard the lowest layer identifier among the layer identifiers that are not included in the target set TargetSet, as the VPS from which the dependence information is derived in steps SG102b to SG10B. Typically, since the VPS having the layer identifier "nuhLayerId=0" is the VPS having the lowest layer identifier, the layer dependence information may be derived from this VPS, and the other VPSs that are not included in the target set TargetSet are discarded.

The aforementioned bit stream extraction unit 17" according to this embodiment can prevent the problem in that in the bit stream after bit stream extraction, the layer set does not include the VCL and non-VCL NAL units pertaining to the dependence layer referred to by the layer in the layer set (the direct reference layer or the indirect reference layer). That is, it can prevent occurrence of the layer that cannot be decoded on the bit stream that is generated through the bit stream extraction process from the bit stream on a certain layer set and only includes the layer set of a sub-set of the layer set.

BIT STREAM CONSTRAINT ACCORDING TO VARIATION EXAMPLE 2 OF BIT STREAM EXTRACTION UNIT 17

To perform bit stream extraction described with reference to the bit stream extraction unit 17" according to Variation Example 2, the bit stream is required to satisfy at least the following condition CZ1 as a bit stream conformance.

CZ1: "The target set TargetSet (layer set) includes the dependence layer which each layer in the target set TargetSet depends on (refers to)".

In other words, this bit stream constraint CZ1 is "the dependence layer to which a certain target layer in the layer set refers is included in the same layer set."

"In the layer set, the dependence layer to which a certain target layer in the layer set refers is included in the same layer set" means "reference is prohibited from the layer in a certain layer set B that is a subset of the layer set A to the VCL or non-VCL of the layer 'included in the layer set A but not included in the layer set B', in the layer set A". Consequently, the bit stream constraint is provided, which can solve the problem in that in the bit stream after bit stream extraction, the VCL and non-VCL NAL units pertaining to the dependence layer referred to from the layer in the layer set (the direct reference layer or the indirect reference layer) are not included. That is, it can prevent occurrence of the layer that cannot be decoded on the bit stream that is generated through the bit stream extraction process from the bit stream on a certain layer set and only includes the layer set of a sub-set of the layer set.

VARIATION EXAMPLE 3 OF BIT STREAM EXTRACTION UNIT 17

Furthermore, the bit stream extraction unit 17 may be configured by combining Variation Example 1a and Variation Example 2 of the bit stream extraction unit 17. That is, discarding, "in the case that a layer identifier of the reference layer (direct reference layer/indirect reference layer) on which each layer in the target set TargetSet depends is not included in the target set TargetSet, the NAL units of the VCL and non-VCL on the reference layer having, the layer identifier" may be omitted, discarding, "in case that the layer identifier nuh_layer_id=0 is not included in the target set TargetSet, the NAL unit of the non-VCL including the parameter sets (VPS, SPS and PPS) with the layer identifier nuh_layer_id=0" may be omitted, and the VCL and non-VLS may be thus allowed to be included in the bit stream of the extracted target set TargetSet. In this case, in addition to the conformance condition CZ1, at least the conformance conditions CA1 and CA2 pertaining to the parameter sets (SPS and PPS) are required to be satisfied as bit stream conformances.

CA1: "The layer identifier of the active SPS to a certain layer A with the layer identifier nuh_layer_id=layerIdA is zero or layerIdA, or equal to the value of the layer identifier nuh_layer_id of the direct reference layer or the indirect reference layer of the layer A"

CA2: "The layer identifier of the active PPS to a certain layer A with the layer identifier nuh_layer_id=layerIdA is zero or layerIdA, or equal to the value of the layer identifier nuh_layer_id of the direct reference layer or the indirect reference layer of the layer A"

Figure 30:
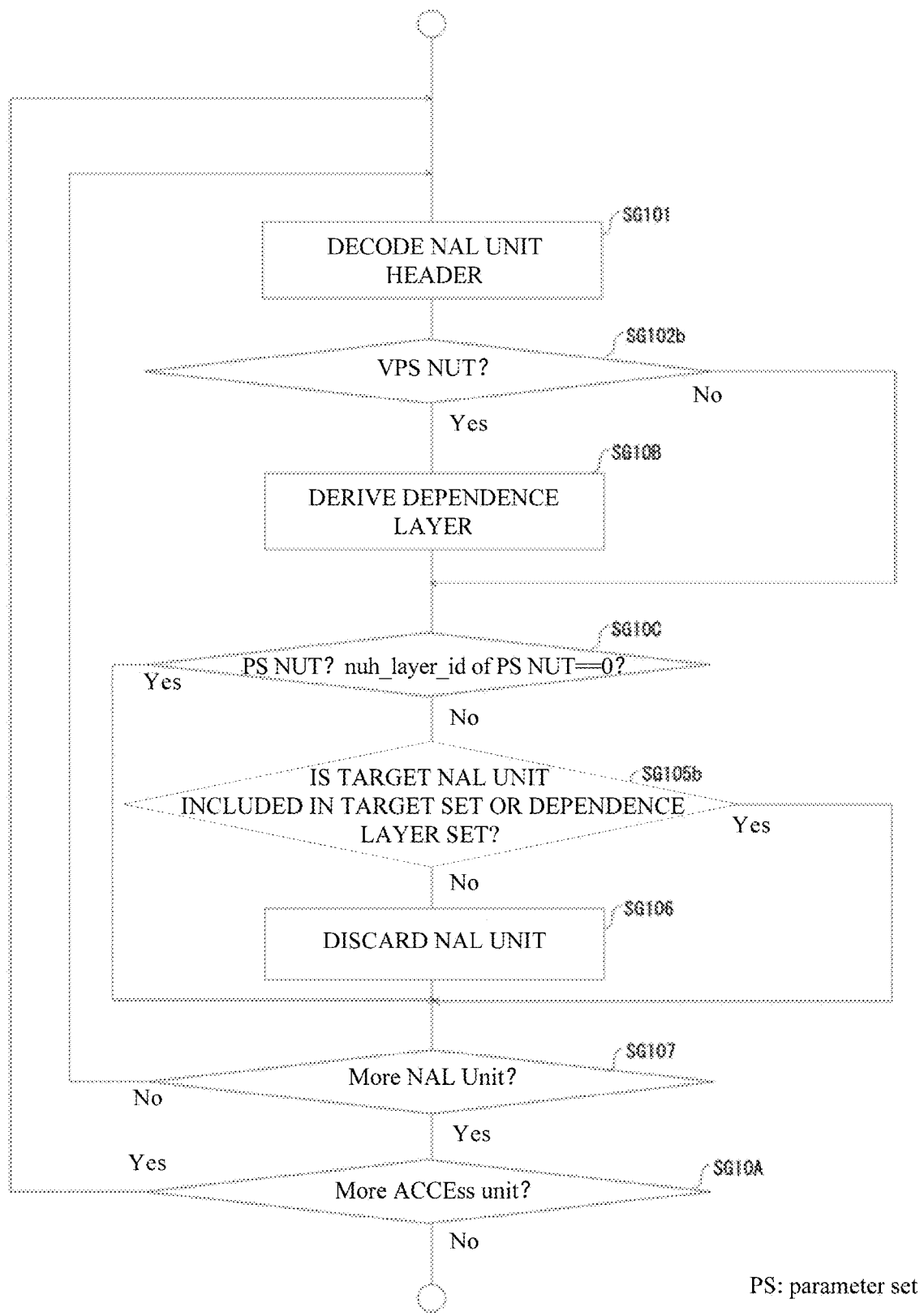
FIG. 30 is a flowchart for illustrating the operation of Variation Example 3 of the bit stream extraction unit according to this embodiment.

The operation of the bit stream extraction unit 17''' according to Variation Example 3 in the case of application of the conformance conditions CZ1 and CA1 and CA2 and the conventional condition "the VPS layer identifier nuh_layer_id is zero" is described with reference to FIG. 30. Operations common to those of the bit stream extraction unit 17" according to Embodiment 3 are assigned the same symbols, and are not described. The bit stream extraction unit 17''' has the same function as the VPS decoding means in the parameter set decoding unit 12 in order to derive the dependence layer from the VPS coding parameter. FIG. 30 is a flowchart showing a bit stream extraction process in units of the access units in the bit stream extraction unit 17'''.

(SG102*b*) It is determined whether the NAL unit type (nal_unit_type) of the target NAL unit is a parameter set or not on the basis of the "nal_unit_type" and "Name of nal_unit_type" shown in FIG. 7. Here, to satisfy the conformance condition CZ1, it is determined whether the NAL unit type is "VPS NUT" (nal_unit_type==32) or not. That is, in the case where the NAL unit type is the video parameter set (YES in SG102*b*), the processing transitions to step SG10C. In the other case (No in SG102*b*), the processing transitions to step SG10B.

(SG10B) The bit stream extraction unit 17''' decodes the target NAL unit, which is VPS, and derives the dependence layer (dependence layer set) of each layer included in the target set TargetSet. The process is the same as that in step SG10B in FIG. 29. Consequently, the description thereof is omitted.

(SG10C) It is determined whether all of the conditions (1) and (2) are satisfied or not.

(1) It is determined whether the NAL unit type (nal_unit_type) of the target NAL unit is a parameter set or not on the basis of the "nal_unit_type" and "Name of nal_unit_type" shown in FIG. 7. More specifically, it is determined whether the NAL unit type is "VPS NUT" (nal_unit_type==32) or "SPS NUT" (nal_unit_type==33) or "PPS NUT" (nal_unit_type==34). That is, in the case where the NAL unit type is any parameter set of the VPS, SPS and PPS, it is determined to be true. In the other case, it is determined to be false.

(2) It is determined whether the layer identifier of the target NAL unit is zero or not. In the case where the layer identifier of the target NAL unit is zero, it is determined to be true. In the other case, it is determined to be false.

In the case where all of the conditions (1) and (2) are true (the NAL unit type of the target NAL unit is a parameter set (VPS or SPS or PPS) and the layer identifier of the target NAL unit is zero) (YES in SG10C), the processing transitions to step SG0107. In the other case (No in SG10C), the processing transitions to step SG105*b*.

(SG105*b*) It is determined whether or not the layer identifier and the temporal identifier of the target NAL unit are included in the target set TargetSet, or whether or not the layer identifier and the temporal identifier of the target NAL unit indicate the dependence layer of the layer included in the target set TargetSet, on the basis of the layer ID list LayerIdListTarget of the layer constituting the target layer set LayerSetTarget, of the target highest temporal identifier and of the dependency flag (inter-layer-identifiers dependency flag LIdDependencyFlag[ ][ ]). The process is the same as that in step SG105*b* in FIG. 29. Consequently, the description thereof is omitted.

(SG106*b*) The target NAL unit is discarded. That is, as the target NAL unit is not included in the target set TargetSet or is not the dependence layer of each layer of the target set TargetSet, the bit stream extraction unit 17''' removes the target NAL unit from the input hierarchically coded data DATA.

The operation of the bit stream extraction unit 17''' according to Variation Example 3 has thus been described above. The steps are not limited to the above steps. Alternatively, the steps may be changed in an implementable range.

The bit stream extraction unit 17''' according to Variation Example 3, which has been described above, is characterized by performing the bit stream extraction process on the basis of the layer ID list LayerIdListTarget on the layer constituting the target layer set LayerSetTarget supplied from the outside, of the target highest temporal identifier HighestTidTarget and of the dependence layer information (the dependency flag (LIdDependencyFlag[ ][ ] or DependencyFLag[ ][ ])) derived from the VPS, removing (discarding), from the input hierarchically coded data DATA, the target highest temporal identifier HighestTidTarget, and NAL units having the layer identifier that are not included in a target set TargetSet defined by the layer ID list LayerIdListTarget of the target layer set LayerSetTarget and the NAL units that do not include the layer identifier of the dependence layer on each layer in the target set TargetSet, except the NAL units including parameter sets (VPS, SPS and PPS) with the layer identifier nuh_layer_id=0, and thus extracting and outputting the target layer set coded data DATA#T (BitstreamToDecode) made up of NAL units having the layer identifier included in the target set TargetSet, and NAL units having the layer identifier of the dependence layer on each layer in the target set TargetSet, and NAL units including the parameter set (VPS, SPS and PPS) with nuh_layer_id=0. In other words, the bit stream extraction unit 17''' does not discard the NAL units having the layer identifier of the dependence layer on each layer in the target set TargetSet, and the NAL units of the parameter set with nuh_layer_id=0, and includes the NAL units included in the dependence layer, and the NAL units of the parameter set with nuh_layer_id=0, into the bit stream of the target set TargetSet.

The operation of the bit stream extraction unit 17''' assumes "the AU constituting the input hierarchically coded data DATA includes one (at the maximum) VPS having the lowest layer identifier in the AU". However, the operation is not limited thereto. For example, a VPS having a layer identifier other than the lowest layer identifier in the AU may be included in the AU. In this case, the bit stream extraction unit 17''' may regard the lowest layer identifier among the layer identifiers that are not included in the target set TargetSet, as the VPS from which the layer dependence information is derived in steps SG102*b* to SG10B. Typically, since the VPS having the layer identifier "nuhLayerId=0" is the VPS having the lowest layer identifier, the layer dependence information may be derived from this VPS, and the other VPSs that are not included in the target set TargetSet are discarded (or ignored).

The aforementioned bit stream extraction unit 17''' according to this embodiment can prevent the problem in that in the bit stream after bit stream extraction, the layer set does not include the VCL and non-VCL NAL units pertaining to the dependence layer referred to from the layer in the layer set (the direct reference layer or the indirect reference layer), and the NAL unit of the parameter set (VPS/SPS/PPS) with nuh_layer_id=0. That is, it can prevent occurrence of the layer that cannot be decoded on the bit stream that is generated through the bit stream extraction process from the bit stream on a certain layer set and only includes the layer set of a sub-set of the layer set.

[Hierarchical Video Coding Apparatus]

The configuration of the hierarchical video coding apparatus 2 according to this embodiment is hereinafter described with reference to FIG. 22.

(Configuration of Hierarchical Video Coding Apparatus)

Figure 22:
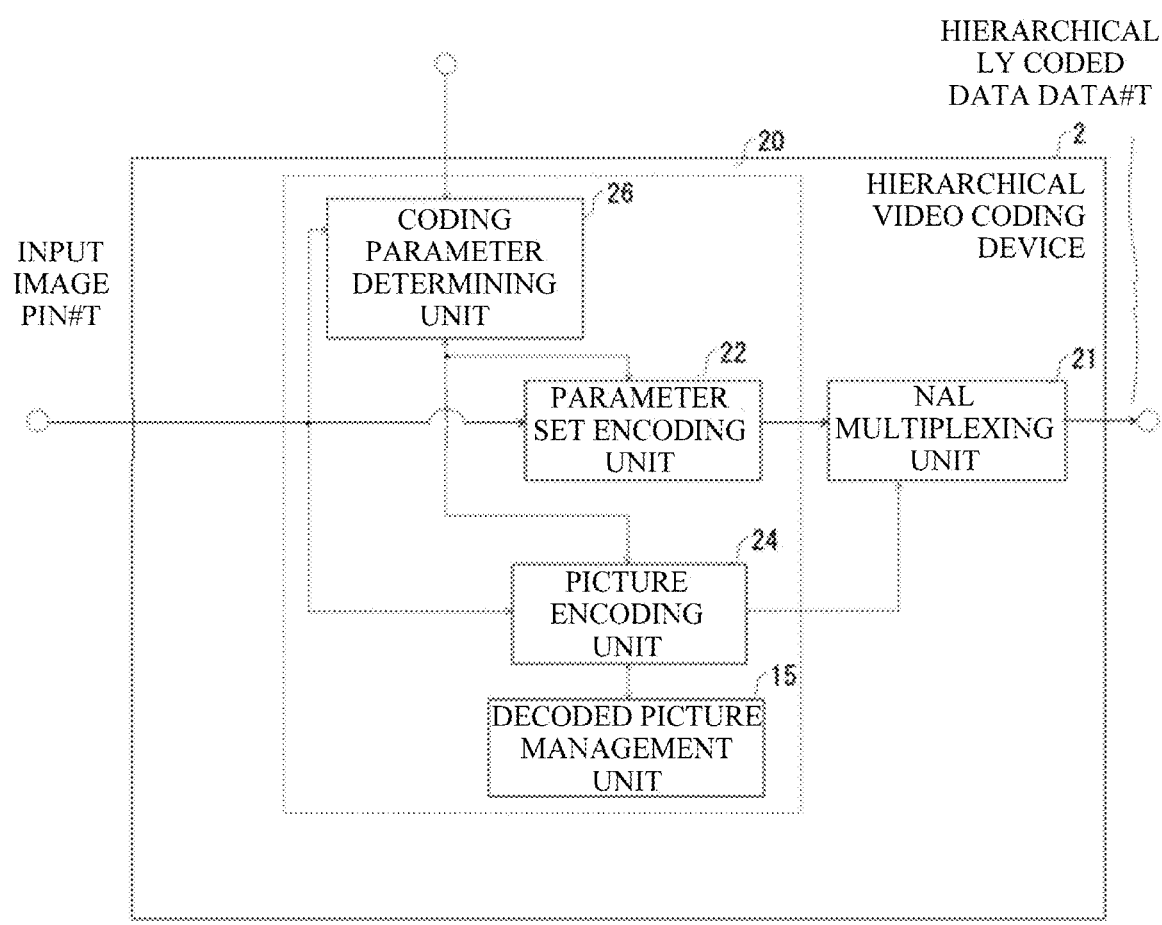
FIG. 22 is a diagram schematically showing the configuration of the hierarchical video decoding apparatus according to this embodiment.

Referring to FIG. 22, the schematic configuration of the hierarchical video coding apparatus 2 is described. FIG. 22 is a functional block diagram showing the schematic configuration of the hierarchical video coding apparatus 2. The hierarchical video coding apparatus 2 codes an input image PIN#T (picture) on each layer included in the layer set (target layer set), which is to be coded, and thus generates the hierarchically coded data DATA on the target layer set. That is, the video coding apparatus 2 codes pictures on layers in an ascending order from the lowest layer ID to the highest layer ID included in the target layer set, and generates their coded data. In other words, the coded data of the pictures on each layer is coded in the order of the layer ID list LayerSetLayerIdList[0] . . . LayerSetIdList[N−1] (N is the number of layers included in the target layer set) of the target layer set. For the sake of securely making the bit stream decodable by the hierarchical video decoding apparatus 1 (including its variations), the hierarchical video coding apparatus 2 generates the hierarchically coded data DATA of the target layer set so as to satisfy the aforementioned bit stream conformance CX1 (CX1') or CX2 (CX2') or CY1 or CY2 or (CY2 and CY3 and CY4) or CZ1 or (CZ1 and CA1 and CA2 and "the layer identifier of VPS nuh_layer_id is zero"). The hierarchically coded data DATA satisfying the bit stream conformance is thus generated, which can prevent, in the hierarchical decoding apparatus 1, it can prevent occurrence of the layer that cannot be decoded on the bit stream that is generated through the bit stream extraction process from the bit stream on a certain layer set and only includes the layer set of a sub-set of the layer set.

As shown in FIG. 22, the hierarchical video coding apparatus 2 includes a target layer set picture encoding unit 20, and an NAL multiplexing unit 21. Furthermore, the target layer set picture encoding unit 20 includes a parameter set encoding unit 22, a picture encoding unit 24, a decoded picture management unit 15, and a Coding parameter determining unit 26.

The decoded picture management unit 15 is the same configuration element as the decoded picture management unit 15 included in the hierarchical video decoding apparatus 1, having been described above. However, the decoded picture management unit 15 included in the hierarchical video coding apparatus 2 is not required to output a picture recorded in an internal DPB as an output picture. Consequently, such output may be omitted. The description of "decoding" with respect to the decoded picture management unit 15 of the hierarchical video decoding apparatus 1 is replaced with "coding", which is applicable to the decoded picture management unit 15 included in the hierarchical video coding apparatus 2.

The NAL multiplexing unit 21 stores, in an NAL unit, an input VCL and a non-VCL on each layer of the target layer set to generate NAL-multiplexed hierarchical video coded data DATA#T, and outputs the data to the outside. In other words, the NAL multiplexing unit 21 stores (codes), in the NAL unit, the non-VCL coded data and VCL coded data supplied from the target layer set picture encoding unit 20, the NAL unit types, layer identifiers and temporal identifiers that correspond to the non-VCLs and VCLs, and generates NAL-multiplexed hierarchically coded data DATA#T.

The Coding parameter determining unit 26 selects one set from among sets of coding parameters. The coding parameters are various parameters pertaining to the parameter sets (VPS, SPS and PPS), prediction parameters for picture coding, and parameters that are coding targets generated in relation to the prediction parameters. The Coding parameter determining unit 26 calculates a cost value representing the magnitude of amount of information and the coding error of each of the sets of coding parameters. The cost value is, for example, a sum of the amount of code and the value obtained by multiplying the square error by a coefficient λ. The amount of code is the amount of information on the coded data on each layer of the target layer set that is obtained by variable-length-coding the quantization error and the coding parameter. The square error is the total sum of the square values of difference values between an input image PIN#T and a predictive image over the pixels. The coefficient λ is a preset real number greater than zero. The Coding parameter determining unit 26 selects a coding parameter set whose calculated cost value is the minimum, and supplies the selected coding parameter set to the parameter set encoding unit 22 and the picture encoding unit 24. The parameter set output from the Coding parameter determining unit 26 can be represented as the syntax value of the syntax pertaining to the parameter sets (VPS, SPS and PPS) included in the coded data, and the set of variables derived from the syntax value.

The parameter set encoding unit 22 sets the parameter sets (VPS, SPS and SPS) used to code the input image on the basis of the coding parameter of each parameter set input from the Coding parameter determining unit 26 and of an input image, and supplies the NAL multiplexing unit 21 with each parameter set, as data to be stored in the non-VCL NAL unit. Typically, the parameter set is coded on the basis of a predetermined syntax table. That is, the syntax value of the syntax included in the syntax table is coded according to the procedures defined in the syntax table, and a bit sequence is thus generated and output as coded data. The parameter set coded by the parameter set encoding unit 22 includes the inter-layer dependence information (the direct dependency flag, layer dependency type bit length, and layer dependency type) described with respect to the parameter set decoding unit 12 included in the hierarchical video decoding apparatus 1. The parameter set encoding unit 22 codes the non-VCL dependency presence/absence flag as a part of the layer dependency type. When supplying the NAL multiplexing unit 21 with the non-VCL coded data, the parameter set encoding unit 22 adds, to this data, the NAL unit type, the layer identifier and the temporal identifier that correspond to the non-VCL, and outputs the these items.

The parameter set generated by the parameter set encoding unit 22 includes the identifier to identify the parameter set, and the active parameter set identifier that identifies the parameter set (active parameter set) to which the parameter set is referred for decoding pictures on the layers. More specifically, in the case of the video parameter set VPS, this VPS includes the VPS identifier to identify this VPS. In the case of the sequence parameter set SPS, this SPS includes the SPS identifier (sps_seq_parameter_set_id) to identify this SPS, and the active VPS identifier (sps_video_parameter_set_id) to identify the VPS to which this SPS and another syntax refer. In the case of the picture parameter set PPS, this PPS includes the PPS identifier (pps_pic_parameter_set_id) to identify this PPS, and the active SPS identifier (pps_seq_parameter_set_id) to identify the SPS to which this PPS and another syntax refer.

The picture encoding unit 24 codes a part of the input image on each of the layers corresponding to the slices constituting the picture, on the basis of the input image PIN#T on each layer, the parameter set supplied by the Coding parameter determining unit 26, and the reference picture recorded in the decoded picture management unit 15, thus generates the coded data on this part, and supplies the NAL multiplexing unit 21 with the data, as data to be stored in the VCL NAL unit. The details of the picture encoding unit 24 are described later. When supplying the NAL multiplexing unit 21 with the VCL coded data, the picture encoding unit 24 adds, to this data, the NAL unit type, the layer identifier and the temporal identifier that correspond to the VCL, and outputs the these items.

(Picture Encoding Unit 24)

Figure 23:
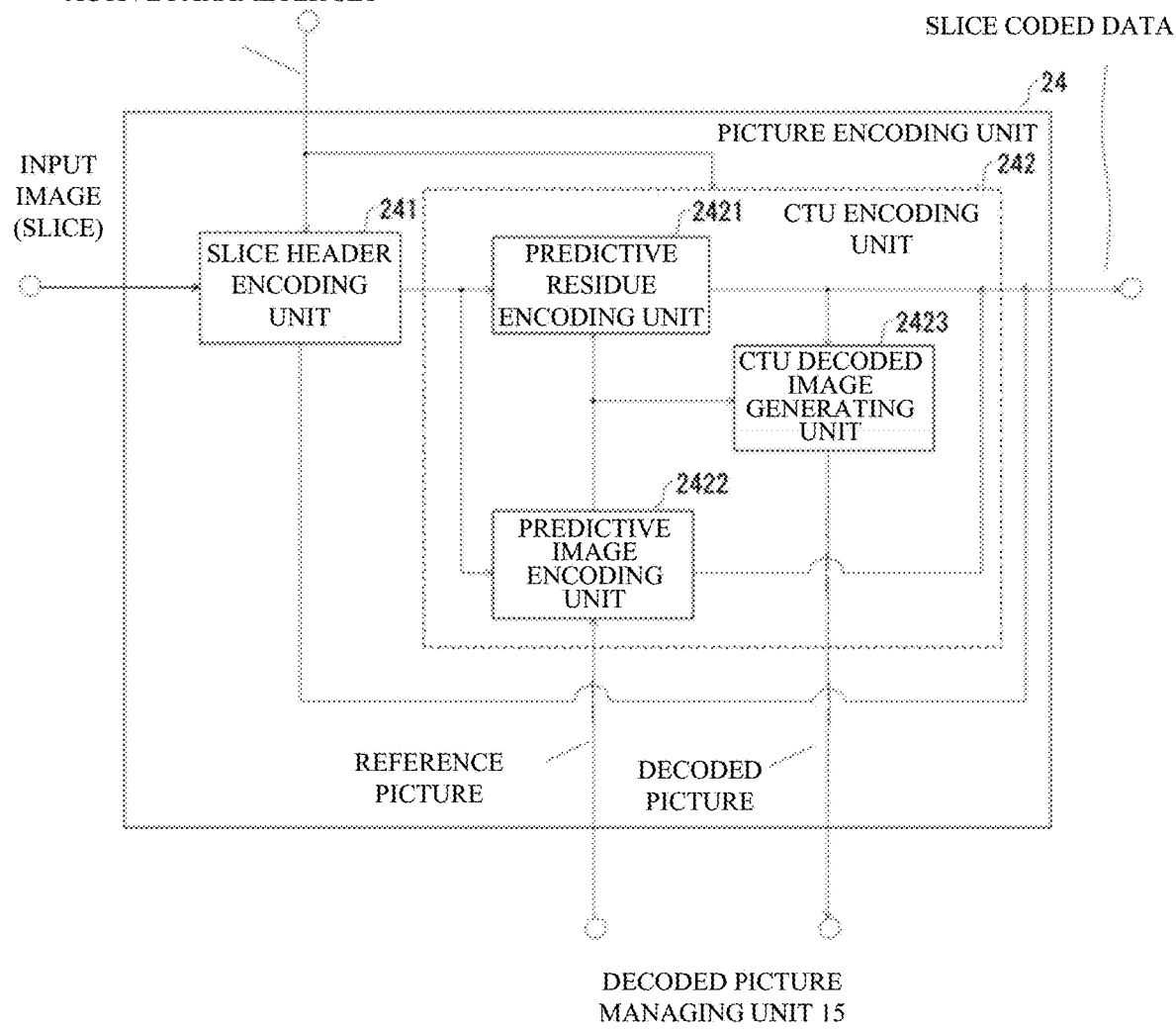
FIG. 23 is a schematic diagram showing a configuration of a target layer set picture decoding unit according to this embodiment.

Referring to FIG. 23, the details of the configuration of the picture encoding unit 24 are described. FIG. 23 is a functional block diagram showing the schematic configuration of the picture encoding unit 24.

As shown in FIG. 23, the picture encoding unit 24 includes a slice header encoding unit 241, and a CTU encoding unit 242.

The slice header encoding unit 241 generates a slice header used to code the input data on each layer that is input in units of slices, on the basis of the input active parameter set. The generated slice header is output as a part of the slice coded data, and supplied to the CTU encoding unit 242 together with the input data. The slice header generated by the slice header encoding unit 241 includes the active PPS identifier that designates the picture parameter set PPS (active PPS) referred to for decoding pictures on the layers.

The CTU encoding unit 242 codes the input image (target slice part) in units of CTUs, on the basis of the input active parameter set and slice header, generates the slice data pertaining to the target slice, and the decoded image (decoded picture), and outputs these items. More specifically, the CTU encoding unit 242 divides the input image in the target slice, in units of CTBs having a CTB size included in the parameter set, and codes the image corresponding to each CTB as one CTU. The CTU coding is performed by a predictive residue encoding unit 2421, a predictive image encoding unit 2422, and a CTU decoded image generating unit 2423.

The predictive residue encoding unit 2421 outputs, as a part of the slice data included in the slice coded data, quantization residue information (TT information) obtained by transforming and quantizing the difference image between the input image and the predictive image. The predictive residue is restored by applying inverse transformation and inverse quantization to the quantization residue information, and the restored predictive residue is output to the CTU decoded image generating unit 2423.

The predictive image encoding unit 2422 generates the predictive image on the basis of the predictive scheme of the target CTU included in the target slice and of the prediction parameter determined by the Coding parameter determining unit 26, and outputs the image to the predictive residue encoding unit 2421 and the CTU decoded image generating unit 2423. Information on the predictive scheme and the prediction parameter is variable-length coded as predictive information (PT information), and output as a part of slice data included in the slice coded data. The predictive scheme selectable by the predictive image encoding unit 2422 includes at least inter-layer image prediction. In the case of using inter prediction or inter-layer image prediction, the corresponding reference picture is read from the decoded picture management unit 15.

The CTU decoded image generating unit 2423 is the same configuration element as the CTU decoded image generating unit 1423 included in the hierarchical video decoding apparatus 1. Consequently, the description thereof is omitted. The decoded image of the target CTU is supplied to the decoded picture management unit 15, and stored in the internal DPB.

<Coding Process in Picture Encoding Unit 24>

Figure 24:
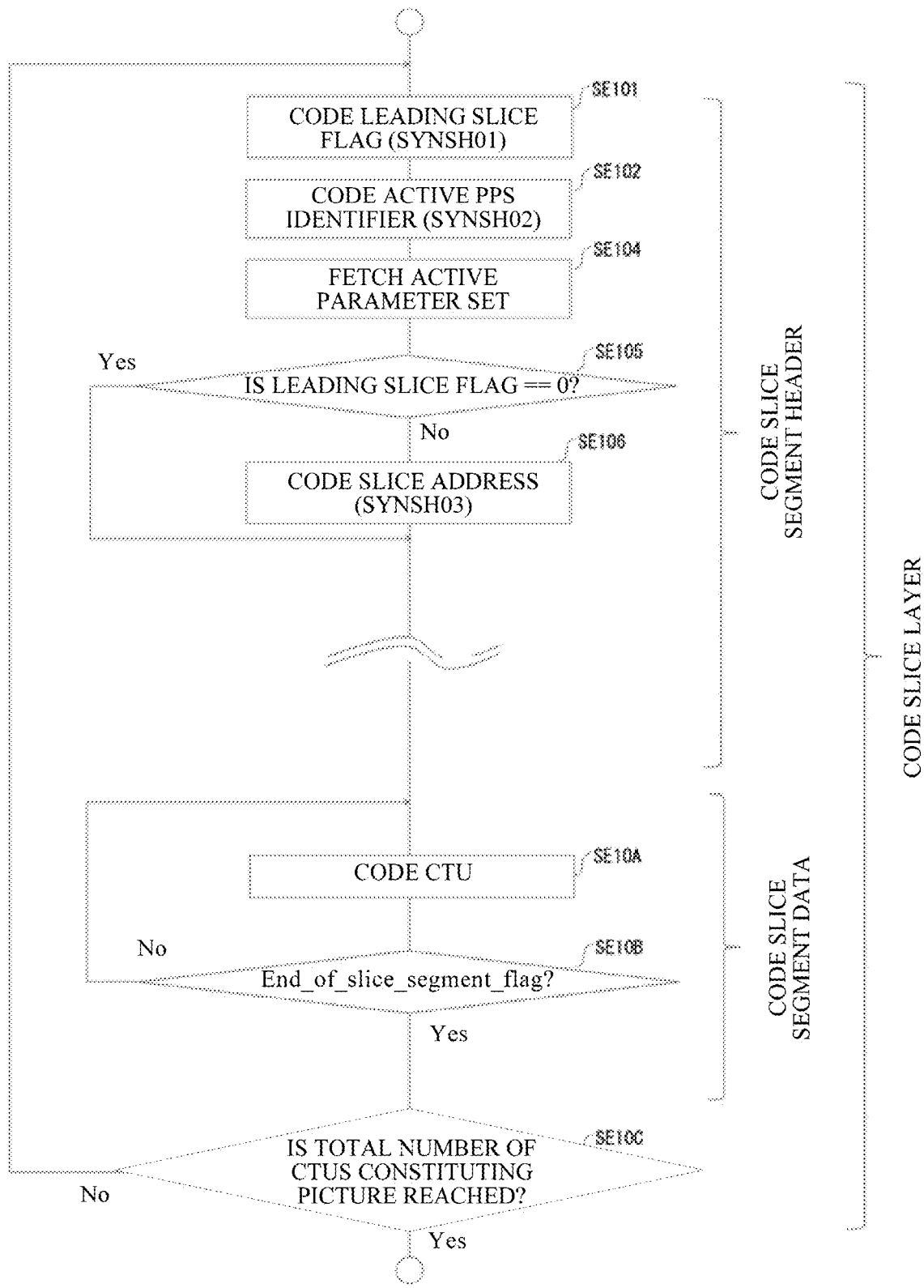
FIG. 24 is a flowchart for illustrating the operation of a picture decoding unit according to this embodiment.

Hereinafter, referring to FIG. 24, the schematic operation of the picture coding on the target layer i in the picture encoding unit 24 is described. FIG. 24 is a flowchart showing the coding process in units of slices that constitute the picture on the target layer i in the picture encoding unit 24.

(SE101) The leading slice flag of the coding target slice (first_slice_segment_in_pic_flag) is coded. That is, when a piece of the input image divided into units of slices (hereinafter, the coding target slice) is the leading slice in a coding order (decoding order) (hereinafter, processing order) in the picture, the leading slice flag (first_slice_segment_in_pic_flag) is one. When the coding target slice is not the leading slice, the leading slice flag is zero. When the leading slice flag is one, the leading CTU address of the coding target slice is set to zero. Furthermore, the counter numCtu of the number of processed CTUs in the picture is set to zero. When the leading slice flag is zero, the leading CTU address of the coding target slice is set on the basis of the slice address coded in the SE106, which will be described later.

(SE102) The active PPS identifier (slice_pic_parameter_set_id) that designates an active PPS referred to during decoding of the coding target slice is coded.

(SE104) The active parameter set determined by the coding parameter determining unit 26 is fetched. That is, a PPS having the PPS identifier (pps_pic_parameter_set_id) identical to the active PPS identifier (slice_pic_parameter_set_id) to which the coding target slice refers is regarded as the active PPS, and the coding parameter of the active PPS is fetched (read) from the coding parameter determining unit 26. Furthermore, an SPS having the SPS identifier (sps_seq_parameter_set_id) identical to the active SPS identifier (pps_seq_parameter_set_id) in the active PPS is regarded as the active SPS, and the coding parameter of the active SPS is fetched from the coding parameter determining unit 26. Moreover, a VPS having the VPS identifier (vps_video_parameter_set_id) identical to the active VPS identifier (sps_video_parameter_set_id) in the active SPS is regarded as the active VPS, and the coding parameter of the active VPS is fetched from the coding parameter determining unit 26.

(SE105) It is determined whether the coding target slice is the leading slice in the processing order in the picture or not on the basis of the leading slice flag. In the case where the leading slice flag is zero (YES in SE105), the processing transitions to step SE106. In the other case (No in SE105), the process in step SE106 is skipped. In the case where the leading slice flag is one, the slice address of the coding target slice is zero.

(SE106) The slice address of the coding target flag (slice_segment_address) is coded. The slice address of the coding target flag (the leading CUT address of the coding target flag) can be set, for example, on the basis of the counter numCtu of the number of processed CTUs in the picture. In this case, the slice address slice_segment_address=numCtu. That is, the leading CTU address of the coding target flag=numCtu. The method of determining the slice address is not limited thereto, and can be changed in an implementable range.

. . . not shown . . . .

(SE10A) The CTU encoding unit 242 codes the input image (coding target slice) in units of CTUs, on the basis of the input active parameter set and slice header, and outputs the coded data on the CTU information (SYNSD01 in FIG. 18) as a part of the slice data of the coding target slice. The CTU encoding unit 242 generates and outputs the CTU decoded image of the region corresponding to each CTU. Furthermore, after the coded data on each of the pieces of CTU information, a slice end flag (end_of_slice_segment_flag) indicating whether the CTU is the end of the coding target slice or not (SYNSD2 in FIG. 18) is coded. In the case where the CTU is the end of the coding target slice, the slice end flag is set to one. In the other case, the flag is set to zero. The set value is thus coded. After each CTU is coded, the value of the number of processed CTUs numCtu is incremented by one (numCtu++).

(SE10B) It is determined whether the CTU is the end of the coding target slice or not on the basis of the slice end flag. In the case where the slice end flag is one (YES in SE10B), the processing transitions to step SE10C. In the other case (No in SE10B), the processing transitions to SE10A to code the subsequent CTU.

(SE10C) It is determined whether the number of processed CTUs numCtu reaches the total number of CTUs (PicSizeInCtbsY) that constitute the picture or not. That is, it is determined whether numCtu==PicSizeInCtbsY or not. In the case where numCtu is equal to PicSizeInCtbsY (YES in SE10C), the coding process in units of slices that constitute the coding target picture is finished. In other case (numCtu<PicSizeInCtbsY) (No in SE10C), the processing transitions to step SE101 to continue the coding process in units of slices that constitute the coding target picture.

The operation of the picture encoding unit 24 according to Embodiment 1 has thus been described above. The steps are not limited to the above steps. Alternatively, the steps may be changed in an implementable range.

(Advantageous Effects of Video Coding Apparatus 2)

For the sake of securely making the bit stream decodable by the hierarchical video decoding apparatus 1 (including its variations), the hierarchical video coding apparatus 2 according to this embodiment described above generates the hierarchically coded data DATA of the target layer set so as to satisfy the aforementioned bit stream conformance CX1 (CX1') or CX2 (CX2') or CY1 or CY2 or (CY2 and CY3 and CY4) or CZ1 or (CZ1 and CA1 and CA2 and "the layer identifier of VPS nuh_layer_id is zero"). The hierarchically coded data DATA satisfying the bit stream conformance is thus generated, thereby allowing the hierarchical decoding apparatus 1 to prevent occurrence of the layer undecodable in the bit stream only including the layer set that is generated through the bit stream extraction process from the bit stream on a certain layer set and is a subset of the layer set.

The hierarchical video coding apparatus 2 according to this embodiment, described above, shares the parameter set used to code the reference layer, as the parameter sets (VPS, SPS and PPS) used to code the target layer. The sharing can reduce the amount of code pertaining to the parameter set on the target layer. That is, the parameter set can be coded with a smaller amount of code.

APPLICATION EXAMPLE TO ANOTHER HIERARCHICAL VIDEO CODING/DECODING SYSTEM

The aforementioned hierarchical video coding apparatus 2 and the hierarchical video decoding apparatus 1 can be used in a manner mounted on various apparatuses for video transmitting, receiving, recording and reproducing. The video may be natural video taken by a camera and the like, and artificial video (CG and GUI) generated by a computer and the like.

Figure 25A:
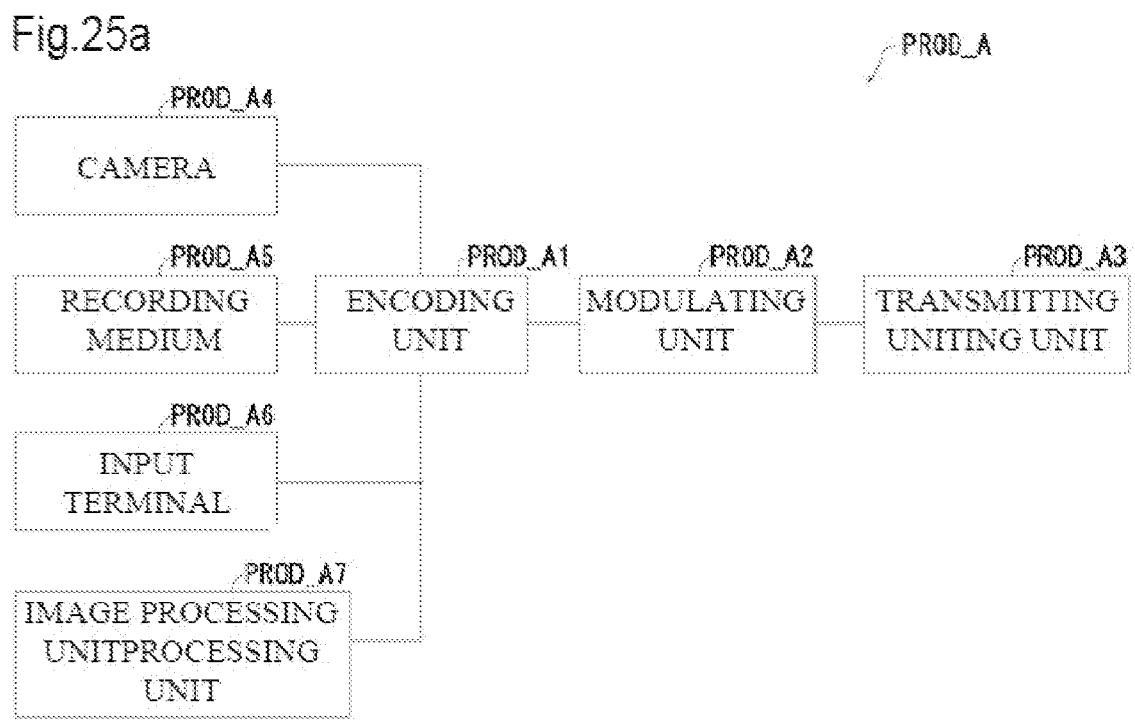
FIG. 25a & FIG. 25b are diagrams showing configurations of a transmitting apparatus mounted with the hierarchical video coding apparatus, and a receiving apparatus mounted with the hierarchical video decoding apparatus.

Referring to FIG. 25, it is described that the aforementioned hierarchical video coding apparatus 2 and the hierarchical video decoding apparatus 1 can be used for video transmitting and receiving. FIG. 25(a) is a block diagram showing the configuration of a transmitting apparatus PROD_A mounted with the hierarchical video coding apparatus 2.

As described in FIG. 25(a), the transmitting apparatus PROD_A includes an encoding unit PROD_A1 that obtains coded data by coding video, a modulating unit PROD_A2 that obtains a modulated signal by modulating carrier waves using coded data obtained by the encoding unit PROD_A1, and a transmitting unit PROD_A3 that transmits the modulated signal obtained by the modulating unit PROD_A2. The aforementioned hierarchical video coding apparatus 2 is used as the encoding unit PROD_A1.

The transmitting apparatus PROD_A may further include a camera PROD_A4 that serves as a supply source of video to be input into the encoding unit PROD_A1 and takes video, a recording medium PROD_A5 that records video, an input terminal PROD_A6 for receiving video from the outside, and an image processing unit A7 that generates or processes images. In FIG. 25(a), the configuration where the transmitting apparatus PROD_A is provided with all of these elements is illustrated. However, some of these may be omitted.

The recording medium PROD_A5 may record uncoded video. Alternatively, this medium may record video coded according to a coding scheme for recording that is different from the coding scheme for transmission. In the latter case, it is preferred that a decoder (not shown) that decodes coded data read from the recording medium PROD_A5 according to a coding scheme for recording intervene between the recording medium PROD_A5 and the encoding unit PROD_A1.

Figure 25B:
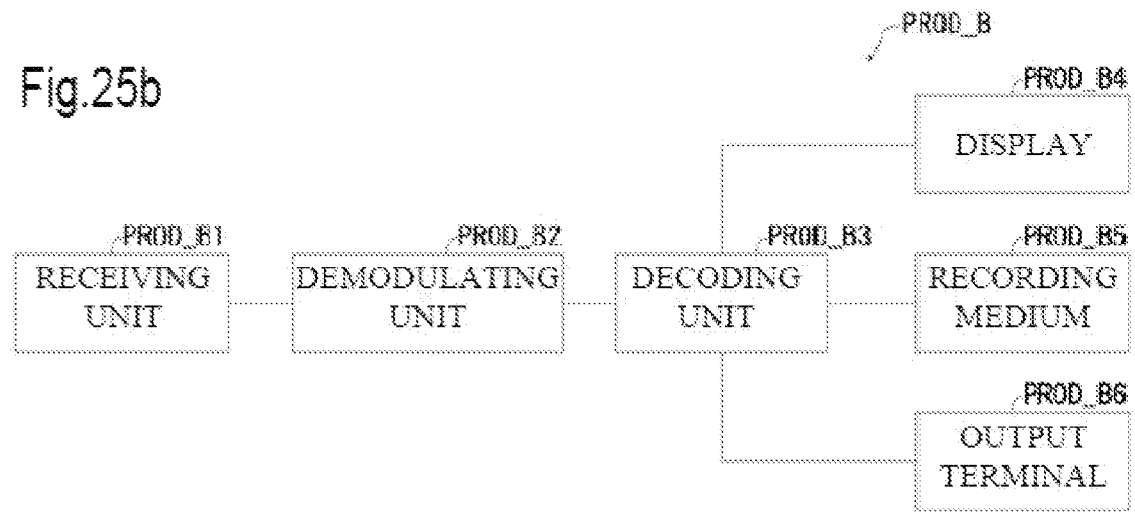

FIG. 25(b) is a block diagram showing the configuration of a receiving apparatus PROD_B mounted with the hierarchical video decoding apparatus 1. As described in FIG. 25(b), the receiving apparatus PROD_B includes a receiving unit PROD_B1 that receives a modulated signal, a demodulating unit PROD_B2 that obtains a coded data by demodulating the modulated signal received by the receiving unit PROD_B1, and a decoding unit PROD_B3 that obtains video by decoding the coded data obtained by the demodulating unit PROD_B2. The aforementioned hierarchical video decoding apparatus 1 is used as the decoding unit PROD_B3.

The receiving apparatus PROD_B may further include a display PROD_B4 that serves as a supply destination of video to be output from the decoding unit PROD_B3 and displays video, and a recording medium PROD_B5 for recording video, and an output terminal PROD_B6 for outputting video to the outside. In FIG. 25(b), the configuration where the receiving apparatus PROD_B is provided with all of these elements is illustrated. However, some of these may be omitted.

The recording medium PROD_B5 may be for recording uncoded video. Alternatively, this medium may record video coded according to a coding scheme for recording that is different from the coding scheme for transmission. In the latter case, it is preferred that an encoder (not shown) that codes video obtained from the decoding unit PROD_B3 according to the coding scheme for recording intervene between the decoding unit PROD_B3 and the recording medium PROD_B5.

The transmission medium that transmits the modulated signal may be wireless or wired medium. The transmission manner that transmits the modulated signal may be broadcast (here, indicating a transmission manner where the transmission destination has not preliminarily been specified). This manner may be communication (here, indicating a transmission manner where the transmission destination has been preliminarily specified). That is, the transmission of the modulated signal may be achieved by any of wireless broadcast, wired broadcast, wireless communication, and wired communication.

For example, a broadcast station for terrestrial digital broadcast (broadcast facilities and the like)/receiving unit (television receiving unit and the like) is an example of the transmitting apparatus PROD_A/receiving apparatus PROD_B for transmitting and receiving the modulated signal through wireless broadcasting. A broadcast station for cable television broadcast (broadcast facilities and the like)/receiving unit (television receiving unit and the like) is an example of the transmitting apparatus PROD_A/receiving apparatus PROD_B for transmitting and receiving the modulated signal through wired broadcasting.

A server (workstation etc.)/client (television receiving unit, personal computer, smartphone, etc.) for VOD (Video On Demand) service or video sharing service using the Internet is an example of the transmitting apparatus PROD_A/receiving apparatus PROD_B for transmitting and receiving the modulated signal through communication (typically, any of wireless and wired transmission media is used in LAN, and a wired transmission medium is used in WAN). Here, the personal computer may be any of a desktop PC, a laptop PC, and a tablet PC. The smartphone may be a multi-functional mobile phone.

A client of a video sharing service has not only a function of decoding the coded data downloaded from a server and displaying the data, but also a function of coding video taken by a camera and uploading the video to the server. That is, the client of the video sharing service functions as both of a transmitting apparatus PROD_A and a receiving apparatus PROD_B.

Figure 26A:
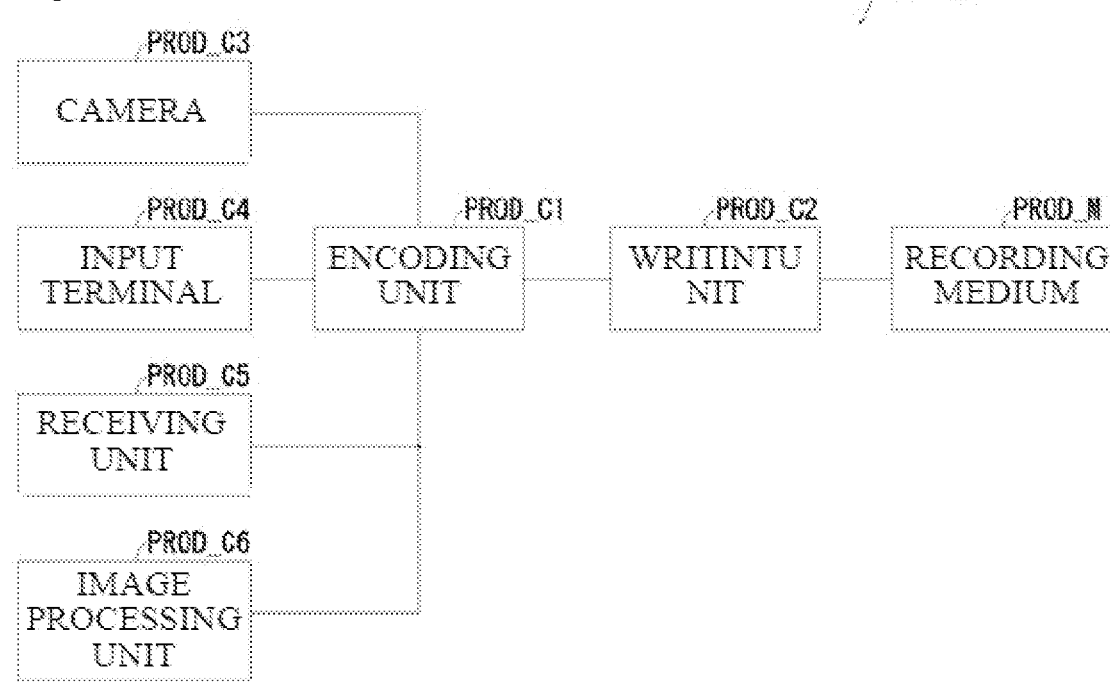
FIG. 26a & FIG. 26b are diagrams showing configurations of a recording apparatus mounted with the hierarchical video coding apparatus, and a reproducing apparatus mounted with the hierarchical video decoding apparatus.

Referring to FIG. 26, it is described that the aforementioned hierarchical video coding apparatus 2 and the hierarchical video decoding apparatus 1 can be used for video recording and reproducing. FIG. 26(a) is a block diagram showing the configuration of a recording apparatus PROD_C mounted with the hierarchical video coding apparatus 2.

As shown in FIG. 26(a), the recording apparatus PROD_C includes an encoder PROD_C1 that obtains coded data by coding video, and a writing unit PROD_C2 that writes, in a recording medium PROD_M, the coded data obtained by the encoder PROD_C1. The aforementioned hierarchical video coding apparatus 2 is used as the encoder PROD_C1.

The recording medium PROD_M may be (1) what is embedded in the recording apparatus PROD_C, such as an HDD (Hard Disk Drive) or an SSD (Solid State Drive), (2) what is connected to the recording apparatus PROD_C, such as an SD memory card or a USB (Universal Serial Bus) flash memory, (3) what is inserted in a drive apparatus (not shown) embedded in the recording apparatus PROD_C, such as a DVD (Digital Versatile Disc) or a BD (BLu-ray Disc®).

The recording apparatus PROD_C may further include a camera PROD_C3 that serves as a supply source of video to be input into the encoder PROD_C1 and takes video, an input terminal PROD_C4 for receiving video from the outside, a receiving unit PROD_C5 for receiving video, and an image processing unit C6 that generates or processes images. In FIG. 26(a), the configuration where the recording apparatus PROD_C is provided with all of these elements is illustrated. However, some of these may be omitted.

The receiving unit PROD_C5 may be for receiving uncoded video. Alternatively, this receiving unit may receive coded data coded according to a coding scheme for transmitting that is different from the coding scheme for recording. In the latter case, it is preferred that a decoder for transmission (not shown) that decodes coded data coded according to a coding scheme for transmission intervene between the receiving unit PROD_C5 and the encoder PROD_C1.

Examples of such a recording apparatus PROD_C include a DVD recorder, a BD recorder, and an HDD (Hard Disk Drive) recorder (in this case, the input terminal PROD_C4 or the receiving unit PROD_C5 serves as a main supply source of video). Alternatively, a camcorder (in this case, the camera PROD_C3 serves as a main supply source of video), a personal computer (in this case, the receiving unit PROD_C5 or the image processing unit PROD_C6 serves as a main supply source of video), a smartphone (in this case, the camera PROD_C3 or the receiving unit PROD_C5 serves as a main supply source of video) are examples of such a recording apparatus PROD_C.

Figure 26B:
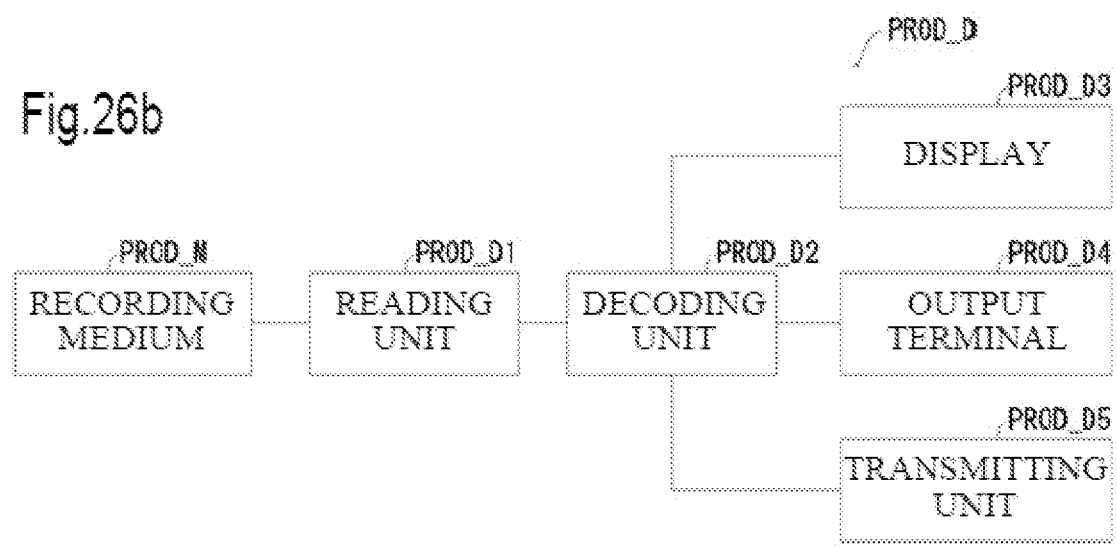

FIG. 26(b) is a block diagram showing the configuration of a reproducing apparatus PROD_D mounted with the aforementioned hierarchical video decoding apparatus 1. As shown in FIG. 26(b), the reproducing apparatus PROD_D includes a reading unit PROD_D1 that reads coded data written in the recording medium PROD_M, and a decoding unit PROD_D2 that obtains video by decoding the coded data read by the reading unit PROD_D1. The aforementioned hierarchical video decoding apparatus 1 is used as the decoding unit PROD_D2.

The recording medium PROD_M may be (1) what is embedded in the reproducing apparatus PROD_D, such as an HDD or an SSD, (2) what is connected to the reproducing apparatus PROD_D, such as an SD memory card or a USB flash memory, (3) what is inserted in a drive apparatus (not shown) embedded in the reproducing apparatus PROD_D, such as a DVD or a BD.

The reproducing apparatus PROD_D may further include a display PROD_D3 that serves as a supply destination of video to be output from the decoding unit PROD_D2 and displays video, and an output terminal PROD_D4 for outputting the video to the outside, and a transmitting unit PROD_D5 that transmits the video. In FIG. 26(b), the configuration where the reproducing apparatus PROD_D is provided with all of these elements is illustrated. However, some of these may be omitted.

The transmitting unit PROD_D5 may be for transmitting uncoded video. Alternatively, this transmitting unit may transmit coded data coded according to a coding scheme for transmitting that is different from the coding scheme for recording. In the latter case, it is preferred that an encoder (not shown) that codes video according to a coding scheme for transmission intervene between the decoding unit PROD_D2 and the transmitting unit PROD_D5.

Such a reproducing apparatus PROD_D may be, for example, a DVD player, a BD player, an HDD player or the like (in this case, the output terminal PROD_D4 to which a television receiving unit or the like is connected serves as a main supply destination of video). A television receiving unit (in this case, the display PROD_D3 serves as a main supply destination of video), a digital signage (also called an electronic signage or electronic bulletin board, and the display PROD_D3 or the transmitting unit PROD_D5 serves as a main supply destination of video), a desktop PC (in this case, the output terminal PROD_D4 or the transmitting unit PROD_D5 serves as a main supply destination of video), a laptop or tablet PC (in this case, the display PROD_D3 or the transmitting unit PROD_D5 serves as a main supply destination of video), a smartphone (in this case, the display PROD_D3 or the transmitting unit PROD_D5 serves as a main supply destination of video) and the like are examples of such a reproducing apparatus PROD_D.

(On Achievement into Hardware and Achievement into Software)

Finally, each of the blocks of the hierarchical video decoding apparatus 1 and the hierarchical video coding apparatus 2 may be achieved by a logic circuit formed on an integrated circuit (IC chip) in a hardware manner, or achieved in a software manner using a CPU (Central Processing Unit).

In the latter case, each of the apparatuses includes a CPU that executes instructions of control programs that achieve functions, ROM (Read Only Memory) that stores the programs, RAM (Random Access Memory) on which the program are deployed, and a storing apparatus (recording medium), such as memory, which stores the programs and various data. The object of the present disclosure can be achieved also by supplying the each of the apparatuses with a recording medium that records the program code (executable programs, intermediate code programs, source programs) of control programs, which are software for achieving the aforementioned functions, in each of the apparatuses in a computer-readable manner, and by causing the computer (CPU or MPU (Micro Processing Unit)) to read the program code recorded in the recording medium.

The recording medium may be, for example, tape, such as magnetic tape or cassette tape, disks including a magnetic disk, such as Floppy® disk/hard disk, and an optical disk, such as CD-ROM (Compact Disc Read-Only Memory)/MO (Magneto-Optical)/MD (Mini Disc)/DVD (Digital Versatile Disk)/CD-R (CD Recordable), cards, such as an IC card (including a memory card)/optical card, semiconductor memories, such as mask ROM/EPROM (Erasable Programmable Read-only Memory)/EEPROM® (Electrically Erasable and Programmable Read-only Memory)/flash ROM, or logic circuits including PLD (Programmable Logic Apparatus) or FPGA (Field Programmable Gate Array).

Each of the apparatuses may be configured to be connectable to a communication network, and supply the program code via the communication network. The communication network is any element that can transmit the program code. The element is not limited. For example, the Internet, an intranet, an extranet, LAN (Local Area Network), ISDN (Integrated Services Digital Network), VAN (Value-Added Network), CATV (Community Antenna Television) communication network, Virtual Private Network, telephone network, mobile communication network, satellite communication network and the like can be used. The transmission medium constituting the communication network may be any medium that can transmit the program code. The medium is not limited to a specific configuration or type. For example, any of wired elements, such as IEEE (Institute of Electrical and Electronic Engineers) 1394, USB, power-line carrier, cable TV line, telephone line, ADSL (Asymmetric Digital Subscriber Line) circuit, or any of wireless elements that include an infrared element, such as IrDA (Infrared Data Association) or a remote control, Bluetooth®, IEEE802.11 wireless, HDR (High Data Rate), NFC (Near Field Communication), DLNA® (Digital Living Network Alliance), mobile phone network, satellite circuit, or terrestrial digital network can be used. The present disclosure may be achieved in a form of a computer data signal embedded in carrier waves embodied through electronic transmission of the program code.

CONCLUSION

An image decoding apparatus according to aspect 1 of the present disclosure is an image decoding apparatus that decodes input image coded data, including: an image-coded data extractor that extracts image coded data pertaining to a decoding target layer set including at least one layer, from the input image coded data, based on a layer ID list indicating the decoding target layer set; and a picture decoding unit that decodes a picture in the decoding target layer set, from the extracted image coded data, wherein the input image coded data extracted by the image-coded data extractor does not include a non-VCL NAL unit having a layer identifier that is not equal to zero and is not included in the layer ID list.

The image decoding apparatus of aspect 2 of the present disclosure is that according to the aspect 1, wherein a temporal ID of an NAL unit included in the image coded data is equal to or less than a value of a highest temporal ID of the decoding target layer set.

The image decoding apparatus of aspect 3 of the present disclosure is that according to aspect 1, wherein the non-VCL NAL unit is an NAL unit having a parameter set.

The image decoding apparatus of aspect 4 of the present disclosure is that according to aspect 2, wherein the parameter set includes a video parameter set.

The image decoding apparatus of aspect 5 of the present disclosure is that according to aspect 3, wherein the parameter set includes a sequence parameter set.

The image decoding apparatus of aspect 6 of the present disclosure is that according to aspect 3, wherein the parameter set includes a picture parameter set.

An image decoding method of aspect 7 of the present disclosure is an image decoding method of decoding input image coded data, comprising: an image-coded data extracting step of extracting image coded data pertaining to a decoding target layer set including at least one layer, from the input image coded data, based on a layer ID list indicating the decoding target layer set; and a picture decoding step of decoding a picture in the decoding target layer set, from the extracted image coded data, wherein the input image coded data extracted in the image-coded data extracting step does not include a non-VCL NAL unit having a layer identifier that is not equal to zero and is not included in the layer ID list.

An image decoding apparatus of aspect 8 of the present disclosure is an image decoding apparatus that includes an image-coded data extractor for extracting decoding target image coded data from input image coded data, based on a layer ID list of a target layer set; wherein the image-coded data extractor further includes a layer identifier updating unit that updates a layer identifier of a non-video coding layer NAL unit, which is in the input image coded data and has a smaller layer identifier than the lowest layer identifier in the layer ID list of the target layer set, with the lowest layer identifier; the image-coded data extractor discards the NAL unit having a layer identifier not included in the layer ID list of the target layer set, from the image coded data including the non-video coding layer NAL unit where the layer identifier is updated by the layer identifier updating unit, and generates decoding target image coded data.

The image decoding apparatus described above can prevent the problem in that the NAL unit on the non-video coding layer is not included in the layer set on the bit stream after bit stream extraction. That is, it can prevent occurrence of the layer that cannot be decoded on the bit stream that is generated through the bit stream extraction process from the bit stream on a certain layer set and only includes the layer set of a sub-set of the layer set.

An image decoding apparatus of aspect 9 of the present disclosure is an image decoding apparatus that includes an image-coded data extractor for extracting decoding target image coded data from input image coded data, based on a layer ID list of a target layer set, wherein the image-coded data extractor discards an NAL unit having a layer identifier not included in the layer ID list of the target layer set, from the input image coded data, except an NAL unit with a parameter set having a layer identifier of zero.

The image decoding apparatus described above can prevent the problem in that the NAL unit of the parameter set having a layer identifier of zero is not included in the layer set on the bit stream after bit stream extraction. That is, it can prevent occurrence of the layer that cannot be decoded on the bit stream that is generated through the bit stream extraction process from the bit stream on a certain layer set and only includes the layer set of a sub-set of the layer set.

An image decoding apparatus of aspect 10 of the present disclosure is an image decoding apparatus that includes an image-coded data extractor for extracting decoding target image coded data from input image coded data, based on a layer ID list of a target layer set, wherein the image-coded data extractor further includes a dependence layer information deriving unit that derives dependence information on which each layer included in the target layer set in the input image coded data depends, the image-coded data extractor discards an NAL unit having a layer identifier not included in the layer ID list of the target layer set from the input image coded data, except an NAL unit on the dependence layer derived by the dependence layer information deriving unit, and generates decoded target image coded data.

The image decoding apparatus described above can prevent the problem in that the NAL unit on the dependence layer on which each layer included in the target layer set depends is not included in the layer set on the bit stream after bit stream extraction. That is, it can prevent occurrence of the layer that cannot be decoded on the bit stream that is generated through the bit stream extraction process from the bit stream on a certain layer set and only includes the layer set of a sub-set of the layer set.

The image decoding apparatus of aspect 11 of the present disclosure is that according to the aspect 8, wherein the non-video coding layer NAL unit is an NAL unit including a parameter set.

The image decoding apparatus described above can prevent the problem in that the NAL unit of the parameter set is not included in the layer set on the bit stream after bit stream extraction.

The image decoding apparatus of aspect 12 of the present disclosure is that according to aspect 9 or 11, wherein the parameter set is a video parameter set.

The image decoding apparatus described above can prevent the problem in that the NAL unit of the video parameter set is not included in the layer set on the bit stream after bit stream extraction.

The image decoding apparatus of aspect 13 of the present disclosure is that according to aspect 9 or 11, wherein the parameter set is a sequence parameter set.

The image decoding apparatus described above can prevent the problem in that the NAL unit of the sequence parameter set is not included in the layer set on the bit stream after bit stream extraction.

The image decoding apparatus of aspect 14 of the present disclosure is that according to aspect 9 or 11, wherein the parameter set is a picture parameter set.

The image decoding apparatus described above can prevent the problem in that the NAL unit of the picture parameter set is not included in the layer set on the bit stream after bit stream extraction.

The image decoding apparatus of aspect 15 of the present disclosure is that according to aspect 10, wherein the dependence layer is a direct reference layer or an indirect reference layer.

The image decoding apparatus described above can prevent the problem in that the NAL unit on the direct reference layer or the indirect reference layer on which each layer included in the target layer set depends is not included in the layer set on the bit stream after bit stream extraction.

Image coded data of aspect 16 of the present disclosure is image coded data satisfying a conformance condition that a video parameter set referred to by a certain target layer is a same layer identifier as VCL having a lowest layer identifier in an access unit including a target layer.

The image coded data described above can prevent the problem in that in the sub-bit-stream generated through bit stream extraction, no video parameter set is included in the layer set. That is, it can prevent occurrence of the layer that cannot be decoded on the bit stream that is generated through the bit stream extraction process from the bit stream on a certain layer set and only includes the layer set of a sub-set of the layer set.

Image coded data of aspect 17 of the present disclosure is image coded data satisfying a conformance condition that a video parameter set referred to by a certain target layer has a layer identifier value of zero.

The image coded data described above can prevent the problem in that in the sub-bit-stream generated through bit stream extraction, no video parameter set having a layer identifier of zero is included in the layer set. That is, it can prevent occurrence of the layer that cannot be decoded on the bit stream that is generated through the bit stream extraction process from the bit stream on a certain layer set and only includes the layer set of a sub-set of the layer set.

The image coded data of aspect 18 of the present disclosure according to that of aspect 17, further satisfying a conformance condition that a sequence parameter set referred to by a certain target layer has a layer identifier value of zero.

The image coded data described above can prevent the problem in that in the sub-bit-stream generated through bit stream extraction, no sequence parameter set having a layer identifier value of zero is included in the layer set.

The image coded data of aspect 19 of the present disclosure according to that of aspect 17 or 18, further satisfying a conformance condition that a picture parameter set referred to by a certain target layer has a layer identifier value of zero.

The image coded data described above can prevent the problem in that in the sub-bit-stream generated through bit stream extraction, no picture parameter set having a layer identifier value of zero is included in the layer set.

The image coded data of aspect 20 of the present disclosure is image coded data satisfying a conformance condition that the layer set includes a dependence layer referred to by a certain target layer in the layer set.

The image coded data described above can prevent the problem in that in the sub-bit-stream generated through bit stream extraction, no dependence layer referred to by a certain target layer in the layer set is included in the layer set. That is, it can prevent occurrence of the layer that cannot be decoded on the bit stream that is generated through the bit stream extraction process from the bit stream on a certain layer set and only includes the layer set of a sub-set of the layer set.

An image coding apparatus of aspect 21 of the present disclosure is an image coding apparatus for generating image coded data from input layer image corresponding to a target layer set, based on a layer ID list of the target layer set, wherein the image coding apparatus generates image coded data satisfying a conformance condition that in the target layer set, a layer identifier of a non-video coding layer referred to by a certain target layer is a layer identifier identical to a VCL having a lowest layer identifier in an access unit of the target layer set.

The image coding apparatus described above can prevent the problem in that the NAL unit on the non-video coding layer referred to by a certain target layer is not included in the sub-bit-stream generated through bit stream extraction from the image coded data generated by the image coding apparatus. That is, it can prevent occurrence of the layer that cannot be decoded on the bit stream that is generated through the bit stream extraction process from the bit stream on a certain layer set and only includes the layer set of a sub-set of the layer set.

An image coding apparatus of aspect 22 of the present disclosure is an image coding apparatus for generating image coded data from input layer image corresponding to a target layer set, based on a layer ID list of the target layer set, wherein the image coding apparatus generates image coded data satisfying a conformance condition that in the target layer set, a layer identifier of a non-video coding layer referred to by a certain target layer is a lowest layer identifier in the layer ID list of the target layer set.

The image coding apparatus described above can prevent the problem in that the NAL unit on the non-video coding layer referred to by a certain target layer is not included in the sub-bit-stream generated through bit stream extraction from the image coded data generated by the image coding apparatus. That is, it can prevent occurrence of the layer that cannot be decoded on the bit stream that is generated through the bit stream extraction process from the bit stream on a certain layer set and only includes the layer set of a sub-set of the layer set.

An image coding apparatus of aspect 23 of the present disclosure is an image coding apparatus for generating image coded data from input layer image corresponding to a target layer set, based on a layer ID list of the target layer set, wherein the image coding apparatus generates image coded data satisfying a conformance condition that in the target layer set, a dependence layer on which each layer depends is included in the target layer set.

The image coding apparatus described above can prevent the problem in that the NAL unit on the dependence layer referred to by a certain target layer is not included in the sub-bit-stream generated through bit stream extraction from the image coded data generated by the image coding apparatus. That is, it can prevent occurrence of the layer that cannot be decoded on the bit stream that is generated through the bit stream extraction process from the bit stream on a certain layer set and only includes the layer set of a sub-set of the layer set.

The present disclosure is not limited to each embodiment described above. Various changes can be made in a range represented in the claims. Any embodiment obtained by combining types of technical measures disclosed in various embodiments are also included in the technical scope of the present disclosure.

INDUSTRIAL APPLICABILITY

The present disclosure is suitably applicable to a hierarchical video decoding apparatus that decodes coded data where image data is hierarchically coded, and a hierarchical video coding apparatus that generates the coded data where image data is hierarchically coded. The present disclosure is also suitably applicable to the data structure of hierarchically coded data generated by the hierarchical video coding apparatus and referred to by the hierarchical video decoding apparatus.

DESCRIPTION OF SYMBOLS

1 . . . Hierarchical video decoding apparatus
2 . . . Hierarchical video coding apparatus
10 . . . Target layer set picture decoding unit
11 . . . NAL demultiplexing unit
12 . . . Parameter set decoding unit
13 . . . Parameter set management unit
14 . . . Picture decoding unit
141 . . . Slice header decoding unit
142 . . . CTU decoding unit
1421 . . . Predictive residue restoring unit
1422 . . . Predictive image generating unit
1423 . . . CTU decoded image generating unit
15 . . . Decoded picture management unit
17 . . . Bit stream extraction unit (image-coded data extractor)
20 . . . Target layer set picture encoding unit
21 . . . NAL multiplexing unit
22 . . . Parameter set encoding unit
24 . . . Picture encoding unit
26 . . . Coding parameter determining unit
241 . . . Slice header encoding unit
242 . . . CTU encoding unit 2421 . . . Predictive residue encoding unit
2422 . . . Predictive image encoding unit
2423 . . . CTU decoded image generating unit

What is claimed is:

1. An image decoding apparatus for decoding input image coded data, the apparatus comprising:
   a bit stream extraction unit configured to perform a bit stream extraction process on the input image coded data based on a layer identifier list for a decoding target layer set and a highest temporal layer identifier (ID) of the decoding target layer set to generate extracted image coded data, wherein the decoding target layer set includes at least one layer associated with network abstraction layer (NAL) units included in the input image coded data, and
      wherein the bit stream extraction unit is configured to, for each target NAL unit included in the input image coded data:
      (1) decode an NAL unit header of the target NAL unit to identify an NAL unit type, a layer identifier, and a temporal layer identifier for the target NAL unit,
      (2) determine whether the target NAL unit is a non-video coding layer (VCL) NAL unit based on the NAL unit type,
      (3) determine whether the layer identifier for the target NAL unit is included in the layer identifier list, and
      (4) when the target NAL unit is a non-VCL NAL unit and the layer identifier for the target NAL unit is not included in the layer identifier list, update the layer identifier included in the NAL unit header of the target NAL unit to a lowest layer identifier included in the layer identifier list, wherein the updated target NAL unit is included in the extracted image coded data when the temporal layer identifier for the target NAL unit is less than or equal to the highest temporal layer ID of the decoding target layer set;
      and
   a picture decoding unit that receives the extracted image coded data for decoding a video image associated with the decoding target layer set.

2. The image decoding apparatus according to claim 1, wherein at least one of the bit stream extraction unit or the picture decoding unit are implemented by a processor configured to execute instructions stored on a non-transitory, computer readable storage medium.

3. The image decoding apparatus according to claim 1, wherein the non-VCL NAL unit is a NAL unit that includes a parameter set for decoding the video image from the extracted image coded data.

4. The image decoding apparatus according to claim 3, wherein the parameter set includes a video parameter set defining parameters common to multiple NALs.

5. The image decoding apparatus according to claim 3, wherein the parameter set includes a sequence parameter set for decoding a target sequence.

6. The image decoding apparatus according to claim 3, wherein the parameter set includes a picture parameter set for decoding each picture in the target sequence.

7. An image decoding method of decoding input image coded data, the method comprising:
   extracting extracted image coded data from the input image coded data by performing a bit stream extraction process on the input image coded data based on a layer identifier list for a decoding target layer set and a highest temporal layer identifier (ID) of the decoding target layer set, wherein the decoding target layer set includes at least one layer associated with network abstraction layer (NAL) units included in the input image coded data, and
      wherein the bit stream extraction process includes, for each target NAL unit included in the input image coded data:
      (1) decode an NAL unit header of the target NAL unit to identify an NAL unit type, a layer identifier, and a temporal layer identifier for the target NAL unit,
      (2) determine whether the target NAL unit is a non-video coding layer (VCL) NAL unit based on the NAL unit type,
      (3) determine whether the layer identifier for the target NAL unit is included in the layer identifier list, and
      (4) when the target NAL unit is a non-VCL NAL unit and the layer identifier for the target NAL unit is not included in the layer identifier list, update the layer identifier included in the NAL unit header of the target NAL unit to a lowest layer identifier included in the layer identifier list, wherein the updated target NAL unit is included in the extracted image coded data when the temporal layer identifier for the target NAL unit is less than or equal to the highest temporal layer ID of the decoding target layer set; and
   decoding a video image associated with the decoding target layer set from the extracted image coded data.

8. The image decoding method according to claim 7, wherein a processor is configured to execute instructions stored on a non-transitory, computer readable storage medium such that the instructions cause the processor to perform the bit stream extraction process.

9. The image decoding method according to claim 7, wherein the non-VCL NAL unit is a NAL unit that includes a parameter set for decoding the video image from the extracted image coded data.

10. The image decoding method according to claim 9, wherein the parameter set includes a sequence parameter set for decoding a target sequence.

11. The image decoding method according to claim 9, wherein the parameter set includes a picture parameter set for decoding a picture in a target sequence.

12. A non-transitory computer readable medium storing instructions that, when executed by a processor, cause the processor to:
   extract extracted image coded data from input image coded data by performing a bit stream extraction process on the input image coded data based on a layer identifier list for a decoding target layer set and a highest temporal layer identifier (ID) of the decoding target layer set, wherein the decoding target layer set includes at least one layer associated with network abstraction layer (NAL) units included in the input image coded data, and
      wherein the bit stream extraction process includes, for each target NAL unit included in the input image coded data:
      (1) decode an NAL unit header of the target NAL unit to identify an NAL unit type, a layer identifier, and a temporal layer identifier for the target NAL unit,
      (2) determine whether the target NAL unit is a non-video coding layer (VCL) NAL unit based on the NAL unit type,
      (3) determine whether the layer identifier for the target NAL unit is included in the layer identifier list, and (4) when the target NAL unit is a non-VCL NAL unit and the layer identifier for the target NAL unit is not included in the layer identifier list, update the layer identifier included in the NAL unit header of the target NAL unit to a lowest layer identifier included in the layer identifier list, wherein the updated target NAL unit is included in the extracted image coded data when the temporal layer identifier for the target NAL unit is less than or equal to the highest temporal layer ID of the decoding target layer set; and decode a video image associated with the decoding target layer set from the extracted image coded data.

13. The non-transitory computer readable medium according to claim 12, wherein the non-VCL NAL unit is a NAL unit that includes a parameter set for decoding the video image from the extracted image coded data.

14. The non-transitory computer readable medium according to claim 13, wherein the parameter set of parameters includes parameters common to multiple NAL units.

15. The non-transitory computer readable medium according to claim 13, wherein the parameter set includes a sequence parameter set for decoding a target sequence.

16. The non-transitory computer readable medium according to claim 13, wherein the parameter set includes a picture parameter set for decoding a picture in a target sequence.

17. The image decoding method according to claim 9, wherein the parameter set includes parameters common to multiple NAL units.

* * * * *